(12) United States Patent
Sugie et al.

(10) Patent No.: US 7,532,108 B2
(45) Date of Patent: May 12, 2009

(54) VEHICLE THEFT DETECTION DEVICE

(75) Inventors: Akira Sugie, Hyogo (JP); Hirohumi Takasuka, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 332 days.

(21) Appl. No.: 11/390,108

(22) Filed: Mar. 28, 2006

(65) Prior Publication Data

US 2006/0244576 A1 Nov. 2, 2006

(30) Foreign Application Priority Data

Mar. 29, 2005 (JP) .................... P2005-094365
Sep. 20, 2005 (JP) .................... P2005-271557
Sep. 20, 2005 (JP) .................... P2005-271562

(51) Int. Cl.
*B60R 25/10* (2006.01)

(52) U.S. Cl. .................... 340/426.1; 340/429

(58) Field of Classification Search .............. 340/426.1, 340/426.13, 426.25, 426.3, 440, 429; 307/10.2; 73/652; 180/287
See application file for complete search history.

(56) References Cited

U.S. PATENT DOCUMENTS 3,728,675 A * 4/1973 Horn et al. .................. 340/429
4,359,717 A * 11/1982 Huber et al. ................ 340/429
5,274,354 A * 12/1993 Sato .......................... 340/429
5,677,666 A 10/1997 Stallbohm
6,028,505 A * 2/2000 Drori ........................ 307/10.2
6,150,927 A * 11/2000 Nesbitt ...................... 180/287
6,157,295 A * 12/2000 Steiner et al. ............... 340/429
6,791,456 B2 * 9/2004 Nakayama et al. ......... 340/429

FOREIGN PATENT DOCUMENTS

| JP | A 4-159164 | 6/1992 |
|---|---|---|
| JP | A 5-139249 | 6/1993 |
| JP | A 9-118199 | 5/1997 |
| JP | A 2001-247013 | 9/2001 |
| JP | A 2003-34233 | 2/2003 |
| JP | B2 3622723 | 12/2004 |
| JP | A 2005-7999 | 1/2005 |
| JP | A 2005-225251 | 8/2005 |
| JP | A 2006-069362 | 3/2006 |

* cited by examiner

*Primary Examiner*—John A Tweel, Jr.
(74) *Attorney, Agent, or Firm*—Oliff & Berridge, PLC

(57) ABSTRACT

A vehicle theft detection device includes an inclination detection unit and an operation control unit. The inclination detection unit detects an inclination of a vehicle. The operation control unit detects theft using an output of the inclination detection unit. If it is determined that the vehicle is in a situation where the vehicle will sway during parking, the operation control unit reports information concerning setting of security to a user.

19 Claims, 36 Drawing Sheets

(1) SIDE TO SIDE AXIAL DIRECTION
(2) BACK LEFT-FRONT RIGHT AXIAL DIRECTION
(3) BACK AND FRONT AXIAL DIRECTION
(4) BACK RIGHT-FRONT LEFT AXIAL DIRECTION

VEHICLE THEFT DETECTION DEVICE

This application is based upon and claims the benefit of priorities from Japanese Patent Application No. 2005-94365 filed on Mar. 29, 2005, Japanese Patent Application No. 2005-271557 filed on Sep. 20, 2005, and Japanese Patent Application No. 2005-271562 filed on Sep. 20, 2005, the entire contents of which are incorporated herein by reference.

BACKGROUND

The invention relates to a vehicle theft detection device for determining whether or not a theft occurs using information from an inclination sensor for detecting inclination of the vehicle or the like and generating an alarm if a theft occurs or if there is a possibility that a theft may occur.

Upon detection of unauthorized door opening, breaking into the vehicle interior, inclination of the vehicle, unauthorized invasion of glass breakage, etc., or its preliminary action during arming (lookout), the vehicle theft detection device generates an alarm or reports occurrence of the unauthorized invasion to a predetermined location in a wireless manner; it is widely commercially practical at present.

The inclination sensor system for detecting inclination of the vehicle uses the fact that the vehicle is unnaturally inclined if an attempt is made to steal a tire or a wheel or the vehicle itself using a jack or a wrecker; if an abnormal inclination occurs, the inclination sensor system actuates an alarm, etc.

To determine the inclination degree of the vehicle, an acceleration sensor is installed in the vehicle. Using the values of the inclination angle and the angular velocity or the signals provided by filtering the values, the difference between the initial inclination angle at the parking start time and the later inclination angle is adopted as a determination index and a comparison is made between the found inclination angle and a predetermined theft detection threshold value, whereby a theft determination is made, as shown in FIG. 20.

On the other hand, if the vehicle is parked in a tower parking lot, the vehicle may sway or may be inclined as a palette in the parking lot moves when the vehicle is put in or goes out of the parking lot; if the vehicle is put on a ferry, the vehicle may be inclined as the ferry sways. Therefore, the inclination sensor system makes an erroneous determination and actuates the alarm; this is a problem. Thus, a system wherein a vehicle theft detection device is provided with a switch for turning of theft detection based on inclination and a multistory parking mode is proposed for the purpose of turning off the function of the inclination sensor in the situation where a vehicle will sway at the parking time, as in a ferry or a tower parking lot (for example, JP 2003-34233 A).

In the foregoing examples, all of the related arts and limitations related thereto are intended to be illustrative and not exclusive. Other limitations of the related arts will become apparent to those skilled in the art on a reading of the specification and a study of the drawings.

SUMMARY

As described above, JP 2003-34233 A discloses the inclination sensor system wherein the switch for turning off the inclination sensor system and the multistory parking mode can be set for preventing a malfunction at the parking time in a ferry, a tower parking lot, etc. In JP 2003-34233 A, however, the vehicle theft detection device cannot autonomously determine the situation of the vehicle for changing to an appropriate detection mode or reporting appropriate setting to the user. Thus, the user needs to make the settings by his or her determination and if the user forgets about changing the setting, a malfunction occurs; this is a problem.

Under these circumstances, the invention has been made and provides a vehicle theft detection device for circumventing erroneous detection of theft (ON determination) for a situation—such as a situation where the vehicle is parked on a ferry or a situation where the vehicle is put on a palette in a tower parking lot—, which should be determined as sway back of the inclination angle of a parked vehicle.

The invention also may provide a vehicle theft detection device that can automatically determine the vehicle situation and can notify the user that setting of an inclination sensor system needs to be changed.

Still further, the invention may provide a vehicle theft detection device that can automatically determine the vehicle situation and can automatically change an inclination sensor system to an appropriate detection mode.

The following embodiments and aspects thereof are described and illustrated in conjunction with systems, tools and methods that are meant to be exemplary and illustrative, and not limiting in scope. In various embodiments, one or more of the above-described problems have been reduced or eliminated, while other embodiments are directed to other improvements.

According to one aspect of the invention, a theft detection device includes an inclination angle sensor, a reference angle setting unit, a relative angle calculation unit, a theft determination unit and an alarm output unit. The inclination angle sensor detects an inclination angle. The reference angle setting unit sets a reference angle based on inclination angle information detected by the inclination angle sensor. The relative angle calculation unit calculates a difference between the reference angle and the detected inclination angle as a relative angle. The theft determination unit make a theft determination based on whether or not the relative angle exceeds a predetermined threshold value. The alarm output unit outputs an alarm based on a determination result of the theft determination unit. If the detected inclination angle shows continuous change, no alarm is output.

According to this configuration, if the current inclination angle of the parked vehicle detected by the inclination angle sensor shows continuous angle change for a long time, it is determined that the vehicle is parked on a ferry or is put on a palette in a tower parking lot, and it is determined that no theft occurs. Accordingly, it is made possible to determine sway back of the inclination angle when the vehicle is parked for circumventing erroneous detection of theft.

The theft detection device may further include an integration unit that integrates the relative angle for predetermined time duration. The theft determination unit may make the theft determination based on whether or not a calculation value resulting from integrating the relative angle by the integration unit exceeds a predetermined threshold value.

According to this configuration, threshold value determination is made using the integral value resulting from integrating the relative angle in predetermined time duration as an index, whereby if the vehicle sways alternately as in a ferry, etc., the integral value does not become large, but if the vehicle is lifted up to one side like jack up, etc., the integral value becomes large, so that it is made possible to separate a ferry, etc., and jack up with high accuracy from the behavior of the integral value.

Also, the inclination angle may be extracted by filtering an output of the inclination angle sensor with a low-pass filter.

According to this configuration, the angle provided by removing a noise component and medium to high frequency components for degrading the separation performance of a ferry, etc., and jack up using a low-pass filter as the current inclination angle, so that more precise relative angle can be detected and it is made possible to enhance the determination performance between inclination change caused by a ferry, etc., and inclination change caused by jack up.

The theft determination unit may continue a determination operation even when the alarm output unit is outputting an alarm.

According to this configuration, even when theft is detected and an alarm is output, the determination operation is continued, so that it is made possible to circumvent a determination mistake of theft and an erroneous alarm.

Also, the threshold value may be changed by performing predetermined operation in a predetermined period after theft detection. The theft determination unit may make the theft determination based on the relative angle and the changed threshold value.

According to this configuration, for example, when the vehicle is parked on a ferry, sway back of the vehicle is not necessarily restored to the former inclination angle as the effect of waves, etc. Thus, the threshold value is changed within a predetermined time after the theft determination and a further theft determination is continuously made based on a determination condition using the changed threshold value, whereby if the vehicle does not sway back to the former inclination angle or if the vehicle sways back beyond the former inclination angle, it can be determined that no theft occurs; it is made possible to prevent an erroneous alarm.

Also, if the detected inclination angle is restored within the reference angle within a predetermined time while the alarm output unit is outputting the alarm, the alarm being output may be canceled.

According to this configuration, when an alarm is output, if the inclination angle of the parked vehicle is restored to the reference angle within a predetermined time, it is determined that no theft occurs and automatically the erroneous alarm is canceled, so that it is made possible to provide the vehicle theft detection device for making highly accurate theft determination.

Also, the inclination angle sensor may detect the inclination angle in each of a plurality of axial directions.

According to this configuration, the inclination angle of the vehicle is detected in each of a plurality of axial directions, so that it is made possible to set security from multiple directions relative to the plane direction and the security performance can be enhanced.

Also, if the theft determination unit determines that theft occurs in at least one axial direction of the inclination angle sensor, the alarm output unit may output the alarm.

According to this configuration, if it is determined that theft occurs in at least one axial direction of the inclination angle sensor, it is determined that theft occurs in other axial directions, and a theft alarm is output, whereby the user can be informed of theft at an early stage and thus it is made possible to prevent theft.

Also, if a determination condition that no theft occurs in at least one axial direction of the inclination angle sensor is satisfied by the theft determination unit, the alarm output unit may cancel the alarm output.

According to this configuration, if it is determined that no theft occurs in at least one axial direction of the inclination angle sensor, it is determined that no theft occurs in other axial directions, and no theft alarm is output. If a theft alarm is being sounded, the theft alarm sound is stopped. Accordingly, it is made possible to automatically prevent erroneous notification at an early stage.

The theft detection device may further include a storage unit that stores a horizontal angle at factory shipment. The reference angle setting unit may set the horizontal angle stored in the storage unit as the reference angle.

According to this configuration, the horizontal angle at factory shipment is stored in memory and the horizontal angle stored in the memory is set as the reference angle, whereby it is made possible to use the inclination angle extremely close to the horizontal state as the reference angle at all times without measuring the reference angle. This is very useful when the reliability of the calculated reference angle is low or when a detection mistake of inclination angle information, etc., occurs, for example.

Also, the reference angle setting unit may set as the reference angle the inclination angle at a time point when the inclination angle sensor is set.

According to this configuration, the inclination angle of the vehicle at the time point when the inclination angle sensor is set as the reference angle, whereby it is made possible to precisely detect how much inclination change has occurred in the parked vehicle since the time point when the vehicle was parked.

Also, the reference angle setting unit may set the reference angle based on the inclination angle detected in a predetermined period after the time point when the inclination angle sensor is set.

According to this configuration, when the reference angle is set, the reference angle is calculated for a while since setting of the inclination angle sensor, whereby the inclination angle information in a stable state after the vehicle is parked and while no theft occurs can be used for the reference angle, and it is made possible to enhance the reliability of the theft determination result.

Also, the reference angle setting unit may set the reference angle based on the inclination angle detected in a predetermined period before the time point when the inclination angle sensor is set.

According to this configuration, the reference angle is previously calculated before the vehicle is parked, whereby security can be started immediately after the vehicle is parked. When the vehicle enters a ferry or a tower parking lot or when the current position of the vehicle is a ferry, a tower parking lot, or a periphery thereof, the possibility that the ground of the parking lot will become unstable is high and therefore the inclination angle detected after the vehicle is parked is not suited for setting the reference angle. Thus, in such a case, the reference angle is previously calculated before the vehicle is parked, whereby it is made possible to make higher-accuracy theft determination.

Also, the inclination angle sensor may be installed in a vehicle to detect the inclination angle of the vehicle. The theft detection device may further include a vehicle navigation system that can transmit and receive data to and from the inclination angle sensor. If the navigation system detects predetermined position information as current position information of the vehicle, the reference angle set by the reference angle setting unit may not be used.

According to this configuration, for example, if the current position of the vehicle in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information detected after the time point when security is set is not suited for setting the reference angle. Thus, in such a case, the setup reference angle is not used, whereby an appropriate reference angle setting responsive to the current position of the vehicle can be made and it is made possible to make higher-accuracy theft determination.

Also, the inclination angle sensor may be installed in a vehicle to detect the inclination angle of the vehicle. The theft detection device may further include a vehicle navigation system that can transmit and receive data to and from the inclination angle sensor. If predetermined position information is set as destination information set in the navigation system, the reference angle set by the reference angle setting unit may not be used.

According to this configuration, for example, if the destination in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information detected after the time point when security is set is not suited for setting the reference angle. Thus, the reference angle is set based on the inclination angle information detected until the vehicle arrives at the destination, whereby appropriate reference angle setting responsive to the parking position of the vehicle can be made and it is made possible to make higher-accuracy theft determination.

Also, the inclination angle sensor may be installed in a vehicle to detect the inclination angle of the vehicle. The theft detection device may further include a vehicle navigation system that can transmit and receive data to and from the inclination angle sensor. If the navigation system detects predetermined position information as current position information of the vehicle, the inclination angle information detected by the inclination angle sensor may not be used to calculate the reference angle.

According to this configuration, for example, if the current position of the vehicle in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information at the current position is not suited for setting the reference angle. Thus, in such a case, the detected inclination angle information is not used to calculate the reference angle, whereby an appropriate reference angle setting responsive to the current position of the vehicle can be made and it is made possible to make higher-accuracy theft determination.

Also, the theft detection device may further include an angular velocity calculation unit that calculates an angular velocity in a predetermined time since the inclination angle information is detected by the inclination angle sensor. If the angular velocity calculated by the angular velocity calculation unit exceeds a predetermined threshold value, the inclination angle information detected by the inclination angle sensor may not be used to calculate the reference angle.

According to this configuration, to adopt the average value of the inclination angles in predetermined time as the reference angle, if the calculated angular velocity exceeds a predetermined threshold value, it is determined that the vehicle is in an unstable state, and processing such that the second one of two pieces of inclination angle information successively acquired in calculating the angular velocity is not used to calculate the reference angle, for example, is performed. Accordingly, the inclination angle information can be used to calculate the reference angle only if the vehicle is in a stable state, so that it is made possible to make higher-accuracy theft determination.

Also, the theft detection device may further include an angular velocity integration unit that integrates an absolute value of the angular velocity calculated by the angular velocity calculation unit. If a calculation value resulting from integrating the absolute value of the angular velocity by the angular velocity integration unit exceeds a predetermined threshold value, the inclination angle information detected by the inclination angle sensor may not be used to calculate the reference angle.

According to this configuration, if the integration quantity of the angular velocities of the vehicle in predetermined time is large, it is determined that the vehicle is in an environment in which vehicle sway, shock, or noise effect is large. Thus, in such a case, it is determined that the vehicle state is not stable or that the reference angle cannot precisely be acquired. Thus, when noise, malfunction, etc., occurs, only the inclination angle information of the stable angular velocity from the determination result of the calculated angular velocity is used to calculate the reference angle, so that it is made possible to make higher-accuracy theft determination.

Also, the theft detection device may further include a reference angle update unit that updates the reference angle set by the reference angle setting unit every predetermined time.

According to this configuration, the inclination change of the parked vehicle may change with the passage of time after the vehicle is parked depending on the parking place of the vehicle. Thus, the reference angle is updated every predetermined time since setting of security, whereby it is made possible to make higher-accuracy theft determination.

Also, the inclination angle sensor may be installed in a vehicle to detect the inclination angle of the vehicle. The theft detection device may further include a passenger detection unit that detects a passenger state, and a reference angle correction unit that corrects the reference angle based on the passenger state detected by the passenger detection unit.

According to this configuration, for example, if a passenger is in the vehicle only on one side thereof, the vehicle is always inclined to the side, but is not inclined after the passenger gets out of the vehicle. Therefore, when a passenger is in the vehicle, if the detected inclination angle is used intact as the reference angle, precise theft determination cannot be made and thus the reference angle is corrected based on the state of the passenger in the vehicle, whereby the appropriate reference angle can be set and it is made possible to make higher-accuracy theft determination.

Also, the reference angle correction unit may correct the reference angle based on a detection result of a physical feature detection unit that detects a physical feature of a passenger.

According to this configuration, the physical features of a passenger in the vehicle are detected and the reference angle is corrected based on the detected physical feature information of the passenger, whereby the appropriate reference angle can be set and it is made possible to make higher-accuracy theft determination.

Also, if the inclination angle sensor is activated from outside of the vehicle, the reference angle correction unit may not correct the reference angle.

According to this configuration, for example, in a vehicle provided with a remote security controller, a remote engine controller, etc., for enabling the inclination angle sensor to be operated even in a situation where no passenger is in the vehicle, if the inclination angle sensor is started from the outside of the vehicle with all doors locked, it is determined that no passenger is in the vehicle and correction of the reference angle depending on the passenger state is not made, whereby it is made possible to shorten the time required for setting the reference angle.

Also, the inclination angle sensor may be installed in a vehicle to detect the inclination angle of the vehicle. The reference angle setting unit may include a first setting method of setting the inclination angle of the vehicle at a time point when the inclination angle sensor is set as the reference angle; a second setting method of setting the reference angle based on the inclination angle of the vehicle detected in a predetermined period after the time point when the inclination angle sensor is set; a third setting method of setting the reference angle based on the inclination angle of the vehicle detected in a predetermined period before the time point when the inclination angle sensor is set; and a fourth setting method of setting a horizontal angle at factory shipment as the reference angle. The reference angle setting unit may be able to select any of the first to fourth setting methods.

According to this configuration, the vehicle theft detection device is provided with one of reference angle setting methods, whereby the reference angle calculated in response to the vehicle situation is selected and the optimum reference angle can be set, so that it is made possible to make higher-accuracy theft determination.

Also, the theft detection device may further include a determination unit that determines whether or not the reference angle set by any of the first to third setting methods is suited for setting the reference angle based on a difference between the reference angle set by any of the first to third setting methods of the reference angle setting unit and the reference angle set by the fourth setting method of the reference angle setting unit. The reference angle may be set based on a determination result of the determination unit.

According to this configuration, if the difference between the horizontal angle at factory shipment and the acquired reference angle is large, an acquisition mistake of the reference angle occurs or the vehicle is abnormally inclined and it is considered that the reliability of the acquired reference angle is low. Thus, in such a case, the reference angle is not used in security setting, whereby it is made possible to make higher-accuracy theft determination.

Also, the theft detection device may further include a vehicle navigation system that can transmit and receive data to and from the inclination angle sensor. If the navigation system detects predetermined position information as current position information of the vehicle, the reference angle set by the first or second setting method may not be used.

According to this configuration, for example, if the current position of the vehicle in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information detected after the time point when security is set is not suited for setting the reference angle. Thus, in such a case, the setup reference angle is not used, whereby appropriate reference angle setting responsive to the current position of the vehicle can be made and it is made possible to make higher-accuracy theft determination.

Also, the theft detection device may further include a vehicle navigation system that can transmit and receive data to and from the inclination angle sensor. If predetermined position information is set as destination information in the navigation system, the reference angle set by the first or second setting method may not be used.

According to this configuration, for example, if the destination in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information detected after the time point when security is set is not suited for setting the reference angle. Thus, the reference angle is set based on the inclination angle information detected until the vehicle arrives at the destination, whereby appropriate reference angle setting responsive to the parking position of the vehicle can be made and it is made possible to make higher-accuracy theft determination.

Also, the theft detection device may further include a vehicle navigation system that can transmit and receive data to and from the inclination angle sensor. If the navigation system detects predetermined position information as current position information of the vehicle, the inclination angle information detected by the inclination angle sensor may not be used to calculate the reference angle.

According to this configuration, for example, if the current position of the vehicle in the position information detected by the navigation system is a location where the vehicle can sway such as a ship, a ferry terminal, or a tower parking lot registered in the map information of the navigation system or is a location within a given distance from the registered location, the possibility that the vehicle may be in an unstable state is high and it is determined that the inclination angle information at the current position is not suited for setting the reference angle. Thus, in such a case, the detected inclination angle information is not used to calculate the reference angle, whereby an appropriate reference angle setting responsive to the current position of the vehicle can be made and it is made possible to make higher-accuracy theft determination.

Also, the theft detection device further include an angular velocity calculation unit that calculates an angular velocity in predetermined time since the inclination angle information is detected by the inclination angle sensor. If the angular velocity calculated by the angular velocity calculation unit exceeds a predetermined threshold value, the inclination angle information detected by the inclination angle sensor may not be used to calculate the reference angle.

According to this configuration, to adopt the average value of the inclination angles in predetermined time as the reference angle, if the calculated angular velocity exceeds a predetermined threshold value, it is determined that the vehicle is in an unstable state, and processing such that the second one of two pieces of inclination angle information successively acquired in calculating the angular velocity is not used to calculate the reference angle, for example, is performed. Accordingly, the inclination angle information can be used to calculate the reference angle only if the vehicle is in a stable state, so that it is made possible to make higher-accuracy theft determination.

Also, the theft detection device may further include an angular velocity integration unit that integrates an absolute value of the angular velocity calculated by the angular velocity calculation unit. If a calculation value resulting from integrating the absolute value of the angular velocity by the angular velocity integration unit exceeds a predetermined threshold value, the inclination angle information detected by the inclination angle sensor may not be used to calculate the reference angle.

According to this configuration, if the integration quantity of the angular velocities of the vehicle in predetermined time is large, it is determined that the vehicle is in an environment in which vehicle sway, shock, or noise effect is large. Thus, in such a case, it is determined that the vehicle state is not stable or that the reference angle cannot precisely be acquired. Thus, when noise, malfunction, etc., occurs, only the inclination angle information of the stable angular velocity from the determination result of the calculated angular velocity is used to calculate the reference angle, so that it is made possible to make higher-accuracy theft determination.

Also, the theft detection device may further include a reference angle update unit that updates the reference angle set by the reference angle setting unit every predetermined time.

According to this configuration, the inclination change of the parked vehicle may change with the passage of time after the vehicle is parked depending on the parking place of the vehicle. Thus, the reference angle is updated every predetermined time since setting of security, whereby it is made possible to make higher-accuracy theft determination.

Also, the theft detection device may further include a passenger detection unit that detects a passenger state, and a reference angle correction unit that corrects the reference angle based on the passenger state detected by the passenger detection unit.

According to this configuration, for example, if a passenger is in the vehicle only on one side thereof, the vehicle is always inclined to the side, but is not inclined after the passenger gets out of the vehicle. Therefore, when a passenger is in the vehicle, if the detected inclination angle is used intact as the reference angle, precise theft determination cannot be made and thus the reference angle needs to be corrected based on the state of the passenger in the vehicle. Accordingly, the appropriate reference angle can be set and it is made possible to make higher-accuracy theft determination.

Also, the reference angle correction unit may correct the reference angle based on a detection result of a physical feature detection unit that detects a physical feature of a passenger.

According to this configuration, the physical features of a passenger in the vehicle are detected and the reference angle is corrected based on the detected physical feature information of the passenger, whereby the appropriate reference angle can be set and it is made possible to make higher-accuracy theft determination.

Also, if the inclination angle sensor is activated from outside of the vehicle, the reference angle correction unit may not correct the reference angle.

According to this configuration, for example, in a vehicle provided with a remote security controller, a remote engine controller, etc., for enabling the inclination angle sensor to be operated even in a situation where no passenger is in the vehicle, if the inclination angle sensor is started from the outside of the vehicle with all doors locked, it is determined that no passenger is in the vehicle and correction of the reference angle depending on the passenger state is not made, whereby it is made possible to shorten the time required for setting the reference angle.

According to another aspect of the invention, a vehicle theft detection device includes an inclination detection unit and an operation control unit. The inclination detection unit detects an inclination of a vehicle. The operation control unit detects theft using an output of the inclination detection unit. If it is determined that the vehicle is in a situation where the vehicle will sway during parking, the operation control unit reports information concerning setting of security to a user.

Also, after the user sets the security, if it is determined that the vehicle is in the situation where the vehicle will sway, the operation control unit may notify the user that the setting of the security needs to be changed.

Also, when the user does not set the security, if it is determined that the vehicle is in the situation where the vehicle will sway, the operation control unit may report the information concerning the setting of the security to the user.

According to these configurations, when the vehicle is in a situation where the vehicle will sway during parking, a notification concerning security setting is made for the user, for example, by producing screen display in the navigation system, by voice, by mail, or by communicating with a security remote control, so that the user can recognize the necessity for changing the setting of the inclination sensor system and, for example, can release theft detection based on output of the inclination detection unit.

Also, the operation control unit may acquire a vehicle position just before an ignition is turned off from navigation information and determines whether or not the vehicle is in the situation where the vehicle will sway based on the acquired vehicle position.

Also, if a destination of navigation is set to a parking lot where the vehicle will sway and the vehicle arrives at the destination, the operation control unit may determine that the vehicle is in the situation where the vehicle will sway.

Also, if a ship is contained in the route to a destination of navigation and the vehicle arrives at a port, the operation control unit may determine that the vehicle is in the situation where the vehicle will sway.

According to these configurations, whether or not the vehicle is in a situation where the vehicle will sway during parking is determined according to navigation information, for example, the current position or the destination of the vehicle, so that whether or not the vehicle is in a situation where the vehicle will sway during parking as in a parking lot of indoor move type, a ferry, etc., can be determined easily.

Also, if illuminance changes in the vehicle in a predetermined time before the vehicle is parked is equal to or greater than a threshold value, the operation control unit may determine that the vehicle is in the situation where the vehicle will sway.

Also, if illuminance change in the vehicle in a predetermined time after the vehicle is parked is equal to or greater than a threshold value, the operation control unit may determine that the vehicle is in the situation where the vehicle will sway.

According to these configurations, if illuminance change in the vehicle in a predetermined time before or after the vehicle is parked is equal to or greater than a threshold value, it is determined that the vehicle is parked in a parking lot of indoor move type, a ferry, etc., so that whether or not the vehicle is in a situation where the vehicle will sway during parking can be determined easily.

Also, if the inclination angle of the vehicle in a predetermined time before the vehicle is parked is equal to or greater than a threshold value, the operation control unit may determine that the vehicle is in the situation where the vehicle will sway.

Also, if an inclination angular velocity of the vehicle in predetermined time before the vehicle is parked is equal to or greater than a threshold value, the operation control unit may determine that the vehicle is in the situation where the vehicle will sway.

Also, if the inclination angle of the vehicle in predetermined time after the vehicle is parked is equal to or greater than a threshold value, the operation control unit may determine that the vehicle is in the situation where the vehicle will sway.

Also, if an inclination angular velocity of the vehicle in predetermined time after the vehicle is parked is equal to or greater than a threshold value, the operation control unit may determine that the vehicle is in the situation where the vehicle will sway.

According to these configurations, if the inclination angle of the vehicle in predetermined time before or after the vehicle is parked is equal to or greater than a threshold value or if the inclination angular velocity of the vehicle in predetermined time before or after the vehicle is parked is equal to or greater than a threshold value, it is determined that the vehicle is in a situation where the vehicle will sway, so that it is made possible to determine whether or not the vehicle is in a situation where the vehicle will sway during parking according only to output of the inclination sensor.

Also, if the inclination angle of the vehicle in predetermined time after the security is set is equal to or greater than a threshold value, the operation control unit may determine that the vehicle is in the situation where the vehicle will sway.

Also, if an inclination angular velocity of the vehicle in predetermined time after the security is set is equal to or greater than a threshold value, the operation control unit may determine that the vehicle is in the situation where the vehicle will sway.

According to these configurations, if the inclination angle or the inclination angular angle of the vehicle in predetermined time after the security is set is equal to or greater than a threshold value, it is determined that the vehicle is in a situation where the vehicle will sway, so that it is made possible to determine whether or not the vehicle is in a situation where the vehicle will sway during parking according only to output of the inclination sensor.

According to further another aspect of the invention, a vehicle theft detection device includes an inclination detection unit and an operation control unit. The inclination detection unit detects an inclination of a vehicle. The operation control unit detects theft using an output of the inclination detection unit. When the operation control unit is set to a theft detection mode based on output of the inclination detection unit, if the operation control unit determines that the vehicle is in a situation where the vehicle will sway during parking, the operation control unit releases the theft detection based on an output of the inclination detection unit.

According to a still another aspect of the invention, a vehicle theft detection device includes an inclination detection unit and an operation control unit. The inclination detection unit detects an inclination of a vehicle. The operation control unit detects theft using an output of the inclination detection unit. If the operation control unit determines that the vehicle is in a situation where the vehicle will sway during parking, the operation control unit changes filtering for an output of the inclination detection unit used for theft detection.

According to a still another aspect of the invention, a vehicle theft detection device includes an inclination detection unit and an operation control unit. The inclination detection unit detects an inclination of a vehicle. The operation control unit detects theft using an output of the inclination detection unit. If the operation control unit determines that the vehicle is in a situation where the vehicle will sway during parking, the operation control unit changes a threshold value of theft detection based on an output of the inclination detection unit to a higher value.

According to a still another aspect of the invention, a vehicle theft detection device includes an inclination detection unit and an operation control unit. The inclination detection unit detects an inclination of a vehicle. The operation control unit detects theft using an output of the inclination detection unit. If the operation control unit determines that the vehicle is in a situation where the vehicle will sway during parking, the operation control unit changes determination logic for theft detection based on an output of the inclination detection unit to a higher value.

According to these configurations, when the vehicle is in a situation where the vehicle will sway during parking, the setting of the inclination sensor system is automatically changed, for example, theft detection based on output of the inclination detection unit is automatically released, filtering for inclination detection output used for theft detection is changed, the theft detection threshold value is changed to a higher value, or the determination logic for theft detection based on inclination detection output is changed, so that when the vehicle is in a situation where the vehicle will sway during parking as in a parking lot of indoor move type, a ferry, etc., the malfunction of the inclination sensor system can be prevented.

Also, if setting of the theft detection mode is changed, the operation control unit notifies a user that the setting of the theft detection mode may be changed.

According to this configuration, if setting of the theft detection is changed, the user is notified that setting of the theft detection is changed, for example, by producing a screen display in the navigation system, by voice, by mail, or by communicating with a security remote control, so that the user can easily recognize that setting of the theft detection is changed.

Also, the operation control unit may acquire a vehicle position just before an ignition is turned off from navigation information and determine whether or not the vehicle is in a situation where the vehicle will sway based on the acquired vehicle position.

Also, if a destination of navigation is set to a parking lot where the vehicle will sway and the vehicle arrives at the destination, the operation control unit may determine that the vehicle is in the situation where the vehicle will sway.

Also, if a ship is contained in a route to a destination of navigation and the vehicle arrives at a port, the operation control unit may determine that the vehicle is in the situation where the vehicle will sway.

Further, according to these configurations, whether or not the vehicle is in a situation where the vehicle will sway during parking is determined according to navigation information, for example, the current position or the destination of the vehicle, so that whether or not the vehicle is in a situation where the vehicle will sway during parking as in a parking lot of indoor move type, a ferry, etc., can be determined easily.

Also, the vehicle theft detection device may further include an illumination detection unit that detects illuminance in the vehicle. If illuminance change in the vehicle in predetermined time before the vehicle is parked is equal to or greater than a threshold value, the operation control unit may determine that the vehicle is in the situation where the vehicle will sway.

Also, the vehicle theft detection device may further include an illumination detection unit that detects illuminance in the vehicle. If illuminance change in the vehicle in predetermined time after the vehicle is parked is equal to or greater than a threshold value, the operation control unit may determine that the vehicle is in the situation where the vehicle will sway.

According to these configurations, if illuminance change in the vehicle in a predetermined time before or after the vehicle is parked is equal to or greater than a threshold value, it is determined that the vehicle is parked in a parking lot of indoor move type, a ferry, etc., so that whether or not the vehicle is in a situation where the vehicle will sway during parking can be determined easily.

Also, if the inclination angle of the vehicle in predetermined time before the vehicle is parked is equal to or greater than a threshold value, the operation control unit may determine that the vehicle is in the situation where the vehicle will sway.

Also, if an inclination angular velocity of the vehicle in predetermined time before the vehicle is parked is equal to or greater than a threshold value, the operation control unit may determine that the vehicle is in the situation where the vehicle will sway.

Also, if the inclination angle of the vehicle in predetermined time after the vehicle is parked is equal to or greater than a threshold value, the operation control unit may determine that the vehicle is in the situation where the vehicle will sway.

Also, if the inclination angular velocity of the vehicle in predetermined time after the vehicle is parked is equal to or greater than a threshold value, the operation control unit may determine that the vehicle is in the situation where the vehicle will sway.

Further, according to these configurations, if the inclination angle of the vehicle in predetermined time before or after the vehicle is parked is equal to or greater than a threshold value or if the inclination angular velocity of the vehicle in predetermined time before or after the vehicle is parked is equal to or greater than a threshold value, it is determined that sway is caused by a palette in a parking lot or a ferry and that the vehicle is in a situation where the vehicle will sway during parking, so that it is made possible to determine whether or not the vehicle is in a situation where the vehicle will sway during parking according only to output of the inclination sensor.

Also, if the inclination angle of the vehicle in predetermined time after the security is set is equal to or greater than a threshold value, the operation control unit may determine that the vehicle is in the situation where the vehicle will sway.

Also, if the inclination angular velocity of the vehicle in predetermined time after the security is set is equal to or greater than a threshold value, the operation control unit may determine that the vehicle is in the situation where the vehicle will sway.

According to these configurations, if the inclination angle or the inclination angular angle of the vehicle in predetermined time after the security is set is equal to or greater than a threshold value, it is determined that the vehicle is in a situation where the vehicle will sway, so that it is made possible to determine whether or not the vehicle is in a situation where the vehicle will sway during parking according only to output of the inclination sensor.

In addition to the exemplary aspects and embodiments described above, further aspects and embodiments will become apparent by reference to the drawings and by study of the following descriptions.

DETAILED DESCRIPTION OF EMBODIMENTS

First Embodiment

Figure 1:
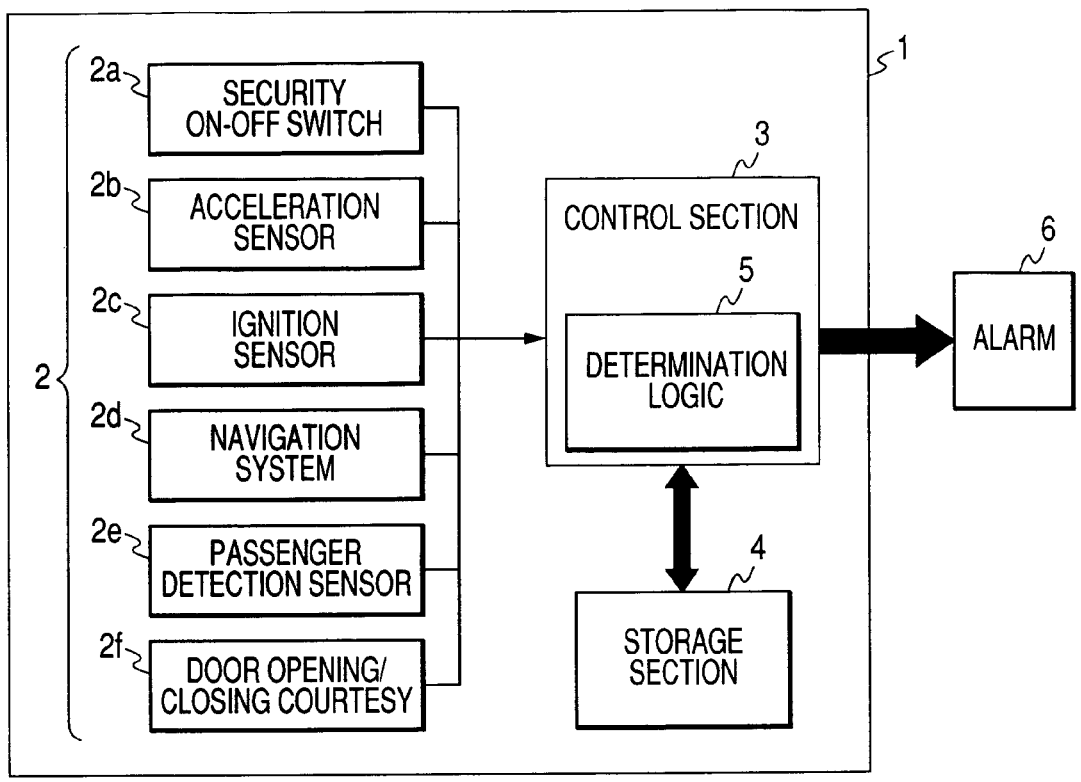
FIG. 1 is a block diagram to show the schematic configuration of a vehicle theft detection device for making a theft determination according to a first embodiment of the invention.

Referring now to the accompanying drawings, there is shown a first embodiment of the invention. FIG. 1 is a block diagram to show the configuration of a vehicle theft detection device according to the first embodiment containing an inclination angle sensor system ECU. In FIG. 1, the vehicle theft detection device includes various sensors 2, a control section 3, a storage section 4, a determination logic 5, and an alarm 6. The various sensors 2 detect acceleration of a vehicle, security ON-OFF state, etc. The control section 3 performs operations on the signals detected by the various sensors 2 and performs output control of the alarm 6 and the like. The storage section 4 stores the signals detected by the various sensors 2 and/or the operation result of the control section 3. The determination logic 5 is included in the control section 3 and makes a theft determination based on the signals detected by the various sensors 2, the operation result of the control section 3, and the like. The alarm 6 outputs an alarm based on the determination result of the determination logic 5.

The various sensors 2 have a security ON-OFF switch 2*a*, an acceleration sensor 2*b*, an ignition sensor 2*c*, a navigation system 2*d*, a passenger detection sensor 2*e*, and a door opening/closing courtesy sensor 2*f*, for example. The security ON-OFF switch 2*a* detects the ON-OFF state of security setting. The acceleration sensor 2*b* detects acceleration of the vehicle. The ignition sensor 2*c* detects engine starting. The navigation system 2*d* detects position information of the current position of the vehicle, the destination, etc. The passenger detection sensor 2*e* detects the passenger state with a load sensor in a seat face, a camera, etc. The door opening/closing courtesy sensor 2*f* detects the door open/closed state. The acceleration sensor 2*b* is a sensor capable of measuring acceleration installed in a vehicle such as electrostatic capacity, piezoresistance, etc. The acceleration sensor 2*b* incorporates a hard filter for lessening the effect of noise. For example, horn sounding, voice warning from a loudspeaker, and turning on or blinking a hazard lamp, a head lamp, a tail lamp, etc., can be named as the alarm 6.

The control section 3 performs operations on the signals detected by the various sensors 2 and sets a theft determination condition. For example, the control section 3 sets theft determination required/not required based on a security setting ON-OFF signal from the security ON-OFF switch 2*a*. It calculates the inclination angle based on the acceleration detected by the acceleration sensor 2*b*. The control section 3 uses the calculated inclination angle to set the reference angle and make threshold determination of theft presence or absence. It sets security based on detection of ignition OFF state by the ignition sensor 2*c*. The control section 3 detects the circumferential environment of the current position of the vehicle, the destination, etc., based on the signal of the navigation system 2*d*, and uses the detected circumferential environment to set a theft determination condition. The signal of the passenger detection sensor 2*e* contains information indicating distinction of the passenger state, the physical features, gender, etc., obtained from the seat load, the seat back rest load, the sheet position, and a camera image, for example. The control section 3 corrects the reference angle based on the information. The signal of the door opening/closing courtesy sensor 2*f* contains information as to whether or not all doors are locked. The control section 3 determines whether or not a passenger is in the vehicle based on the information and corrects the reference angle.

The storage section 4 stores the reference angle calculated by the control section 3, the circumferential information of the vehicle detected by the navigation system 2*d*, various pieces of information of the passenger detected by the passenger detection sensor 2*e*, and the like and keeps the information readable at all times.

The determination logic 5 can not only make a theft determination, but also determine whether or not the detected inclination angle information is suited for use to set the reference angle and determine whether or not the setup reference angle is suited for use to make a theft determination.

Figure 2:
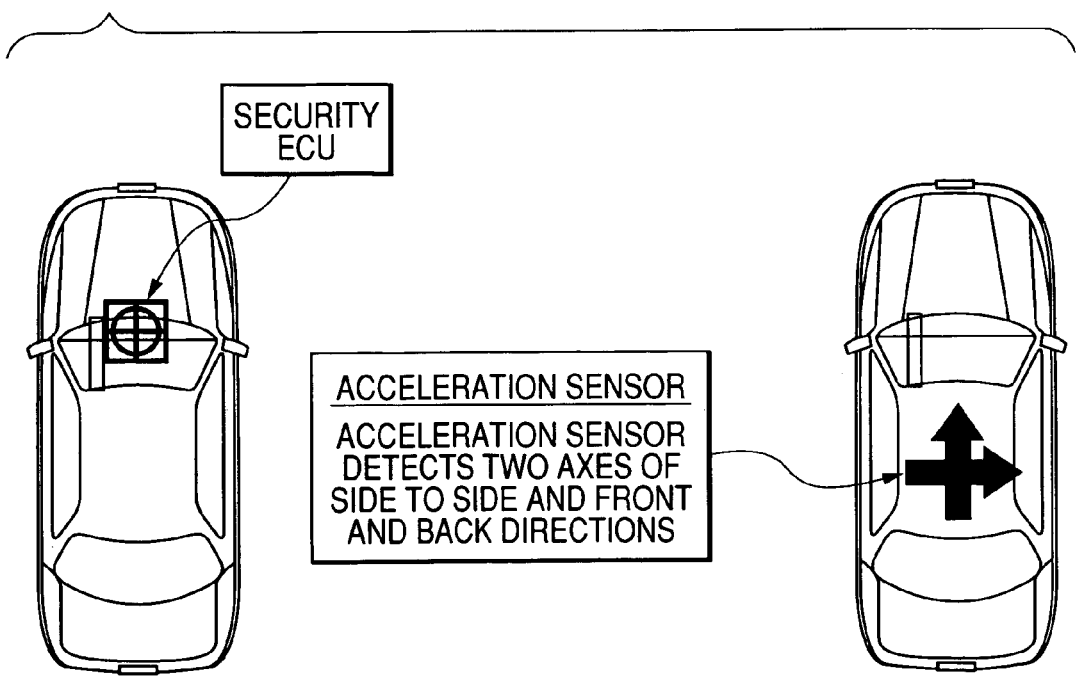
FIG. 2 is a drawing to show axial directions of an acceleration sensor according to the first embodiment of the invention.

The acceleration sensor 2*b* according to the first embodiment detects two axes of side to side and front and back directions, as shown in FIG. 2. For example, when the vehicle is parked on a slope and the security sensor is set to ON, unless the reference angle (offset angle) is correctly learnt and updated, if the vehicle is jacked up, it cannot be detected. However, it is difficult to acquire the reference angle in all directions of the vehicle horizontal plane. Thus, the control section 3 calculates the reference angle relative to the direction used for determination (each axial direction) and makes a vehicle theft determination in the direction.

Figure 3:
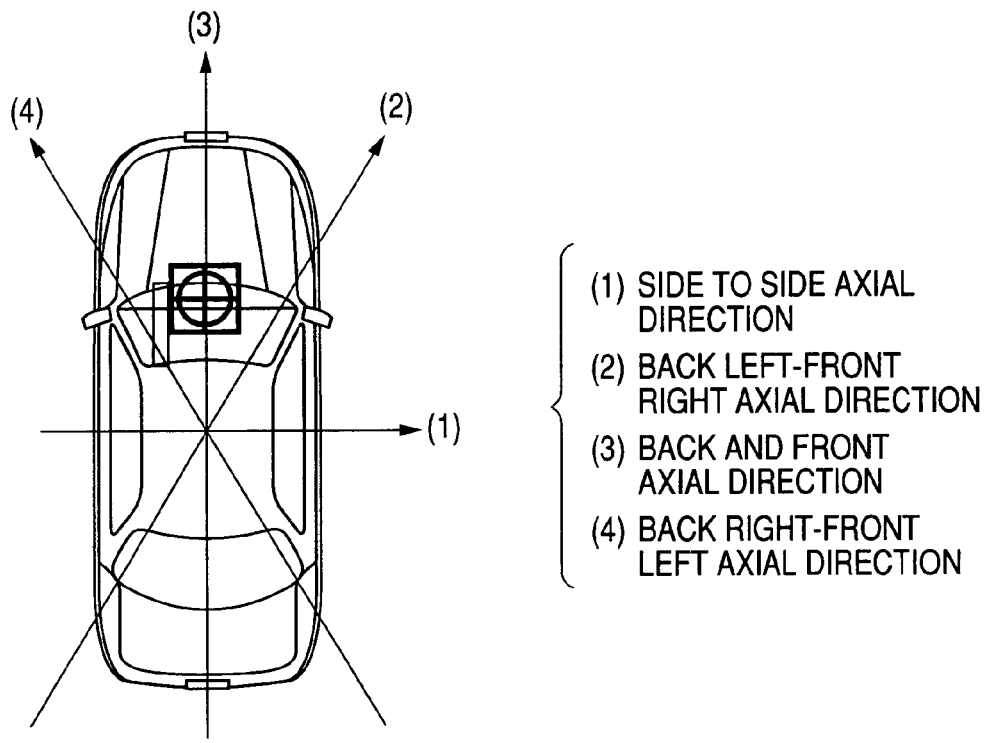
FIG. 3 is a drawing to show a plurality of axial directions of the acceleration sensor according to the first embodiment of the invention.
Figure 4:
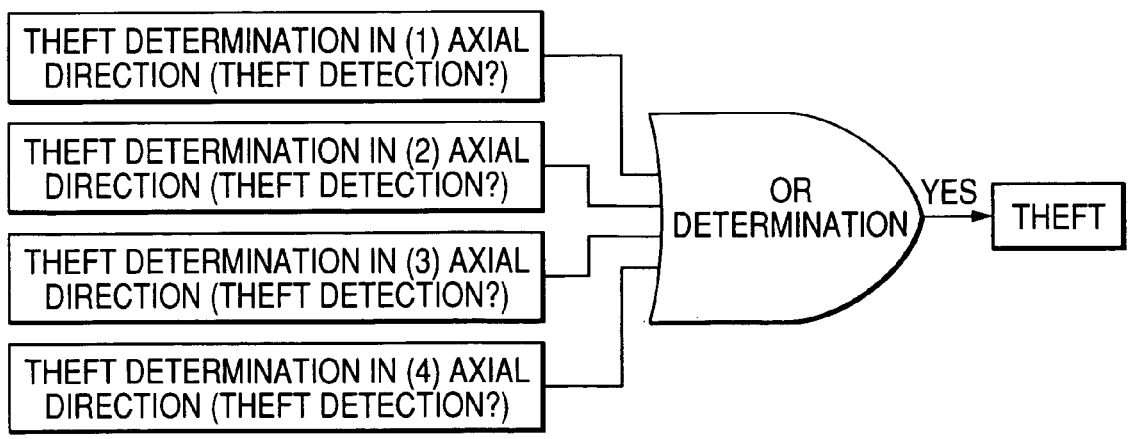
FIG. 4 is a system chart to show a theft determination according to the first embodiment of the invention.

In the embodiment, the acceleration sensor in FIG. 2 separately detects the two axes of side to side and front and back directions. However, the acceleration sensor may not be installed on the vehicle horizontal plane at least on two non-parallel axes. If a plurality of axial directions exist, when a vehicle theft determination is made on four axes (front and back, side to side, front right-back left wheel diagonal direction, and front left-back right wheel diagonal direction), for example, as shown in FIG. 3, the vehicle theft determination is made separately in each axial direction. At the time, if a theft is determined at least in one axial direction, a theft is determined in other axial directions (see. FIG. 4).

Figure 5:
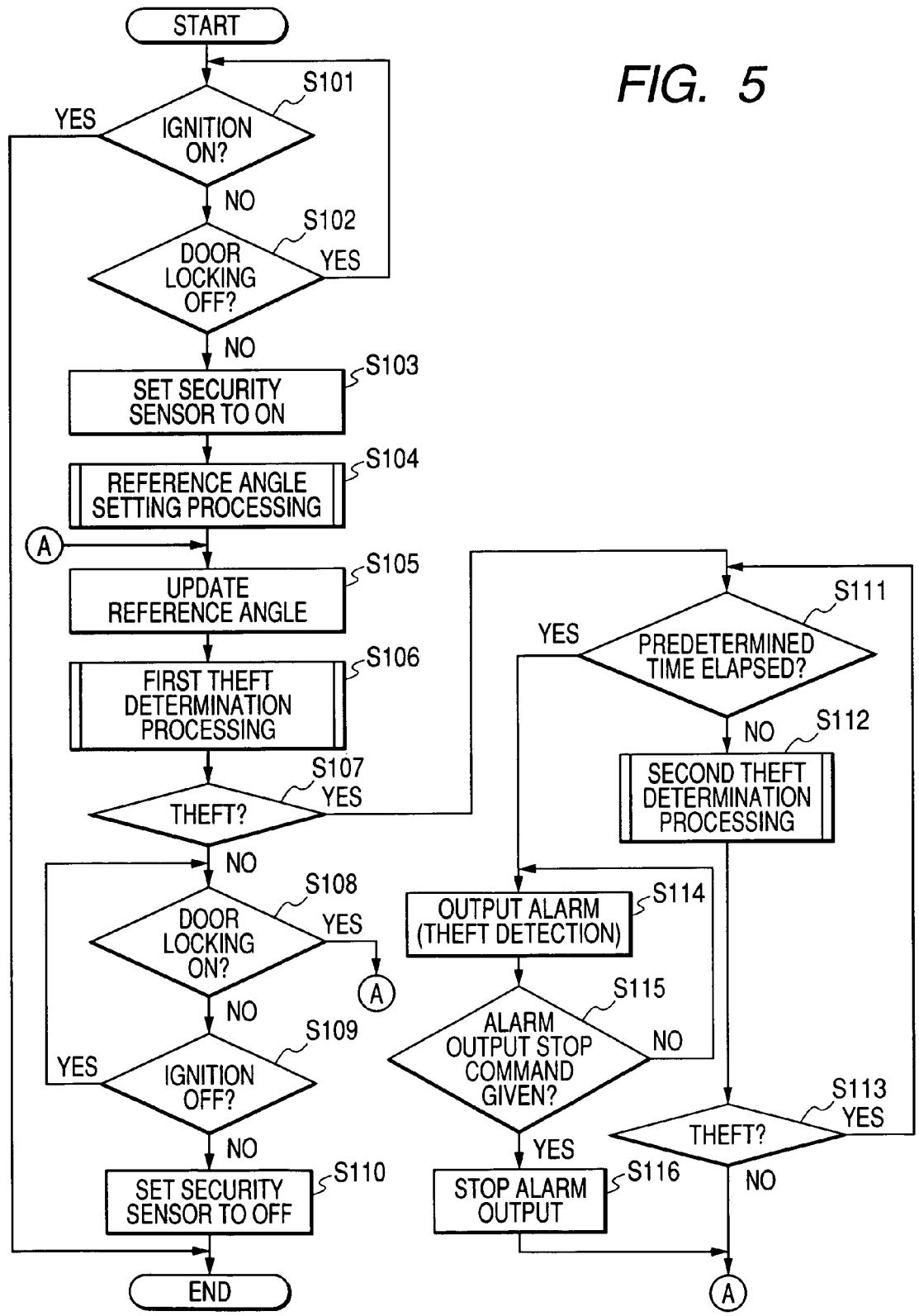
FIG. 5 is a flowchart about a theft determination according to the first embodiment of the invention.

FIG. 5 is a flowchart about a theft determination. Usually, after the vehicle is parked and the passenger gets out of the vehicle, the security sensor is set. Thus, first whether or not the vehicle is in an ignition ON state is determined (S101). If it is determined that the vehicle is in the ignition ON state (YES at S101), the security sensor is not set and the processing is terminated; otherwise (NO at S101), whether or not door locking is OFF is determined (S102). If it is determined that door locking is OFF (YES at S102), it is determined that the passenger is still in the vehicle or exists at least on the periphery of the vehicle. Then, the driver does not necessarily park the vehicle and there is a possibility that the driver may again start the engine to start running the vehicle and thus the process returns to S101. If the door locking is not OFF (NO at S102), it is determined that the passenger gets out of the vehicle, and the security sensor is set to ON (S103).

When the security sensor is set to ON, setting processing of the reference angle used for theft determination processing is performed (S104). If there is a possibility that the reliability of the setup reference angle may be low, for example, as the vehicle is parked on the muddy ground, etc., and the ground under one tire falls with the passage of time, the reference angle is updated (S105).

Next, first theft determination processing is performed (S106) based on the calculated relative angle and a predetermined determination condition. (The first theft determination processing is described later in detail.) If it is determined that a theft does not occur based on the determination result of the first theft determination processing (NO at S107), whether or not door locking is ON is determined (S108). If it is determined that the door locking is ON (YES at S108), it is determined that the passenger does not return to the parked vehicle, the reference angle is updated (S105), etc., and again the security state is continued. On the other hand, if it is determined that the door locking is not ON (NO at S108), it is determined that the passenger returns to the parked vehicle and unlocks the doors, and the process goes to S109 for determining whether or not the ignition is OFF. If it is determined that the ignition is OFF (YES at S109), the vehicle is still parked and the vehicle does not necessarily enter a run state and therefore the process returns to S108 for determining whether or not door locking is ON. If it is determined that the ignition is not OFF (NO at S109), it is determined that the vehicle is about to run and the security sensor is set to OFF (S110) and the processing is terminated.

On the other hand, even if it is determined that a theft occurs based on the determination result of the first theft determination processing (YES at S107), a theft does not necessarily occur, for example, as the vehicle is put on a ferry or a palette in a tower parking lot. Thus, second theft determination is continued for predetermined time since the determination of a theft.

Next, if it is not determined at S111 that predetermined time has elapsed (NO), second theft determination processing is performed (S112). If it is determined that a theft does not occur based on the determination result of the second theft determination processing (NO at S113), it is determined that the vehicle is in a state other than theft as the vehicle is put on a ferry or a palette in a tower parking lot, S105 for updating the reference angle and the later steps are executed, and again the usual security state is continued.

On the other hand, if it is again determined that a theft occurs (YES at S113), namely, if the determination of theft is continued, the process returns to S111 for determining whether or not predetermined time has elapsed and the second theft determination processing is repeated until the predetermined time has elapsed. After the expiration of the predetermined time since the determination of theft, it is determined that the vehicle is stolen, and a theft alarm is output (S114). The alarm output is continued until execution of theft alarm stop processing (S115) as the passenger returns to the vehicle and issues an alarm output stop command, etc. When an alarm output stop command is issued, the alarm output is stopped (S116) and S105 for updating the reference angle and the later steps are executed, and again the usual security state is continued.

Figure 6:
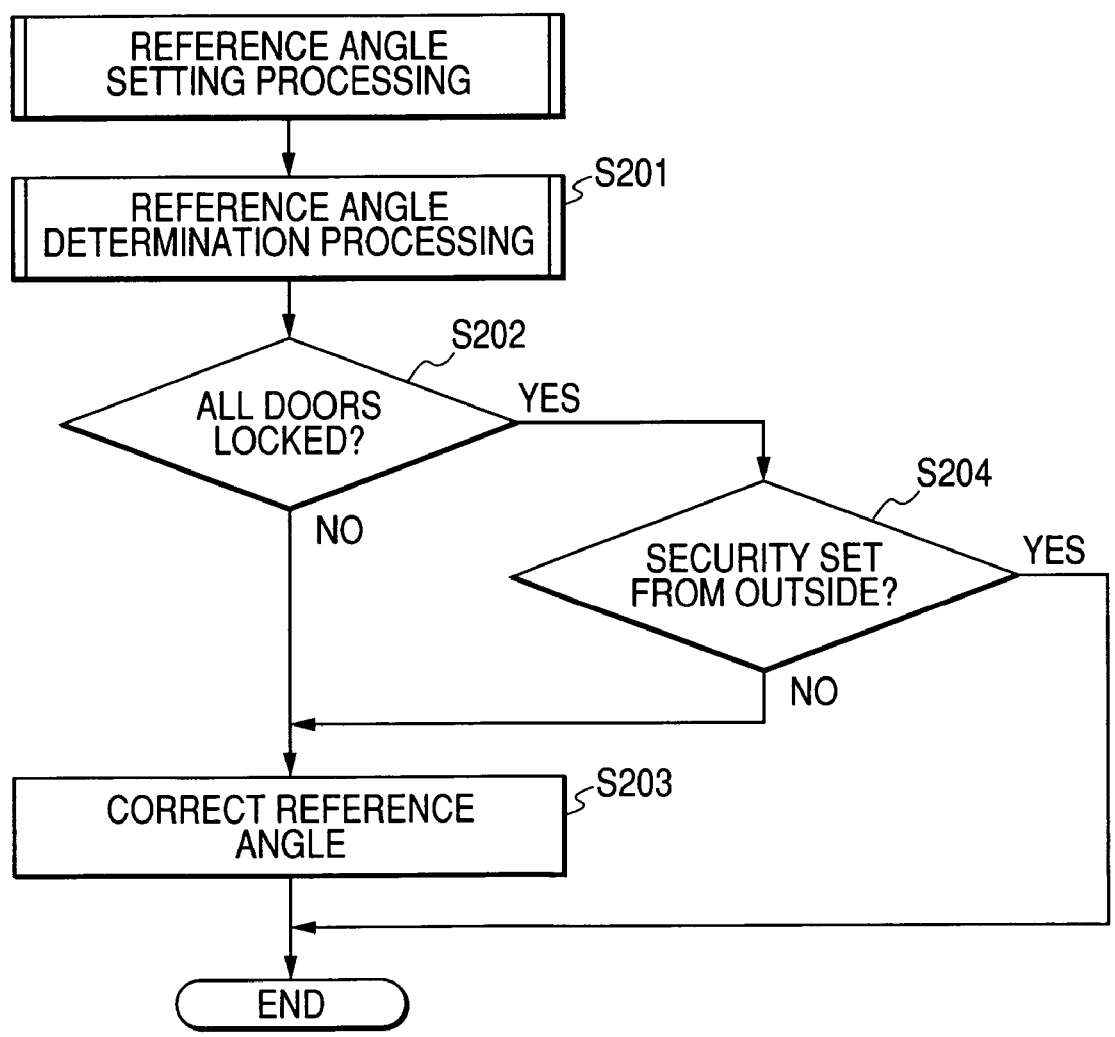
FIG. 6 is a flowchart about "reference angle setting processing" in FIG. 5 according to the first embodiment of the invention.

FIG. 6 is a flowchart about the "reference angle setting processing" in FIG. 5. First, a reference angle setting method (see FIGS. 7 to 11) is determined and the optimum reference angle for the vehicle parking state is determined from among the reference angles set at factory shipment in reference angle determination processing (S201). (The reference angle determination processing is described later in detail.) Upon completion of setting the reference angle, whether or not all doors of the vehicle are locked is determined based on the signal from the door opening/closing courtesy sensor 2*f*, etc., (S202). If at least one door is not locked (NO at S202), it is determined that a passenger is in the vehicle, and the reference angle is corrected (S203). Although all doors are locked (YES at S202), if the security sensor is not set from the outside (NO at S204), it is also determined that a passenger is in the vehicle with all doors locked, and the reference angle is corrected (S203). On the other hand, if all doors are locked (YES at S202) and the security sensor is set from the outside (YES at S204), it is determined that a passenger is out of the vehicle, S203 for correcting the reference angle is skipped, and the routine is exited.

In correcting the reference angle according to the first embodiment, when a passenger is in the vehicle, the vehicle inclination angle is corrected. Thus, if it is determined that no passenger is in the vehicle, the reference angle is not corrected.

For the correction method of the reference angle according to the first embodiment, for example, the height and weight are recognized based on the seat load and the seat back rest load, the gender is recognized based on the sheet position, and the passenger is recognized based on the camera image for distinction between passenger and no passenger, between male and female, between adult, child, and infant, etc. A table value as to how much the vehicle is inclined based on the passenger information is stored in memory and the reference angle is corrected from the table value.

The correction method of the reference angle is not limited to the described correction method; in another embodiment, the correction value may be calculated by performing operations from the weight and gender of each passenger, the number of passengers, etc. without referencing the table value for each correction.

In vehicle security setting, the circumferential environment of the vehicle always changes from one location to another. Thus, use of the reference angle calculated by the same reference angle setting method at all times is not preferred; the security performance and reliability can be degraded in some cases.

Then, in the first embodiment, the reference angle setting method most suited to the circumferential environment of the vehicle is determined from among reference angle setting methods based on various conditions.

Figure 7:
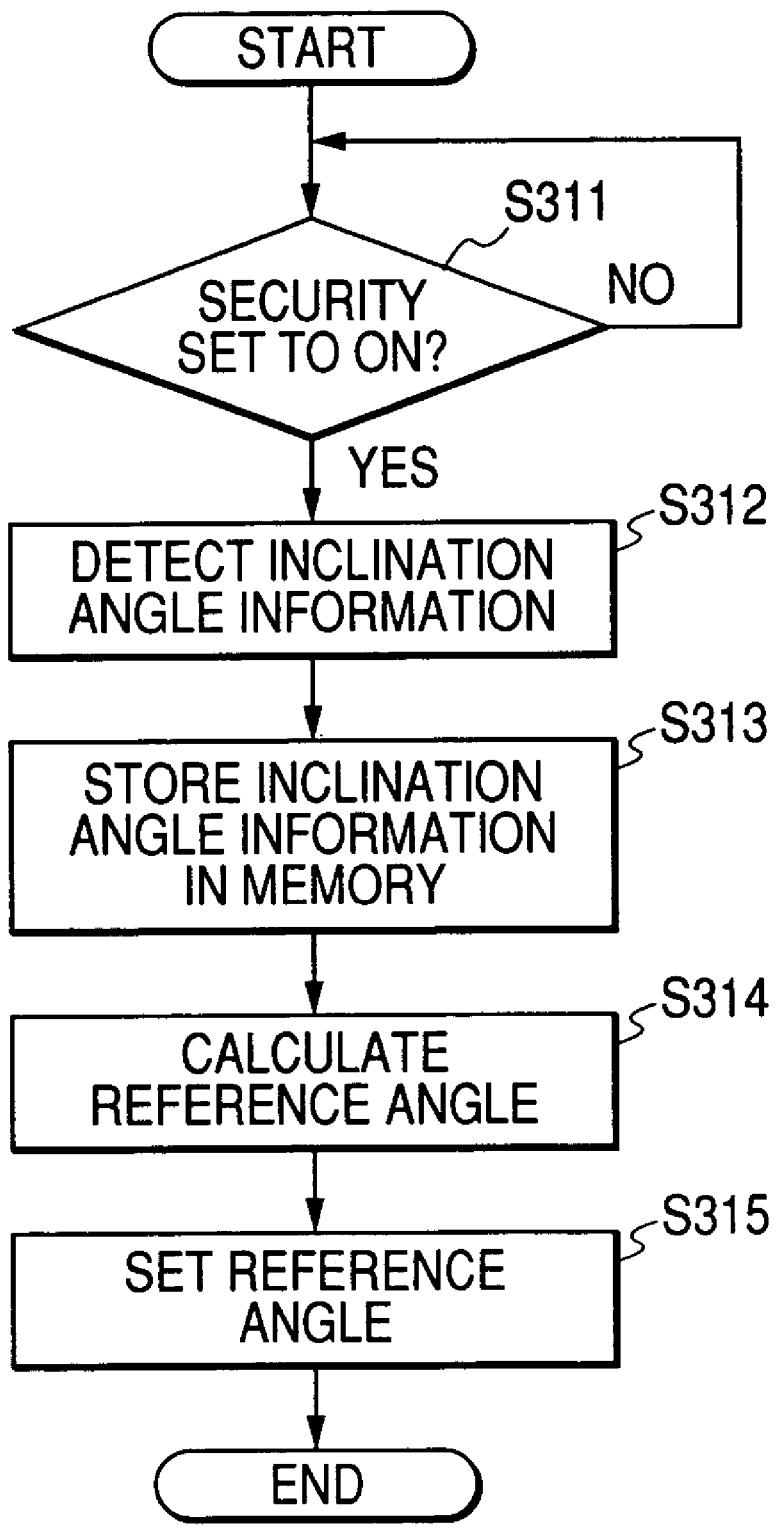
FIG. 7 is a flowchart of a first reference angle setting method according to the first embodiment of the invention.

FIG. 7 is a flowchart of a first reference angle setting method according to the embodiment. The first reference angle setting method is applied for setting the reference angle based on inclination angle information of the vehicle at the time point when security is set. In the first reference angle setting method, calculating the reference angle is started when the security is set to ON. Thus, if the security is not set to ON, calculating the reference angle is not started until it is determined that the security is ON. When it is determined that the security is set to ON (YES at S311), inclination angle information is detected based on an acceleration signal provided by the acceleration sensor 2b (S312) and the detected inclination angle information is stored in memory (S313). The reference angle is calculated based on the inclination angle information (S314) and is set (S315) and the processing is terminated.

Figure 8:
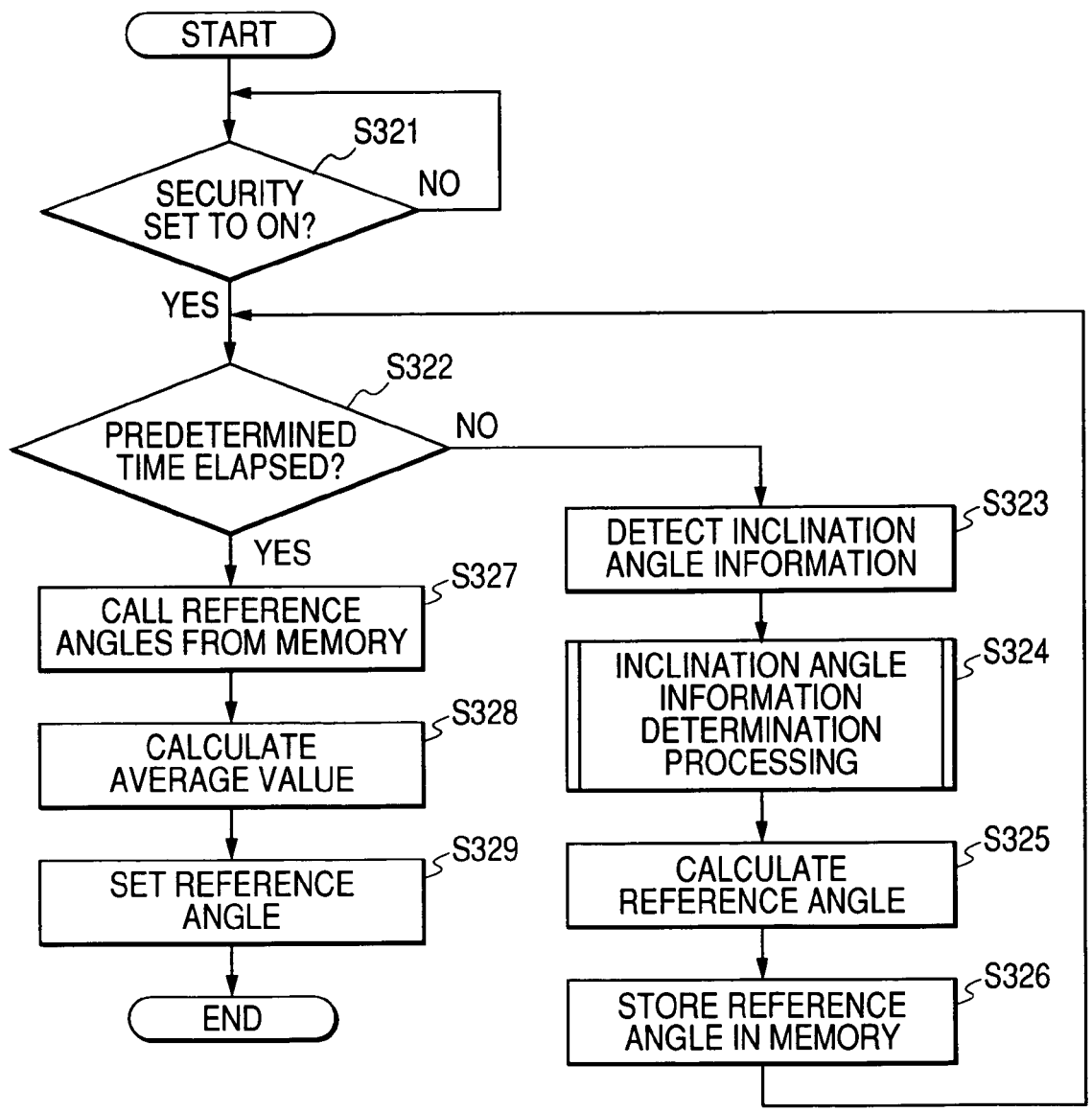
FIG. 8 is a flowchart of a second reference angle setting method according to the first embodiment of the invention.
Figure 9:
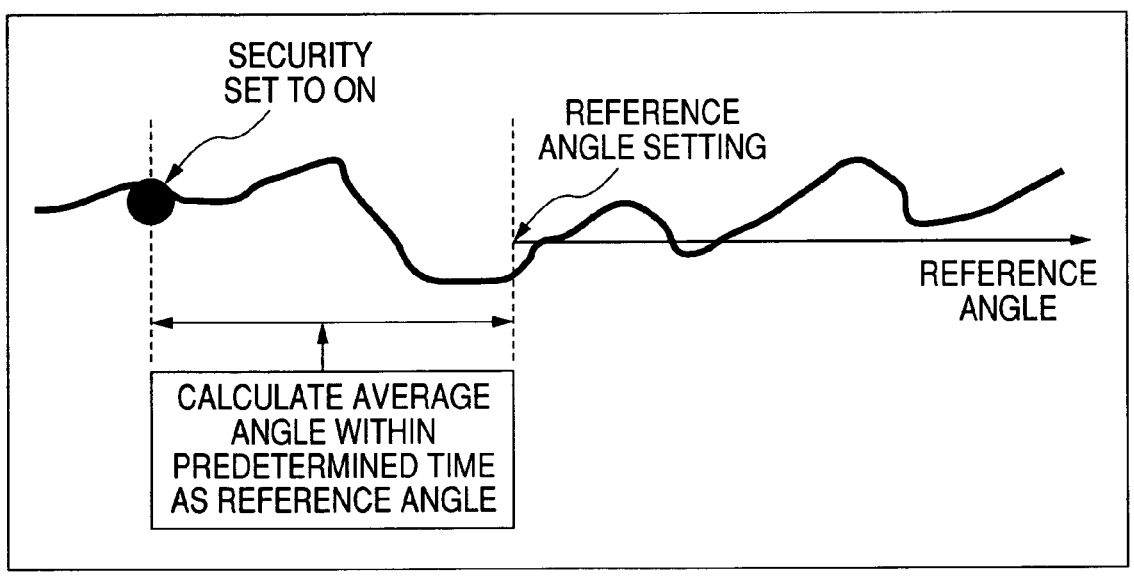
FIG. 9 is a drawing to describe setting of the reference angle by the second reference angle setting method according to the first embodiment of the invention.

FIG. 8 is a flowchart of a second reference angle setting method according to the embodiment. The second reference angle setting method is applied for setting the reference angle based on inclination angle information of the vehicle for a while since setting of security (see FIG. 9). In the second reference angle setting method, calculating the reference angle is started when the security is set to ON. Thus, if the security is not set to ON, calculating the reference angle is not started until it is determined that the security is ON.

First, when it is determined that the security is set to ON (YES at S321), whether or not predetermined time has elapsed since the security was set to ON is determined (S322). When the predetermined time has not elapsed, inclination angle information is detected based on an acceleration signal provided by the acceleration sensor 2b (S323) and whether or not the inclination angle information detected in inclination angle information determination processing (S324; described later in detail) is valid is determined. If the detected inclination angle information is valid, the reference angle is calculated based on the inclination angle information (S325) and is stored in memory (S326). Calculating the reference angle every predetermined time is repeated until the expiration of the predetermined time. When the predetermined time has elapsed, the reference angles stored in the memory are called (S327), the average value is calculated based on the called reference angles (S328) and is set as the reference angle (S329), and the processing is terminated.

Generally, security is often set just after the vehicle is parked. A passenger may get out of the vehicle, may move in the vehicle, or may load or unload goods just after the vehicle is parked. Thus, the vehicle parking state does not become stable due to inclination, vibration, etc., of the vehicle at the time and the precise reference angle cannot be calculated. Therefore, the inclination angle information acquired after the security is set and while no theft occurs is used, whereby it is made possible to improve the reliability of the reference angle provided according to the second reference angle setting method.

Figure 10:
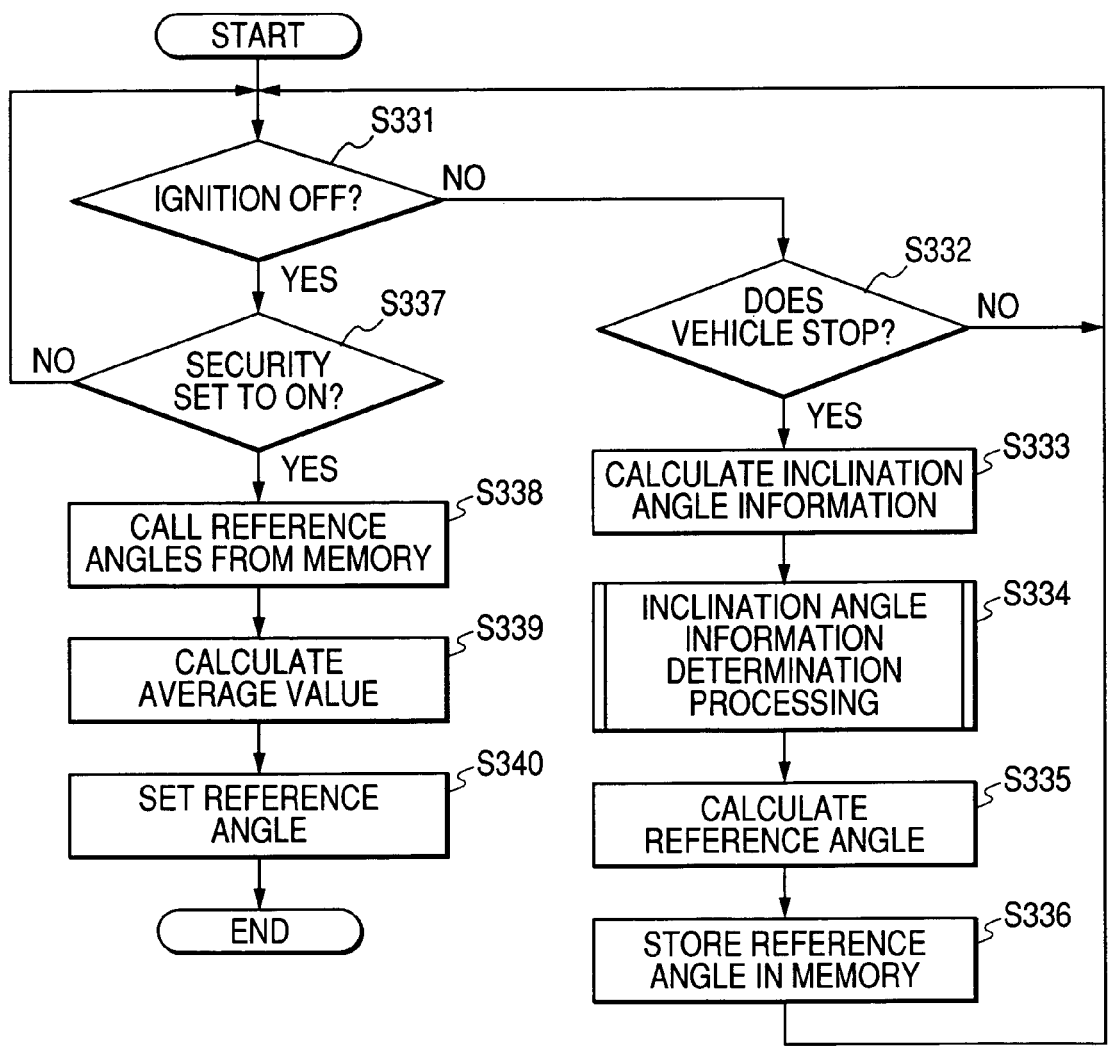
FIG. 10 is a flowchart of a third reference angle setting method according to the first embodiment of the invention.
Figure 11:
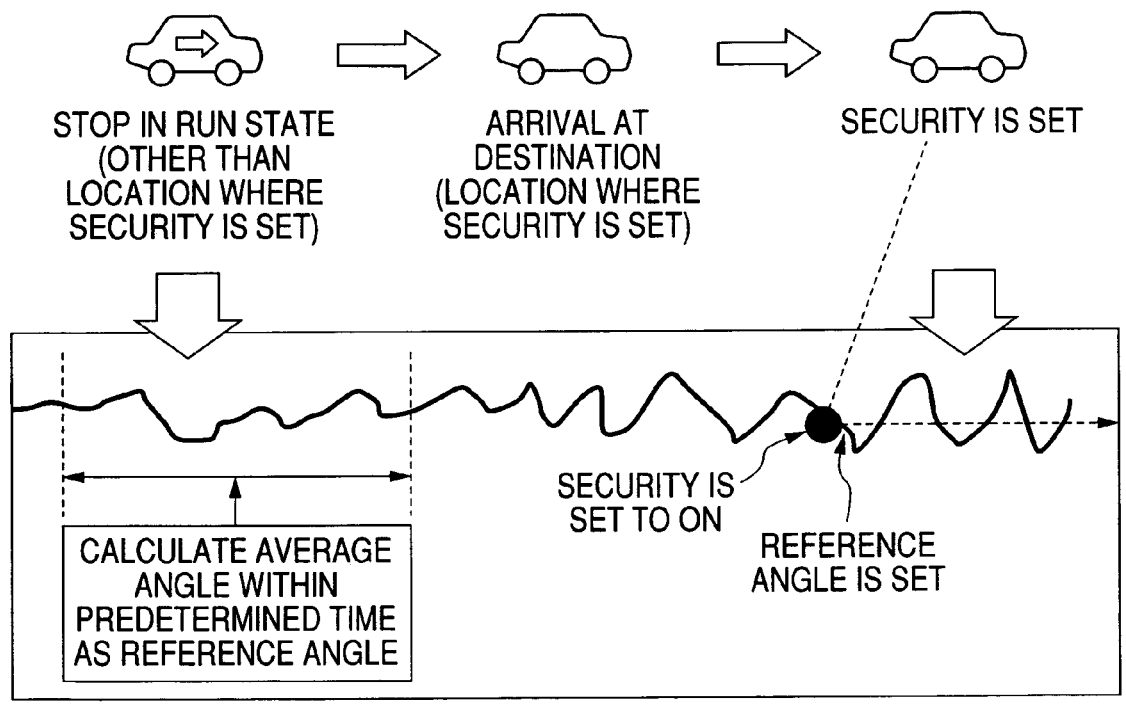
FIG. 11 is a drawing to describe setting of the reference angle by the third reference angle setting method according to the first embodiment of the invention.

FIG. 10 is a flowchart of a third reference angle setting method according to the embodiment. The third reference angle setting method is applied for setting the reference angle based on inclination angle information detected in a location different from the parking lot until security setting is started (see FIG. 11). In the third reference angle setting method, while the vehicle is running, the reference angle is calculated and when the vehicle is parked and security is set to ON, the reference angle is set. Thus, in the third reference angle setting method, calculating the reference angle is continued until it is determined that the ignition is set to OFF.

First, whether or not the vehicle is parked, namely, whether or not the ignition is set to OFF is determined (S331). If the ignition is not set to OFF (NO at S331), it is determined that the vehicle is running, and the reference angle is calculated. In the third reference angle setting method, to detect more precise inclination angle information, the reference angle is calculated only when the vehicle stops. If it is determined at S332 that the vehicle does not stop (NO at S332), the process returns to S331 for determining whether or not the ignition is set to OFF to determine whether or not the vehicle is parked or still is running.

On the other hand, if it is determined at S332 that the vehicle stops (YES at S332), inclination angle information is detected based on an acceleration signal provided by the acceleration sensor 2b (S333). Next, whether or not the inclination angle information detected in inclination angle information determination processing (S334; described later in detail) is valid is determined. If the inclination angle information is valid, the reference angle is calculated based on the inclination angle information (S335) and is stored in memory (S336). Calculating the reference angle every predetermined time is repeated until the ignition is set to OFF. When the ignition is set to OFF (YES at S331), whether or not security is set to ON is determined (S337).

If security is not set to ON (NO at S337), there is a possibility that the vehicle will again run if the ignition is set to OFF and thus the process returns to S331 for determining whether or not the ignition is set to OFF without setting the reference angle. On the other hand, when security is set to ON (YES at S337), the reference angles stored in the memory are called (S338), the average value is calculated based on the called reference angles (S339) and is set as the reference angle (S340), and the processing is terminated.

For example, if the vehicle is parked in an environment in which repetitive inclination occurs back and forth or from side to side as in a ferry, there is a possibility that the parked vehicle may already sway when inclination angle information is detected. Thus, in such an environment, the precise reference angle cannot be calculated by the first or second reference angle setting method; this is a problem. Then, in the third reference angle setting method according to the first embodiment, the inclination angle information when the vehicle is in a run state before arrival at the destination and when the vehicle stops is detected using the information from the acceleration sensor, etc., of the vehicle and the reference angle is calculated at all times. Accordingly, the third reference angle setting method can circumvent the problem of the inability to calculate the precise reference angle in the first and second reference angle setting methods.

The purpose of using the average value of the reference angles calculated within predetermined time to calculate the reference angle in the second and third reference angle setting methods according to the first embodiment is to prevent the setup reference angle from becoming a value widely different from the actual vehicle inclination angle because of noise, vibration, etc.

A fourth reference angle setting method according to the first embodiment is applied for previously storing the horizontal angle at factory shipment in memory and setting the horizontal angle stored in the memory as the reference angle. Accordingly, the inclination angle extremely close to the horizontal state can be used as the reference angle at all times without measuring the reference angle. Thus, when the reliability of the inclination angle information is low or a reference angle setting mistake occurs, it is made possible to use the horizontal angle at factory shipment as the reference angle.

In the description given above, the "reference angle setting processing" (FIG. 6) according to the first embodiment involves a plurality of separate reference angle setting methods. However, in another embodiment, only one of the first to fourth reference angle setting methods may be included. The first to fourth reference angle setting methods may be used in combination as required. Further, the reference angle setting methods may be combined into one.

Figure 12:
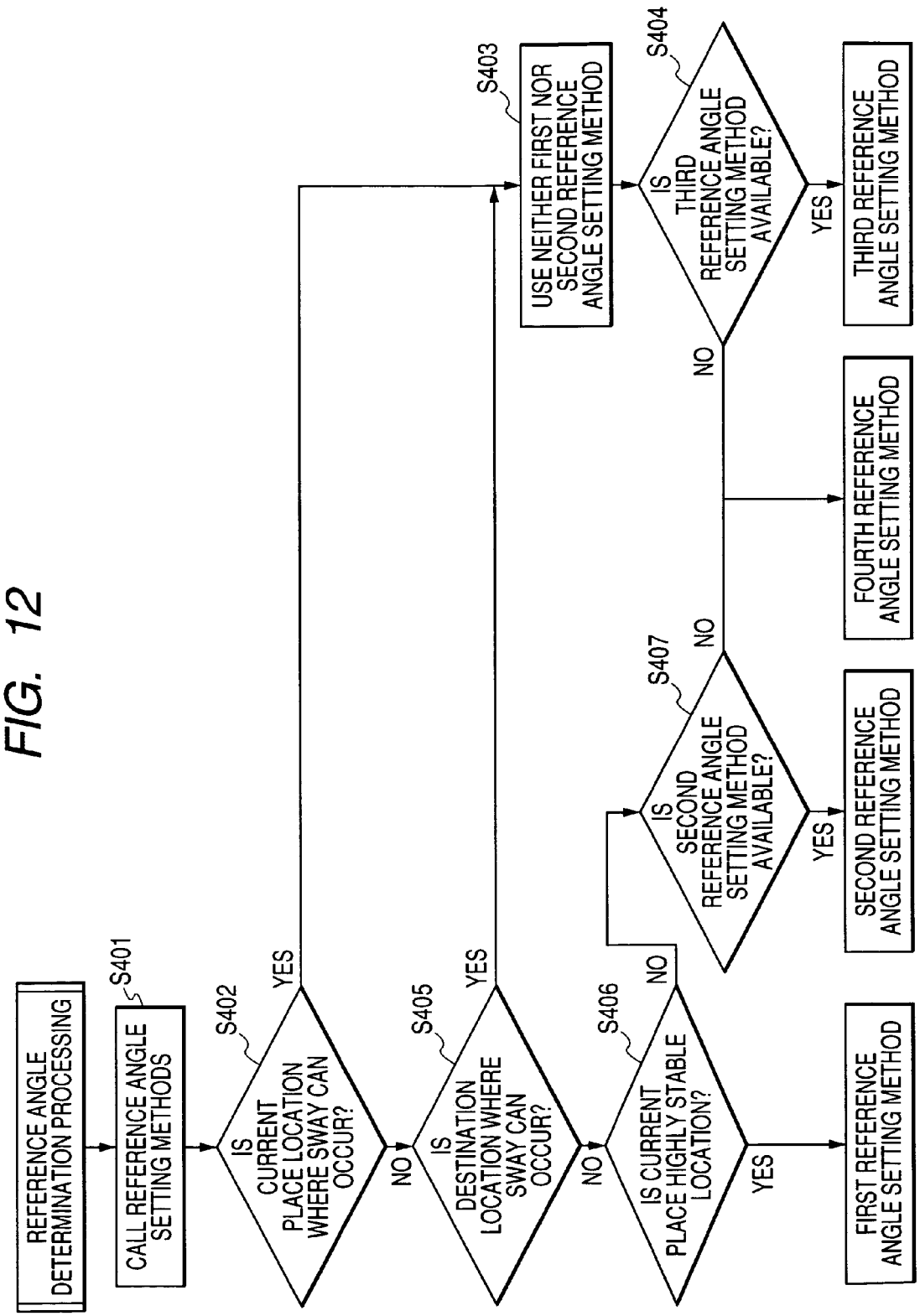
FIG. 12 is a flowchart about "reference angle determination processing" in FIG. 6 according to the first embodiment of the invention.

FIG. 12 is a flowchart about the "reference angle determination processing" (S201 in FIG. 6). First, at least one or more reference angle setting methods stored in the memory are called (S401) and which of the called reference angle setting methods is suited for use of theft determination is determined.

To begin with, determination is made based on the current position information of the vehicle (S402). If it is determined at S402 that the current position information of the vehicle indicates a location where sway can occur, it is determined that the possibility that the inclination angle information detected in the location may be in an unstable state is high and the inclination angle information is not suited for setting the reference angle. Thus, the first and second reference angle setting methods are not used for theft determination (S403). Whether or not the third reference angle setting method is registered in the memory is determined (S404). If the third reference angle setting method is registered (YES at S404), it is adopted; otherwise (NO at S404), the fourth reference angle setting method setting the horizontal angle at factory shipment as the reference angle is adopted and the routine is exited.

On the other hand, if it is determined that the current position information of the vehicle does not indicate a location where sway can occur (NO at S402), then determination is made based on the destination information of the vehicle (S405). If it is determined that the destination information of the vehicle indicates a location where sway can occur (YES at S405), it is determined that the possibility that the inclination angle information detected in the location may be in an unstable state is high and the inclination angle information is not suited for setting the reference angle. Thus, the first and second reference angle setting methods are not used for theft determination (S403). Whether or not the third reference angle setting method is registered in the memory is determined (S404). If the third reference angle setting method is registered (YES at S404), it is adopted; otherwise (NO at S404), the fourth reference angle setting method setting the horizontal angle at factory shipment as the reference angle is adopted and the routine is exited.

On the other hand, if it is determined that the destination information of the vehicle does not indicate a location where sway can occur (NO at S405), then determination is made based on the situation at the current position of the vehicle (S406). If the current position of the vehicle is a highly stable location (YES at S406), the inclination angle of the vehicle at the parking time is closest to the horizontal angle and therefore the first reference angle setting method is adopted and the routine is exited. If the current position of the vehicle is not a highly stable location (NO at S406), whether or not the second reference angle setting method is registered in the memory is determined (S407). If the second reference angle setting method is registered (YES at S407), it is adopted; otherwise (NO at S407), the fourth reference angle setting method setting the horizontal angle at factory shipment as the reference angle is adopted and the routine is exited.

For the determination method based on the current position and the destination of the vehicle, for example, whether or not the current position information or the destination information of the vehicle output from the navigation system $2d$ that can detect the current position and the destination of the vehicle indicates a location where sway can occur such as a ship, a ferry terminal, or a tower parking lot or a place within a given distance from the location is determined.

For the determination method as to whether or not the current position of the vehicle is a highly stable location (S406), determination is made based on whether or not the difference between the reference angle calculated according to the third reference angle setting method and the reference angle calculated according to the second reference angle setting method exceeds a given value, for example, as one technique of the first embodiment. That is, it is made possible to determine whether or not the current location of the vehicle is a highly stable location based on the difference between the inclination angle detected before the vehicle is parked (before the security is set) and the inclination angle detected after the vehicle is parked (after the security is set).

In the description given above, in the "reference angle determination processing" (FIG. 12) according to the first embodiment, the output of the navigation system is determined and the optimum reference angle setting method is selected based on the determination result. Of course, the "reference angle determination processing" is not limited to the mode. In another embodiment, the reference angle setting method to be used may be previously determined without using the navigation system. In still another embodiment, the user may select any desired reference angle setting method. In the description given above, in the "reference angle determination processing" according to the first embodiment, automatic determination is made based on the output of the navigation system. However, in another embodiment, the user may enter the circumferential environment of the parked vehicle into a display of a vehicle-installed terminal, etc.

Figure 13:
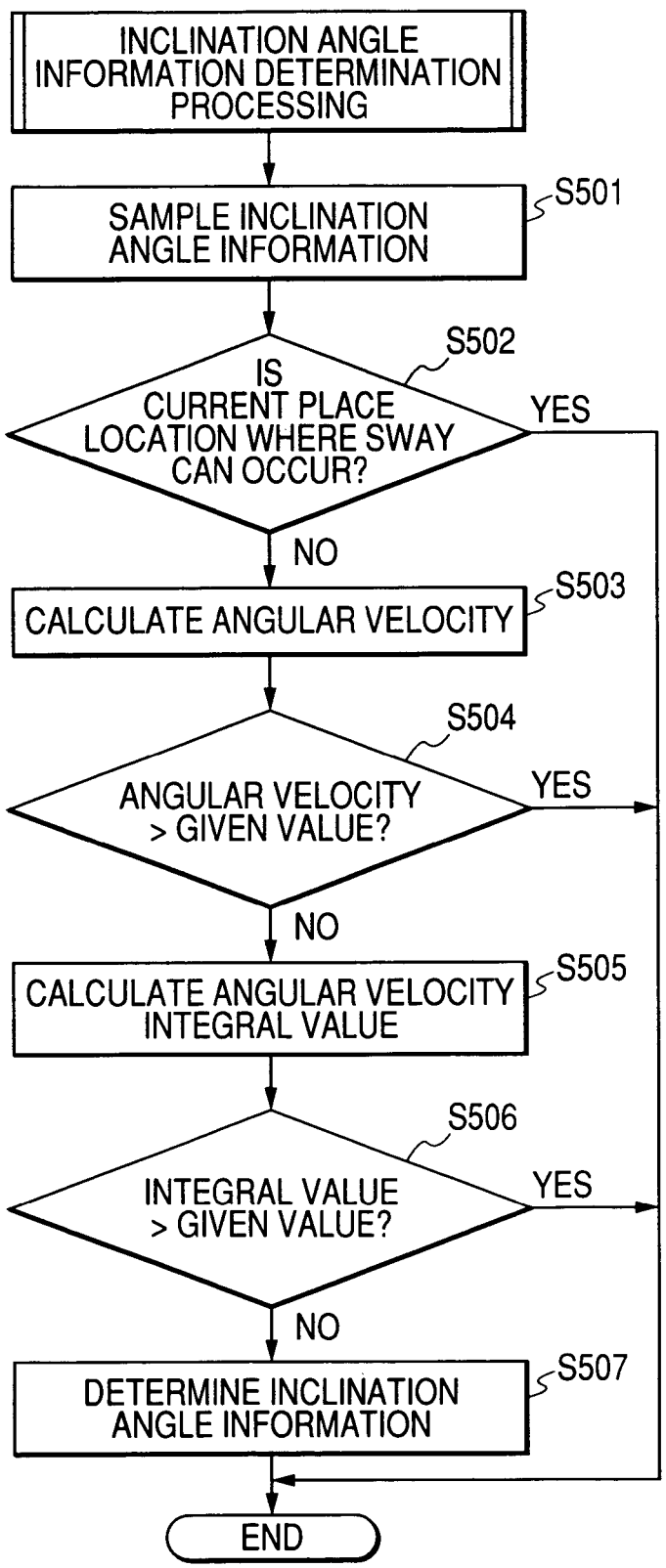
FIG. 13 is a flowchart about "inclination angle information determination processing" in FIG. 8 and FIG. 10 according to the first embodiment of the invention.

FIG. 13 is a flowchart about the "inclination angle information determination processing" in FIG. 8 and FIG. 10. First, the detected inclination angle information is sampled (S501) and then determination is made based on the current position information of the vehicle (S502). If it is determined that the current position information of the vehicle indicates a location where sway can occur (YES at S502), the possibility that the sampled inclination angle information may be in an unstable state is high and therefore it is determined that the sampled inclination angle information is not suited for calculating the reference angle, and the routine is exited.

On the other hand, if it is determined that the current position information of the vehicle does not indicate a location where sway can occur (NO at S502), it is determined that the sampled inclination angle information is in a comparatively stable state. Further, angular velocity is calculated based on the sampled inclination angle information to more precisely determine whether or not the sampled inclination angle information is suited for setting the reference angle (S503). Whether or not the angular velocity calculated from the two successive samplings is equal to or greater than a given value is determined (S504). If the angular velocity is equal to or greater than the given value (YES at S504), it is determined that the vehicle parking state is not stable, the second sampled inclination angle information is not used to calculate the reference angle, and the routine is exited.

On the other hand, if it is determined that the angular velocity is less than the given value (NO at S504), namely, if it is determined that the vehicle is in a comparatively stable state, there is a possibility that some inclination change may be made or that the effect of noise or malfunction may be received. Thus, the angular velocity is integrated for predetermined time (S505) and threshold determination of the calculated integral value is made (S506). If the integral value of the angular velocity is equal to or greater than a given value (YES at S506), it is determined that some inclination change is made or that the effect of noise or malfunction is received, the sampled inclination angle information is not used to calculate the reference angle, and the routine is exited.

On the other hand, if it is determined that the integral value of the angular velocity is less than the given value (NO at S507), it is determined that the vehicle is in a stable state and the reliability of the sampled inclination angle information is high, the inclination angle information is determined (S507), and the routine is exited. For the determination method based on the current position of the vehicle (S502), for example, whether or not the current position information of the vehicle output using the navigation system 2d that can detect the current position and the destination of the vehicle or the like indicates a location where sway can occur such as a ship, a ferry terminal, or a tower parking lot or a place within a given distance from the location is determined.

In the threshold determination of the "inclination angle information determination processing" according to the first embodiment, more precise inclination angle information is determined based on the angular velocity calculated from the inclination angle information sampled at predetermined time intervals because of occurrence of noise or malfunction. In another embodiment, threshold determination may be made based on the absolute value of the angular velocity in one sampling.

For the "inclination angle information determination processing" according to the first embodiment, if it is determined that the inclination angle information detected in the acceleration sensor 2b on the axis in any one direction of front and back, side to side, or another is not suited for calculating the reference angle, it may be determined that the inclination angle information detected by the acceleration sensor 2b in a different axial direction is not suited for calculating the reference angle. Determination may be made for each piece of the inclination angle information detected by the acceleration sensor 2b in each axial direction.

Figure 14:
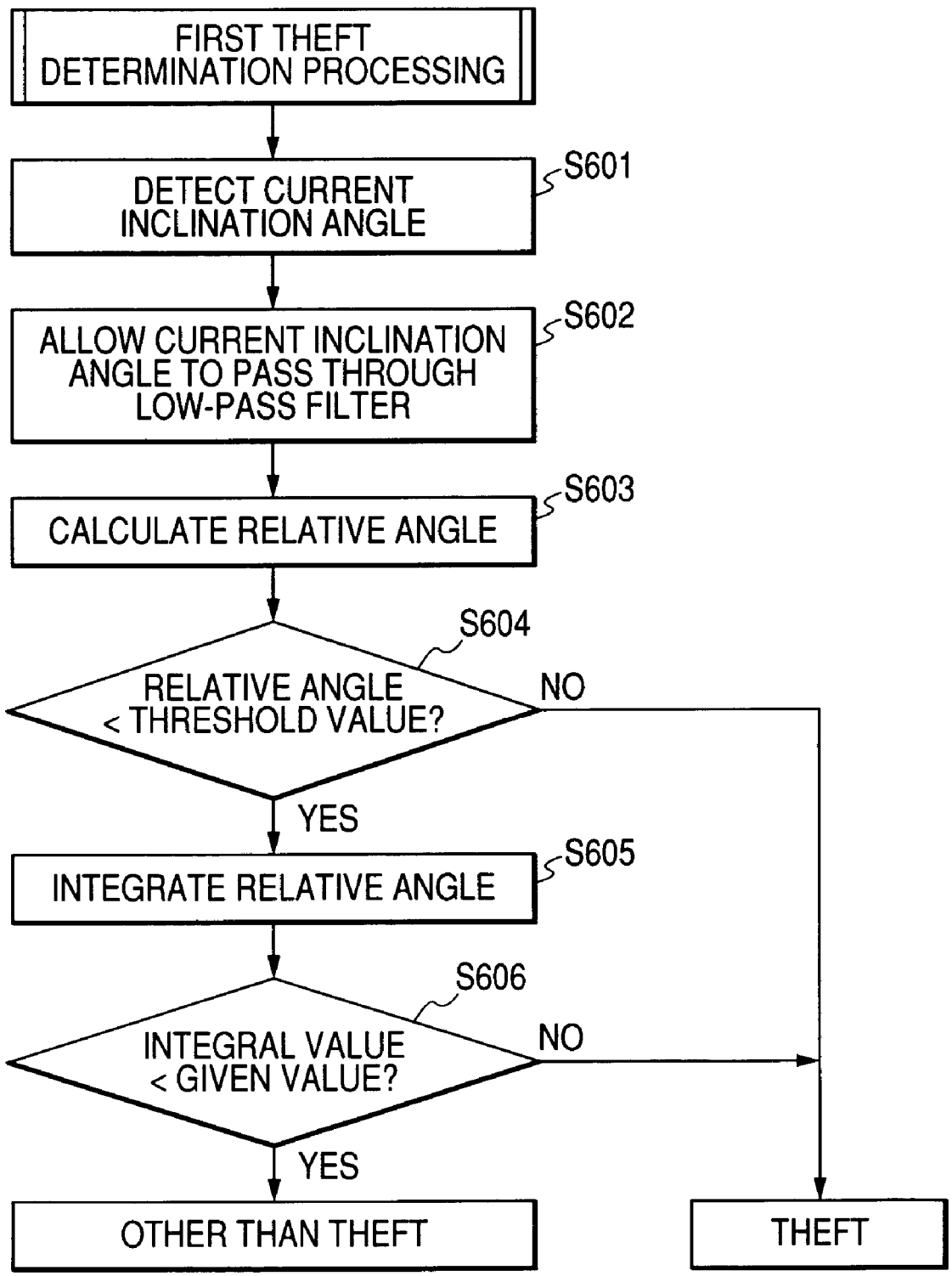
FIG. 14 is a flowchart about "first theft determination processing" in FIG. 5 according to the first embodiment of the invention.
Figure 15:
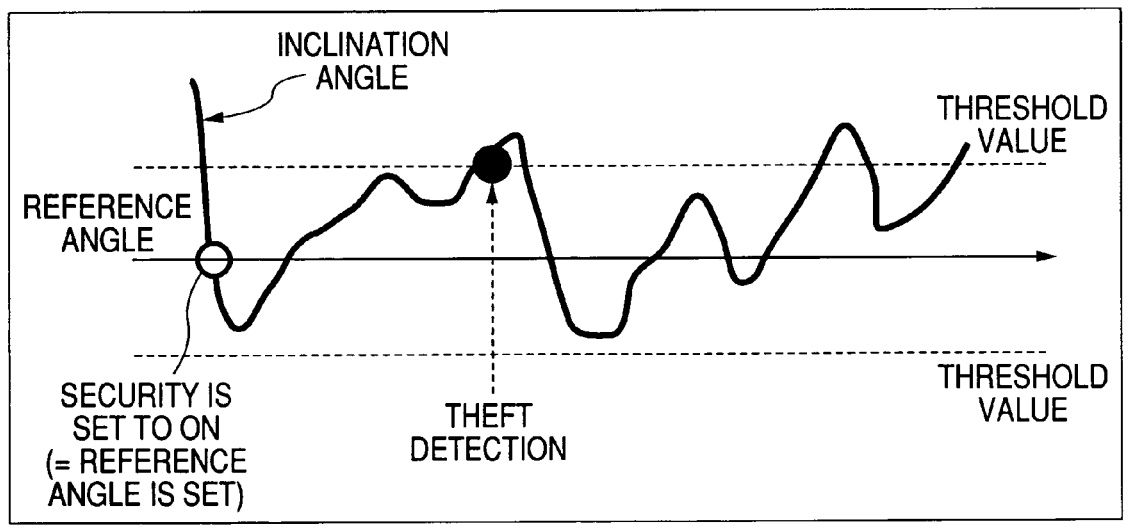
FIG. 15 is a drawing to describe threshold determination of theft detection according to the first embodiment of the invention.

FIG. 14 is a flowchart about the "first theft determination processing" (S106) in FIG. 5. In the first theft determination processing according to the first embodiment, the difference between the reference angle set in the "reference angle setting processing" and the current inclination angle of the vehicle is calculated as the relative angle and vehicle theft determination is made based on threshold determination of the relative angle (see FIG. 15).

First, the current inclination angle is detected by the acceleration sensor 2b (S601) and is passed through a low-pass filter to remove a noise component and medium to high frequency components (S602). The difference between the current inclination angle after passed through the low-pass filter and the reference angle is calculated as the relative angle (S603) and threshold determination of the relative angle is made (S604). If the relative angle is equal to or greater than a threshold value (NO at S604), theft occurrence is determined. If the relative angle is less than the threshold value (YES at S604), the relative angle is integrated with predetermined time duration (S605) and threshold determination of the calculated integral value is made (S606) to separate the case where the vehicle sways alternately as the vehicle is put on a ferry or a palette in a tower parking lot and the case where the vehicle is lifted up in one single direction as the vehicle is jacked up, etc., for example.

Figure 16:
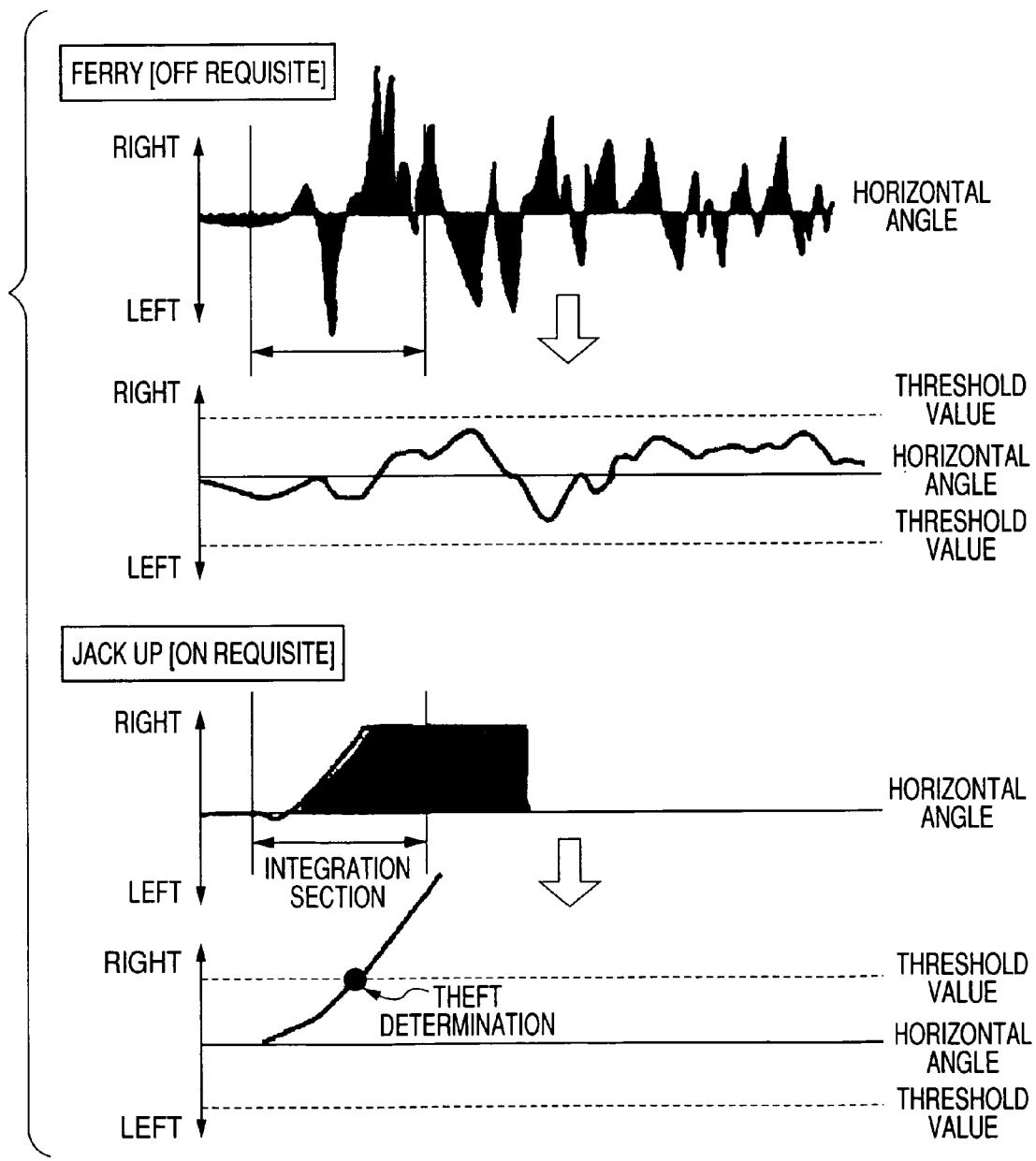
FIG. 16 is a drawing to describe off and on requisites in theft determination according to the first embodiment of the invention.

If the calculated integral value is equal to or greater than a given value (NO at S606), it is determined that the vehicle is inclined as it is jacked up, etc., although the inclination angle every predetermined time does not indicate a large value, and theft occurrence is determined. On the other hand, if the calculated integral value is less than the given value (YES at S606), it is determined that the inclination angle every predetermined time is small and the possibility that the vehicle may be in a stable state or alternate sway may occur is high, and no theft occurrence is determined (see FIG. 16).

Usually, the inclination angle contains a noise component and medium to high frequency components for degrading the separation performance of behavior caused by the vehicle parked in a ferry or a tower parking lot and behavior caused by the vehicle jacked up. In the threshold determination of the integral value, the outline shape of sway is used to separate the behavior caused by the vehicle parked in a ferry or a tower parking lot and the behavior caused by the vehicle jacked up. Thus, the low-pass filter is used to remove the medium to high frequency components, whereby it is made possible to detect a more precise integral value difference, and determination performance improves.

Figure 17:
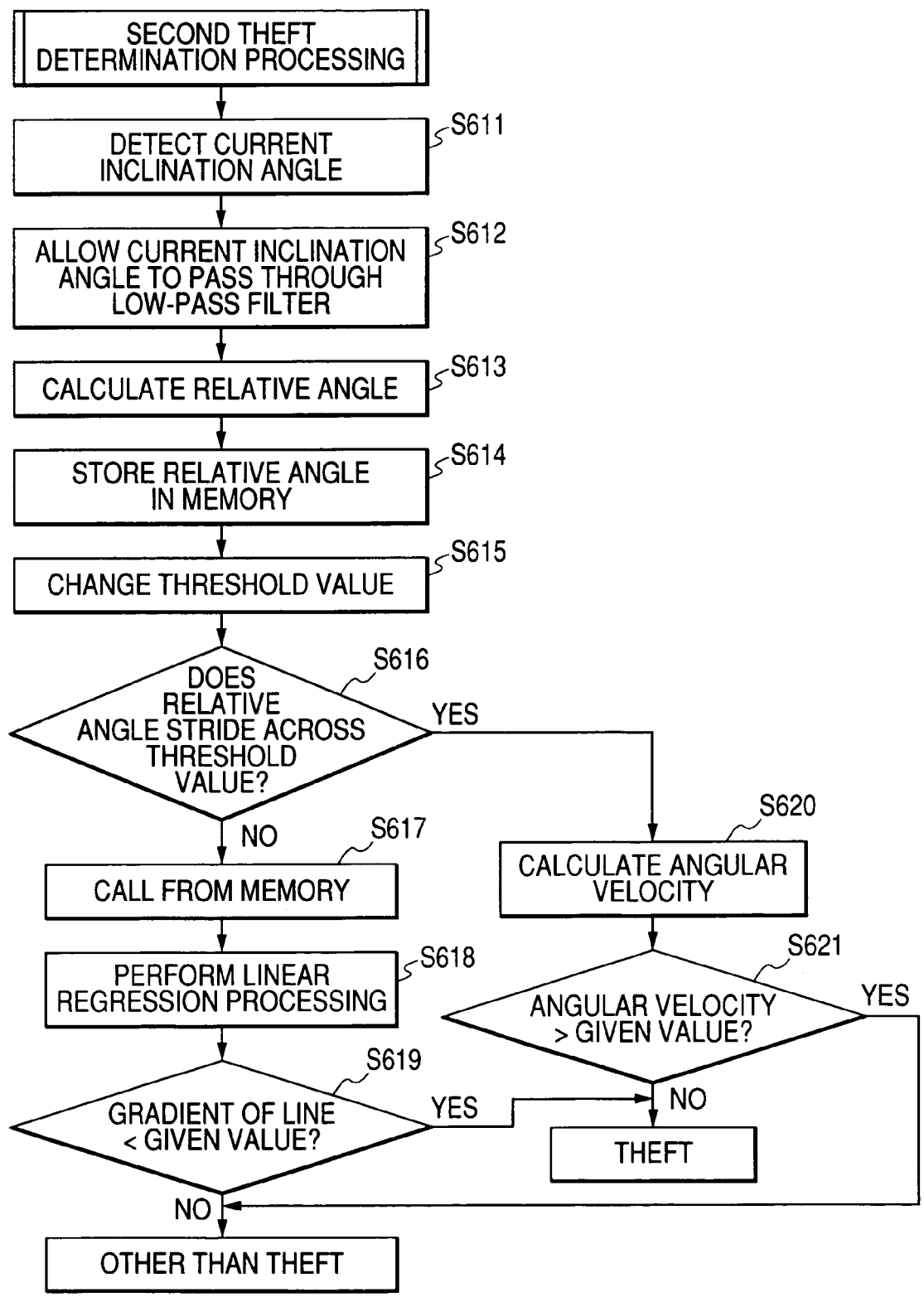
FIG. 17 is a flowchart about "second theft determination processing" in FIG. 5 according to the first embodiment of the invention.
Figure 18:
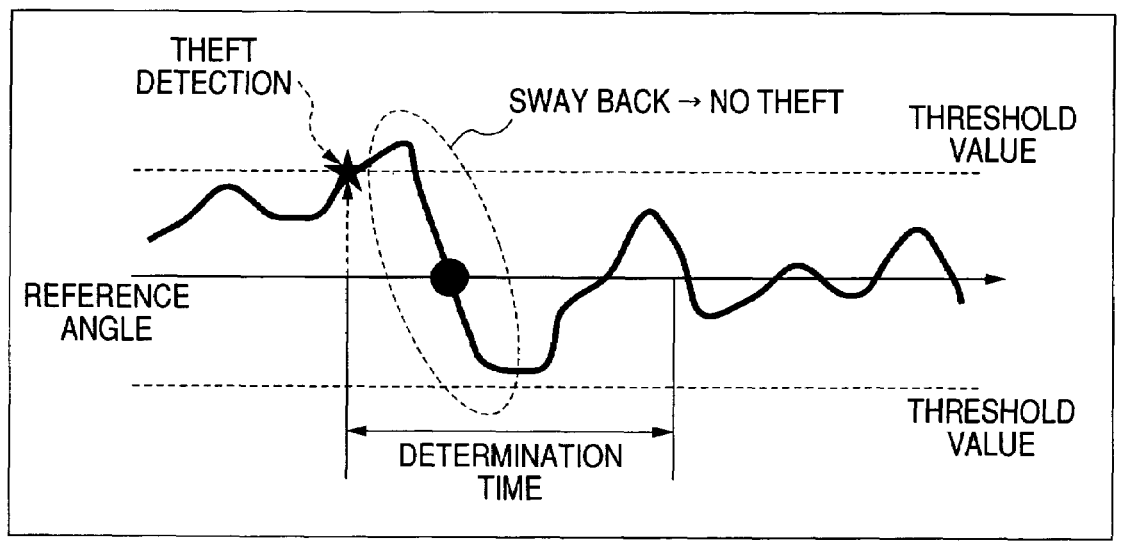
FIG. 18 is a drawing to describe theft determination in sway back in theft detection according to the first embodiment of the invention.

FIG. 17 is a flowchart about the "second theft determination processing" (S112) in FIG. 5. If theft occurrence is determined in the "first theft determination processing," there is also a possibility that the vehicle might sway back in a ferry, etc., for example, and therefore such sway back is detected and a determination as to whether or not theft occurs is made in more detail in the second theft determination processing according to the first embodiment (see FIG. 18).

First, the current inclination angle is detected by the acceleration sensor 2b (S611) and is passed through a low-pass filter to remove a noise component and medium to high frequency components (S612). The difference between the current inclination angle after being passed through the low-pass filter and the reference angle is calculated as the relative angle (S613) and is stored in the memory (S614). A predetermined operation is performed on a threshold value and the threshold value is changed (S615) and whether or not the relative angle strides across the changed threshold value is determined (S616).

If the relative angle does not stride across the changed threshold value (NO at S616), all sampling data of the calculated relative angles is called from the memory (S617). When linear regression is conducted according to least squares method with the time axis positive (S618), if the gradient of a line is equal to or less than a given value (YES at S619), it is determined that no theft occurs; otherwise (NO at S619), theft occurrence is determined.

On the other hand, if the relative angle strides across the changed threshold value (YES at S616), whether or not the angular velocity calculated in at least one sampling (S620) is equal to or greater than a given value is determined (S621). If the calculated angular velocity is equal to or greater than the given value (YES at S621), theft occurrence is determined; otherwise (NO at S621), it is determined that no theft occurs.

Figure 19:
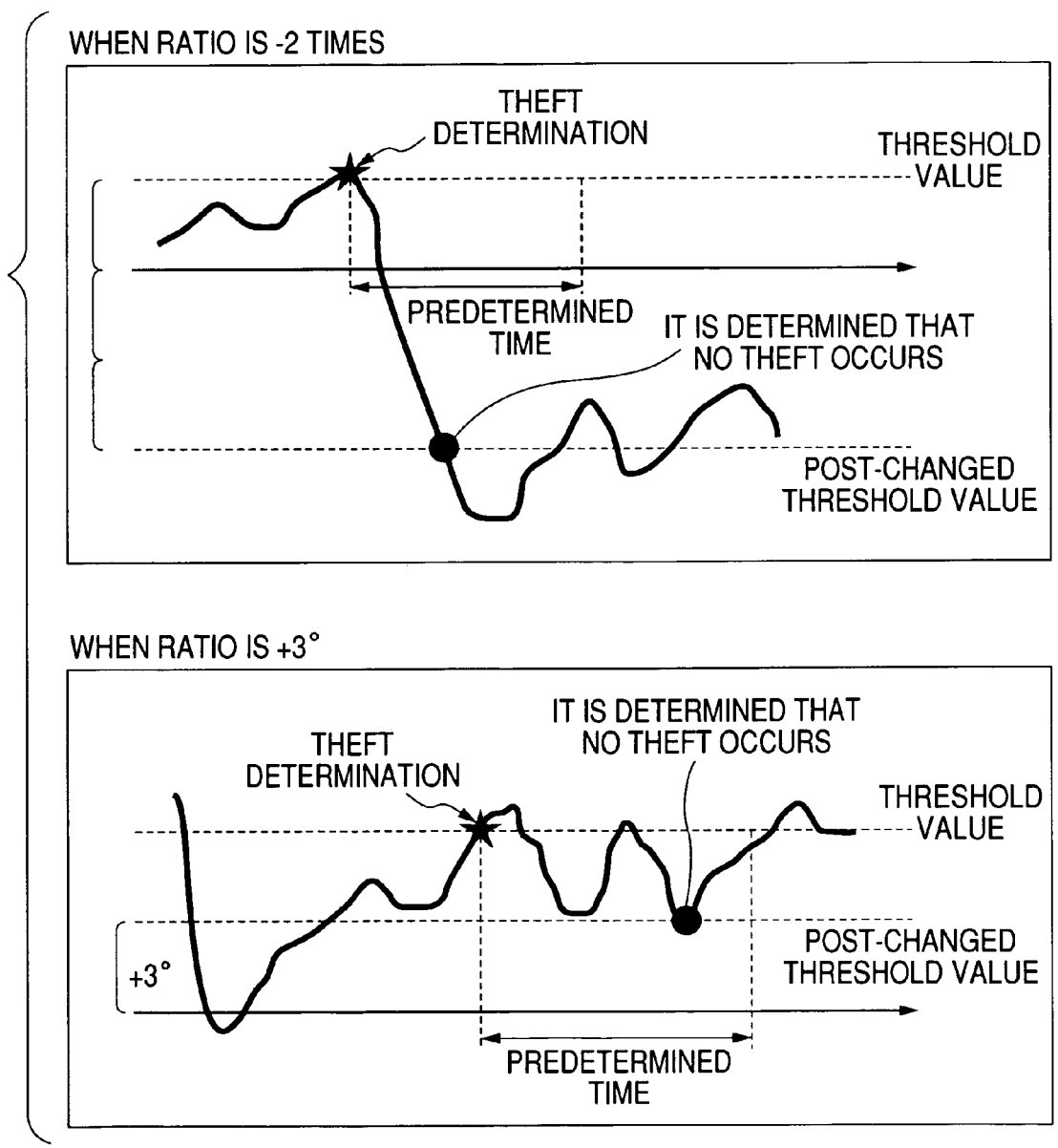
FIG. 19 is a drawing to describe change of threshold value used in the "second theft determination processing" according to the first embodiment of the invention.
Figure 20:
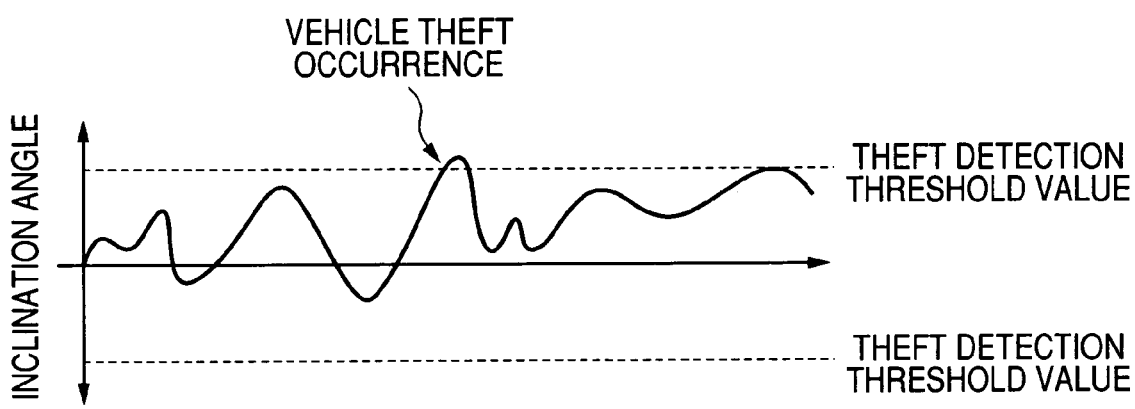
FIG. 20 is a waveform chart to show the comparison situation between the logic operation result of inclination angle and theft detection threshold values.

For example, when the vehicle is parked on a ferry, sway back of the vehicle is not necessarily restored to the former inclination angle as the effect of waves, etc. Thus, in the first embodiment, the threshold value is changed within predetermined time after the theft determination and a further theft determination is made based on a determination condition using the changed threshold value. Accordingly, if the vehicle does not sway back to the former inclination angle or if the vehicle sways back beyond the former inclination angle, it can be determined that no theft occurs. Consequently, higher-accuracy theft determination is made (see FIG. 19).

To change the threshold value according to the first embodiment, the post-changed threshold value may be provided by subtracting the reference angle from the setup threshold value and multiplying the subtraction result by a predetermined ratio coefficient or adding a predetermined angle to the subtraction result.

For the determination as to whether or not the relative angle strides across the changed threshold value (S616) according to the first embodiment, sway back of the vehicle in a ferry, etc., is not necessarily restored to the former inclination angle and again if the relative angle does not stride across the threshold value or the reference angle, no theft may occur. Then, the magnitude of change in the inclination angle is calculated, whereby whether or not the vehicle is in a sway state of a ferry, etc., is determined.

In the "second theft determination processing" (FIG. 17) according to the first embodiment, theft determination is made based on the threshold value changed by performing the predetermined operation. In another embodiment, the user may be able to change setting of the threshold value at all times as desired. Determination may be made according to whether or not the current inclination angle strides across the setup reference angle without changing the threshold value.

The acceleration sensor 2b according to the first embodiment makes a separate theft determination in more than one axial direction. If it is determined that theft occurs in the theft determination in at least one axial direction, it is determined that theft occurs in other axial directions. If it is determined that no theft occurs in at least one axial direction within predetermined time after the theft determination, it is determined that no theft occurs in other axial directions, and no alarm is output. If an alarm is being sounded, the alarm output is canceled.

In the description given above, the vehicle theft detection device according to the first embodiment automatically sets security if it is confirmed that the vehicle is parked. In another embodiment, a vehicle-installed machine or a vehicle key may be provided with a dedicated button, etc., for enabling the user to enter a security setting command as desired in the vehicle or from the outside of the vehicle.

In the description given above, as the vehicle theft detection device according to the first embodiment, one vehicle theft detection device is provided with a plurality of reference angle setting methods and the optimum reference angle setting method is selected in response to the circumferential environment of the parked vehicle. However, the vehicle theft detection device is not limited to the mode; one vehicle theft detection device may be provided with only one reference angle setting method.

At the time, the "reference angle determination processing" (FIG. 12) is not performed and the reference angle calculated according to the provided reference angle setting method may be used for theft determination. In such a case where only one reference angle setting method is provided, the "reference angle determination processing" is not performed, so that theft determination processing can be performed without including any navigation system. Thus, the whole device cost can be reduced and the processing can be accomplished in a short time.

Although the embodiment of the invention has been described, it is to be understood that the invention is not limited to the specific embodiment described above and shown in the accompanying drawings and that various modifications and changes may be made without departing from the spirit and the scope of the invention.

The vehicle theft detection device according to the invention may output no alarm until the expiration of predetermined time after theft determination.

After theft determination, a vehicle theft detection device according to another embodiment may output an alarm to the outside or may output no alarm to the outside by transmitting theft information to a management center, recording information indicating theft detection in the vehicle, for example, in ECU, etc.

According to the configuration, if the user does not exist at the site, it is made possible to rapidly take measures after theft occurrence by providing an emergency report and producing a theft record.

Second Embodiment

Figure 21:
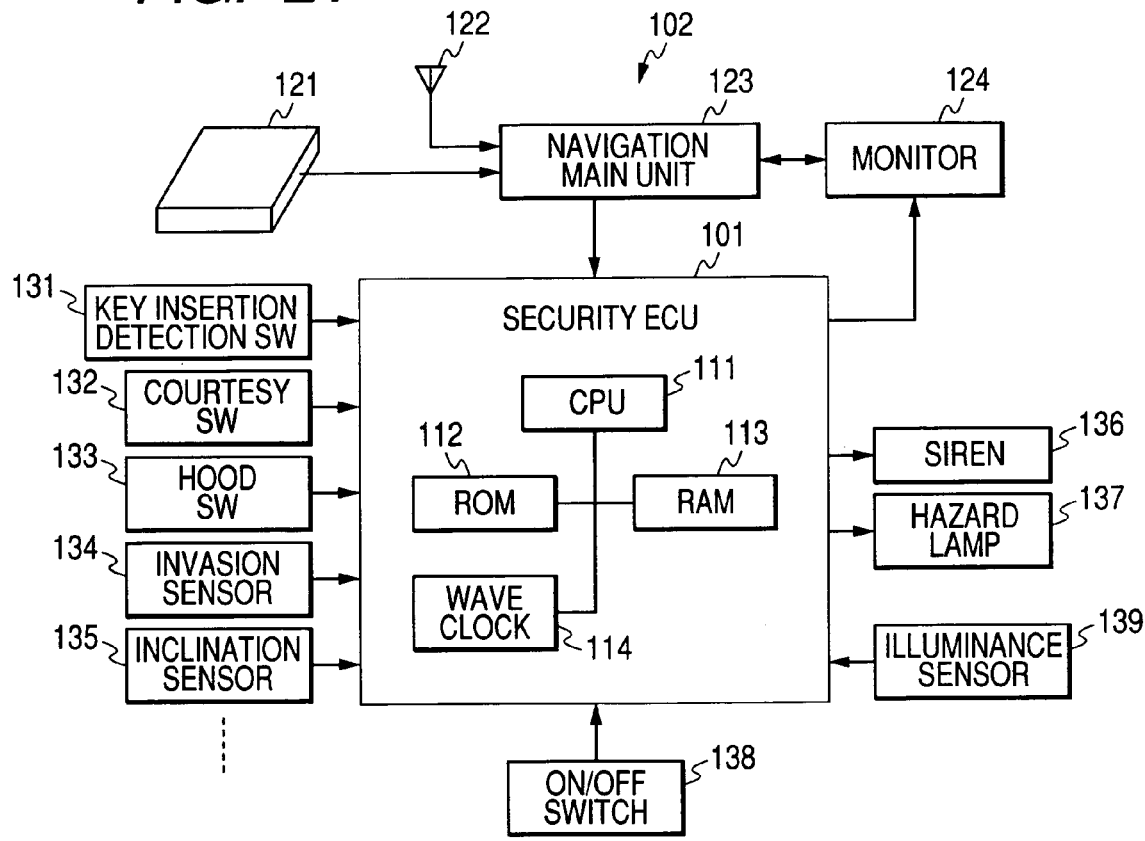
FIG. 21 is a block diagram to show the configuration of a theft detection system incorporating a vehicle theft detection device of a second embodiment of the invention.

FIG. 21 is a block diagram to show the configuration of a theft detection system. As shown in the figure, the theft detection system is made up of a security ECU 101 and a navigation system 102.

The security ECU 101 issues an alarm upon detection of breaking into the vehicle interior by unauthorized means, inclination of the vehicle, etc. Connected to the security ECU 101 are a key insertion detection switch (SW) 131 for detecting insertion of an ignition key, a courtesy SW 132 for detecting a door open/closed state, a hood SW 133 for detecting a hood open/closed state, an invasion sensor 134 for detecting invasion into the vehicle interior, an inclination sensor 135 for detecting inclination of the vehicle, a siren 136 for performing alarm operation in an alarm mode, a hazard lamp 137, an on/off switch 138 for setting effectiveness/ineffectiveness of an inclination sensor system, an illuminance sensor 139 used for controlling headlights, interior indicators, and an air conditioner, etc., and the like.

The courtesy SW 132 detects opening/closing of a driver door, a passenger seat door, a rear door, or a trunk. The courtesy SWs 132 are provided in a one-to-one correspondence with the doors and the trunk, but only one is shown in FIG. 21 as a representative. For example, ultrasonic waves or radio waves are filled in the vehicle interior and the invasion sensor 134 detects frequency disorder of ultrasonic waves or radio waves when glass is broken or a human being moves in the vehicle interior. The inclination sensor 135 detects inclination of the vehicle when the vehicle is inclined to tow the vehicle.

The security ECU 101 is made up of a CPU 111, ROM (Read-Only Memory) 112, RAM (Random Access Memory) 113, and a wave clock 114. The CPU 111 controls the hardware of the security ECU 101 and executes various programs based on programs stored in the ROM 112. The RAM 113 is implemented as SRAM, etc., for storing temporary data occurring during program execution. The RAM 113 stores inclination of the vehicle at the time point when the security ECU 101 is set to a lookout state according to output of the inclination sensor 135, and the CPU 111 detects an anomaly later when the vehicle is unnaturally inclined. The wave clock 114 receives a standard wave (carrier wave) containing time information and takes out the time information from the standard wave, thereby counting the precise time of day.

On the other hand, the navigation system 102 is made up of a GPS antenna 121, a VICS antenna 122, a navigation main unit 123, and a monitor 124. The GPS antenna 121 receives a modulation wave transmitted from a plurality of NAVSTAR satellites carrying orbit information, satellite position information, and time information. The VICS antenna 122 receives a modulation wave on which congestion information, weather information, and the like are superposed. The navigation main unit (GPS receiver) 123 analyzes the received modulation wave, calculates the current position of the vehicle (latitude and longitude), and displays the vehicle position at the place corresponding to the current position on an electronic map displayed on the monitor 124. The navigation system 102 can not only detect information of a neighboring parking lot, etc., based on electronic map information from the current position, but also set the destination on the electronic map.

Further, output of the security ECU 101 is also input to the monitor 124. Thus, a command for the user to turn off the inclination sensor system can be displayed on the monitor 124 in a state in which the operation of the inclination sensor system is to be turned off, namely, in an environment in which the vehicle is inclined at the parking time as the vehicle exists in a parking lot of indoor move type, a ferry, etc.

When the security ECU 101 is set to the lookout state, it estimates the vehicle situation. If the security ECU 101 determines that the vehicle is in a situation where the vehicle will sway at the parking time in a parking lot of indoor move type, a ferry, etc., the security ECU 101 automatically makes a notification that security setting change is required. The operation when the security ECU 101 is set to the lookout state will be discussed with reference to a flowchart.

Figure 22:
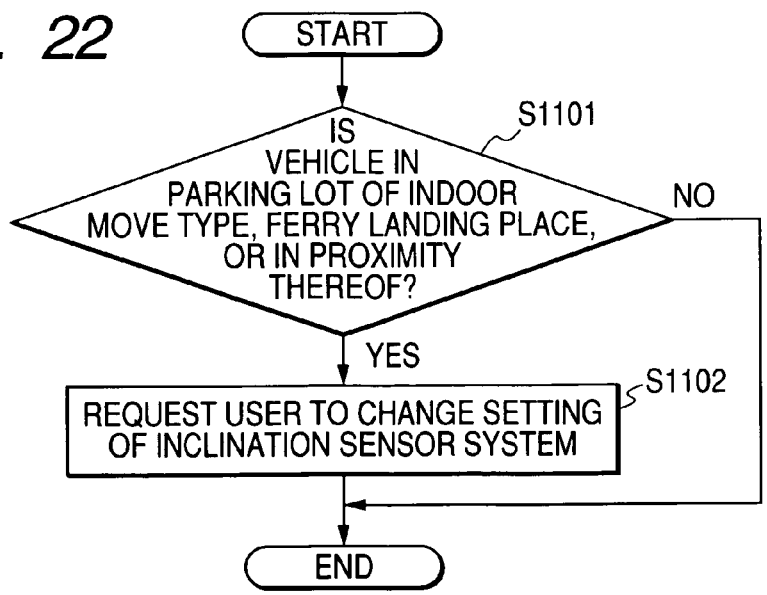
FIG. 22 is a flowchart to show the operation when a security ECU is set to a lookout state.

The flowchart of FIG. 22 shows the operation of the CPU 111 to acquire the vehicle position just before the ignition is turned off based on navigation information and determine whether or not the vehicle is in a situation where the vehicle will sway at the parking time based on the acquired vehicle position.

If the security ECU 101 is set to the lookout state, for example, as it is determined that the key is removed based on output of the key insertion detection SW 131 or as an arming request signal is received from a security transmitter (not shown), the CPU 111 starts a setting program of the inclination sensor system shown in the flowchart of FIG. 22.

When starting the setting program of the inclination sensor system shown in the flowchart of FIG. 22, the CPU 111 acquires the vehicle position just before the ignition is turned off based on navigation information and determines whether or not the current position of the vehicle is in a parking lot of indoor move type, a ferry landing place, or in the proximity thereof based on the acquired vehicle position (S1101). If it is determined that the current position of the vehicle is not in a parking lot of indoor move type, a ferry landing place, or in the proximity thereof, the CPU 111 terminates the program.

Accordingly, while the lookout state continues, the security ECU 101 determines the presence or absence of theft occurrence based on output of all sensors including the inclination sensor 135.

On the other hand, if it is determined that the current position of the vehicle is in a parking lot of indoor move type, a ferry landing place, or in the proximity thereof, the CPU 111 outputs a notification signal to the monitor 124, thereby requesting the user to turn off the inclination sensor system (S102).

Accordingly, for example, a message such as "Turn off the inclination sensor system because there is a possibility that the inclination sensor system may malfunction." is displayed on the monitor 124. Therefore, the user can recognize the necessity for turning off the on/off switch 138 for setting effectiveness/ineffectiveness of the inclination sensor system.

When the user turns off the on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

Third Embodiment

In the second embodiment, whether or not the vehicle is in a situation where the vehicle will sway during parking is determined based on the vehicle position just before the ignition is turned off. However, if the destination of the vehicle is set to a parking lot of indoor move type or a ferry landing place, it may be determined that the vehicle is in a situation where the vehicle will sway during parking. The operation of a CPU 111 for requesting the user to turn off an inclination sensor system if the destination of the vehicle is set to a parking lot of indoor move type or a ferry will be discussed with reference to a flowchart of FIG. 23.

The theft detection system configuration is the same as that in FIG. 21 and therefore will not be discussed again.

Figure 23:
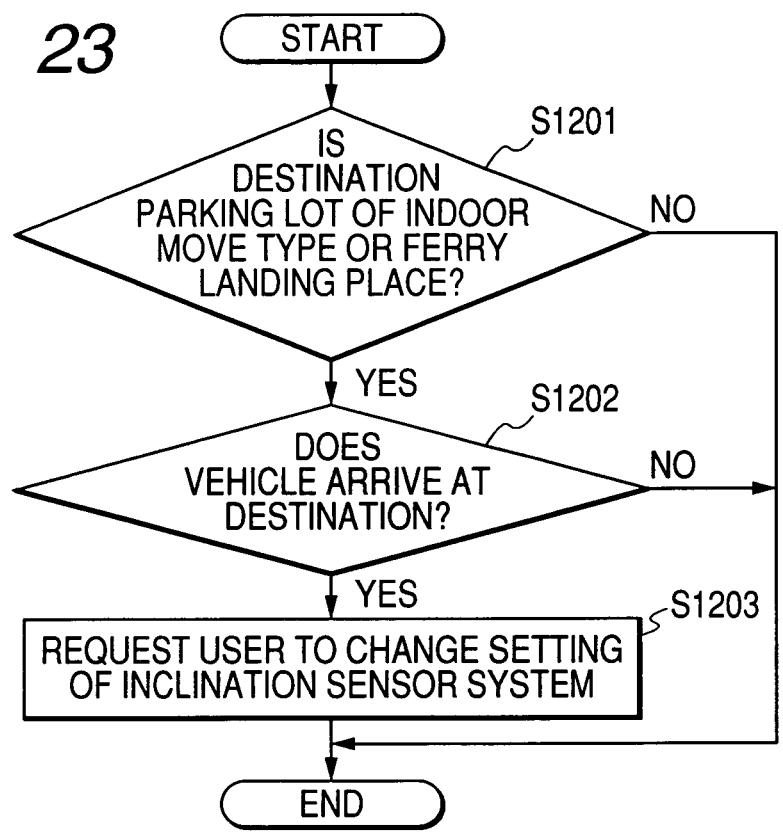
FIG. 23 is a flowchart to show the operation of a third embodiment of the invention when a security ECU is set to a lookout state.

If a security ECU 101 is set to a lookout state, the CPU 111 starts a setting program of the inclination sensor system shown in the flowchart of FIG. 23. First, the CPU 111 determines whether or not the destination of the vehicle is set to a parking lot of indoor move type or a ferry landing place based on information from a navigation system 102 (S1201). If the CPU 111 determines that the destination of the vehicle is not a parking lot of indoor move type or a ferry landing place, the CPU 111 terminates the program.

Accordingly, while the lookout state continues, the security ECU 101 determines the presence or absence of theft occurrence based on output of all sensors including an inclination sensor 135.

If the CPU 111 determines that the destination of the vehicle is set to a parking lot of indoor move type or a ferry landing place, the CPU 111 determines whether or not the vehicle arrives at the destination based on information from the navigation system 102 (S1202). If the CPU 111 does not determine that the vehicle arrives at the destination, the CPU 111 terminates the program.

Accordingly, while the lookout state continues, the security ECU 101 determines the presence or absence of theft occurrence based on output of all sensors including the inclination sensor 135.

On the other hand, if the CPU 111 determines at S1202 that the vehicle arrives at the destination, the CPU 111 outputs a notification signal to a monitor 124, thereby requesting the user to turn off the inclination sensor system (S1203).

Accordingly, if the user turns off an on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

Fourth Embodiment

If a ferry is contained in the route to the destination of the vehicle, it may be determined that the vehicle is in a situation where the vehicle will sway during parking. The operation of a CPU 111 for requesting the user to turn off an inclination sensor system if a ferry is contained in the route to the destination of the vehicle will be discussed with reference to a flowchart of FIG. 24.

Figure 24:
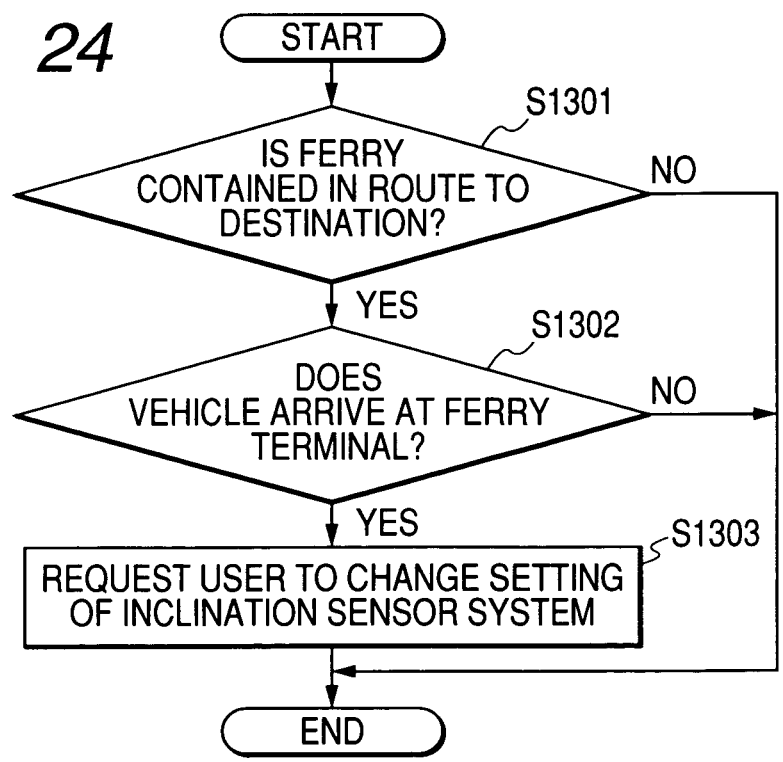
FIG. 24 is a flowchart to show the operation of a fourth embodiment of the invention when a security ECU is set to a lookout state.

If a security ECU 101 is set to a lookout state, the CPU 111 starts a setting program of the inclination sensor system shown in the flowchart of FIG. 24. First, the CPU 111 determines whether or not a ferry is contained in the route to the destination of the vehicle based on information from a navigation system 102 (S1301). If the CPU 111 determines that a ferry is not contained in the route to the destination of the vehicle, the CPU 111 terminates the program.

Accordingly, while the lookout state continues, the security ECU 101 determines the presence or absence of theft occurrence based on output of all sensors including an inclination sensor 135.

If the CPU 111 determines that a ferry is contained in the route to the destination of the vehicle, the CPU 111 determines whether or not the vehicle arrives at the ferry terminal based on information from the navigation system 102 (S1302). If the CPU 111 does not determine that the vehicle arrives at the ferry terminal, the CPU 111 terminates the program.

Accordingly, while the lookout state continues, the security ECU 101 determines the presence or absence of theft occurrence based on output of all sensors including the inclination sensor 135.

On the other hand, if the CPU 111 determines at S1302 that the vehicle arrives at the ferry terminal, the CPU 111 outputs a notification signal to a monitor 124, thereby requesting the user to turn off the inclination sensor system (S1303).

Accordingly, if the user turns off an on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

Fifth Embodiment

In the embodiments described above, whether or not the vehicle is in a situation where the vehicle will sway during parking is determined based on the information from the navigation system. Alternatively, if the vehicle is parked in a parking lot of indoor move type, a ferry, etc., the inside of the vehicle becomes dark and therefore whether or not the vehicle is in a situation where the vehicle will sway during parking may be determined based on illumination information from an illuminometer. An embodiment for determining whether or not the vehicle is in a situation where the vehicle will sway during parking based on illumination information from an illuminometer will be discussed below:

The theft detection system configuration is the same as that in FIG. 21 and therefore will not be discussed again.

Figure 25:
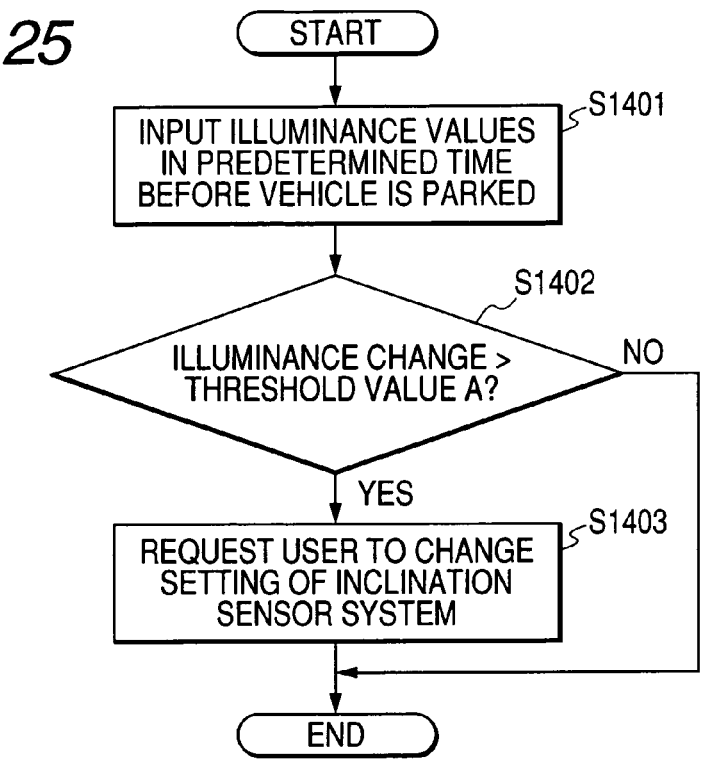
FIG. 25 is a flowchart to show the operation of a fifth embodiment of the invention when a security ECU is set to a lookout state.

A flowchart of FIG. 25 shows the operation of a CPU 111 of the embodiment for requesting the user to turn off an inclination sensor system if it is determined that the vehicle is in a situation where the vehicle will sway during parking based on illumination information from an illuminometer. If a security ECU 101 is set to a lookout state, the CPU 111 starts a setting program of the inclination sensor system shown in the flowchart of FIG. 25.

When starting the setting program of the inclination sensor system shown in the flowchart of FIG. 25, the CPU 111 inputs the illuminance values in predetermined time before the vehicle is parked from RAM 113 (S1401).

Figure 26A:
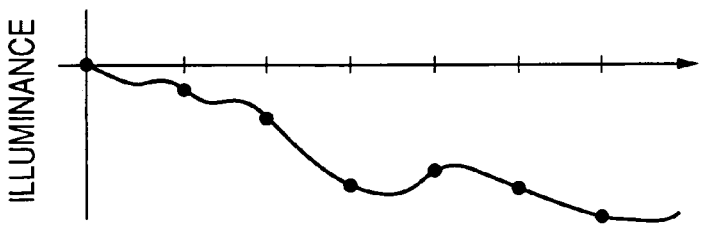
FIGS. 26A and 26B are drawings to show illumination read value and illuminance change every predetermined time.

That is, the CPU 111 of the security ECU 101 inputs output of an illuminance sensor 139 at predetermined time intervals in the RAM 113 as shown in FIG. 26A. If the security ECU 101 is set to the lookout state, the CPU 111 inputs the illuminance values stored in the RAM 113 in the predetermined time before the vehicle is parked.

Figure 26B:
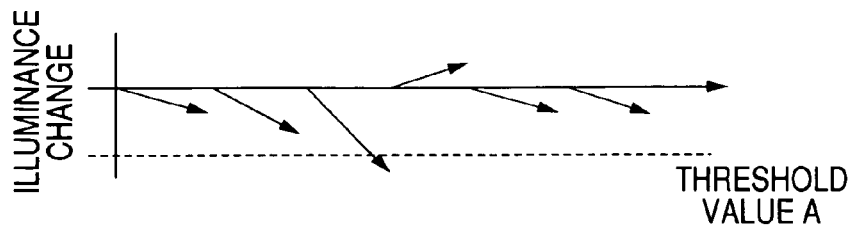

Next, the CPU 111 detects illuminance value change based on the input illuminance values and determines whether or not the illuminance change is greater than a threshold value A (S1402) as shown in FIG. 26B. If the CPU 111 determines that the illuminance change is smaller than the threshold value A, the CPU 111 terminates the program.

Accordingly, while the lookout state continues, the security ECU 101 determines the presence or absence of theft occurrence based on output of all sensors including an inclination sensor 135.

On the other hand, if the CPU 111 determines at S1402 that the illuminance change is greater than the threshold value A, the CPU 111 determines that the vehicle enters a parking lot of indoor move type, a ferry, etc., and the inside of the vehicle becomes dark. Then, the CPU 111 outputs a notification signal to a monitor 124, thereby requesting the user to turn off the inclination sensor system (S1403).

Accordingly, if the user turns off an on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

In the embodiment, output of the illuminance sensor 139 is input and is stored in the RAM 113 at predetermined time intervals. Alternatively, output of the illuminance sensor 139 may be input and be stored in the RAM 113 every given travel distance. In this case, when the security ECU 101 is set to the lookout state and the illuminance change within a predetermined travel distance before the vehicle is parked is equal to or greater than a threshold value, it is determined that the vehicle is in a situation where the vehicle will sway during parking.

When the security ECU 101 is set to the lookout state and illumination in predetermined time after the vehicle is parked is input and the illuminance change detected based on the input illuminance values is equal to or greater than a threshold value, it may be determined that the vehicle is in a situation where the vehicle will sway during parking.

Sixth Embodiment

On the other hand, if illuminance change is detected in the nighttime, etc., it is difficult to determine that the vehicle has entered a parking lot of indoor move type, a ferry, etc. Thus, illuminance change may be detected only if the current time of day is within the duration of sunshine. The operation of a CPU 111 for detecting illuminance change only if the current time of day is within the duration of sunshine will be discussed with reference to a flowchart of FIG. 27.

Figure 27:
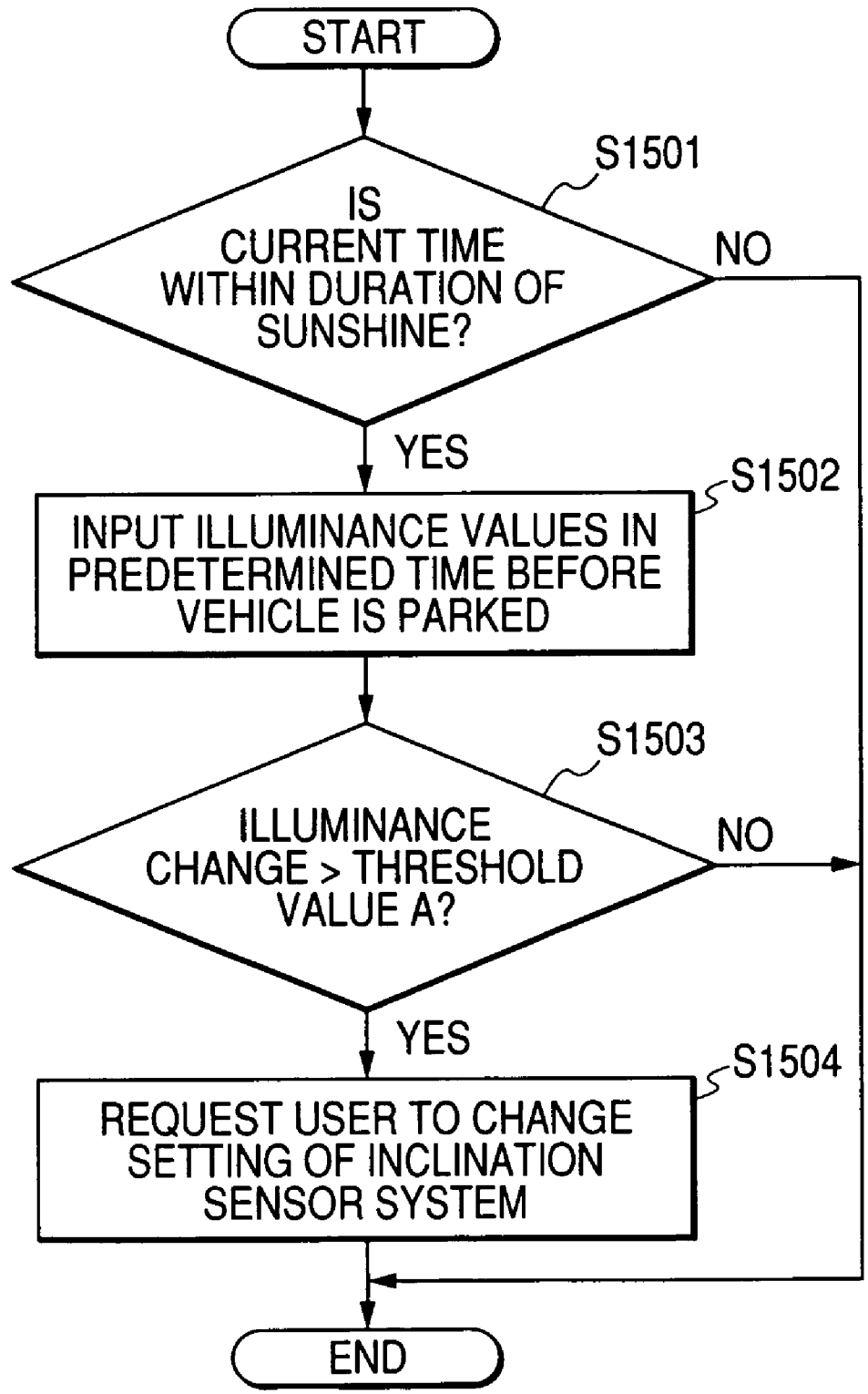
FIG. 27 is a flowchart to show the operation of a sixth embodiment of the invention when a security ECU is set to a lookout state.

If a security ECU 101 is set to a lookout state, the CPU 111 starts a setting program of the inclination sensor system shown in the flowchart of FIG. 27. First, the CPU 111 determines whether or not the current time is within the duration of sunshine based on a time signal from a wave clock 114 (S1501). If the CPU 111 determines that the current time is not within the duration of sunshine, the CPU 111 terminates the program.

Accordingly, while the lookout state continues, the security ECU 101 determines the presence or absence of theft occurrence based on output of all sensors including an inclination sensor 135.

If the CPU 111 determines at S1501 that the current time is within the duration of sunshine, the CPU 111 inputs the illuminance values in predetermined time before the vehicle is parked from RAM 113 (S1502). Next, the CPU 111 detects illuminance value change based on the input illuminance values and determines whether or not the illuminance change is greater than a threshold value A (S1503). If the CPU 111 determines that the illuminance change is smaller than the threshold value A, the CPU 111 terminates the program.

Accordingly, while the lookout state continues, the security ECU 101 determines the presence or absence of theft occurrence based on output of all sensors including an inclination sensor 135.

On the other hand, if the CPU 111 determines at S1503 that the illuminance change is greater than the threshold value A, the CPU 111 determines that the vehicle enters a parking lot of indoor move type, a ferry, etc., and the inside of the vehicle becomes dark. Then, the CPU 111 outputs a notification signal to a monitor 124, thereby requesting the user to turn off the inclination sensor system (S1504).

As described above, illuminance change is detected only if the current time is within the duration of sunshine, whereby illuminance change is not detected unless the current time is within the duration of sunshine. Thus, it is made possible to skip fruitless illumination determination processing.

Seventh Embodiment

In the embodiments described above, illuminance change is compared with the predetermined threshold value, whereby whether or not the vehicle is in a situation where the vehicle will sway during parking is determined. Alternatively, the illuminance change threshold value may be adjusted based on the time or weather information. The operation of a CPU 111 for adjusting the illuminance change threshold value based on weather information will be discussed with reference to a flowchart of FIG. 28.

Figure 28:
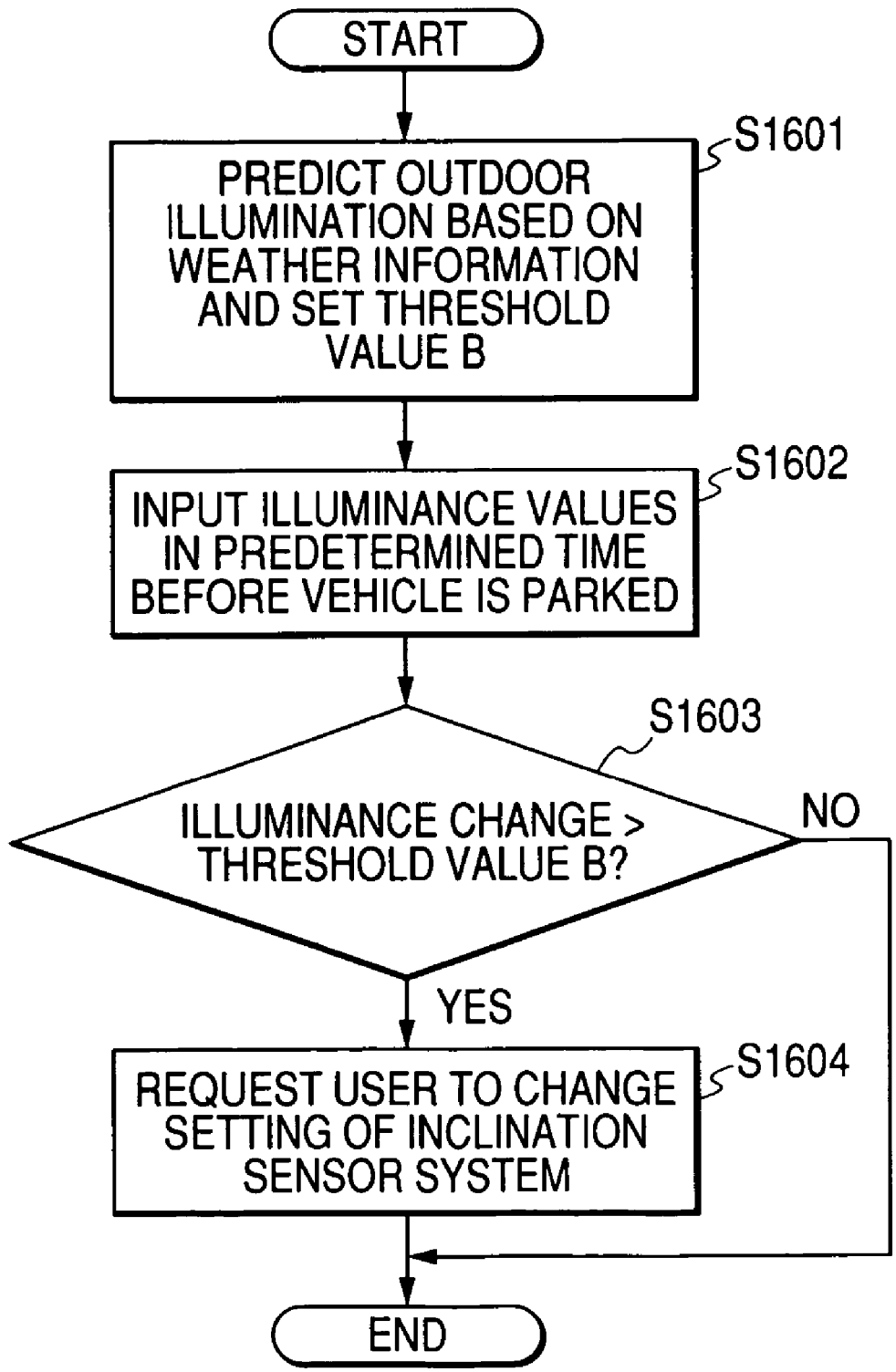
FIG. 28 is a flowchart to show the operation of a seventh embodiment of the invention when a security ECU is set to a lookout state.

If a security ECU 101 is set to a lookout state, the CPU 111 starts a setting program of the inclination sensor system shown in the flowchart of FIG. 28. The CPU 111 predicts outdoor illumination caused by whether based on weather information from a navigation system 102 and adjusts an illuminance change threshold value B according to the information (S1601). That is, when the weather is good, the threshold value B is increased; when the weather is bad, the threshold value B is lessened.

Next, the CPU 111 inputs the illuminance values in predetermined time just before the vehicle is parked from RAM 113 (S1602) and then detects illuminance value change based on the input illuminance values and determines whether or not the illuminance change is greater than the threshold value B (S1603). If the CPU 111 determines that the illuminance change is smaller than the threshold value B, the CPU 111 terminates the program.

Accordingly, while the lookout state continues, the security ECU 101 determines the presence or absence of theft occurrence based on output of all sensors including an inclination sensor 135.

On the other hand, if the CPU 111 determines at S1603 that the illuminance change is greater than the threshold value B, the CPU 111 determines that the vehicle enters a parking lot of indoor move type, a ferry, etc., and the inside of the vehicle becomes dark. Then, the CPU 111 outputs a notification signal to a monitor 124, thereby requesting the user to turn off the inclination sensor system (S1604).

As described above, the illuminance change threshold value is adjusted based on the weather information, whereby the threshold value can be set in response to the outdoor illumination. Thus, whether or not the vehicle is positioned in a parking lot of indoor move type, a ferry, etc., can be detected reliably.

Eighth Embodiment

An illuminance change threshold value may be adjusted based on the current date and time, time information. The operation of a CPU 111 for adjusting the illuminance change threshold value based on time information will be discussed with reference to a flowchart of FIG. 29.

Figure 29:
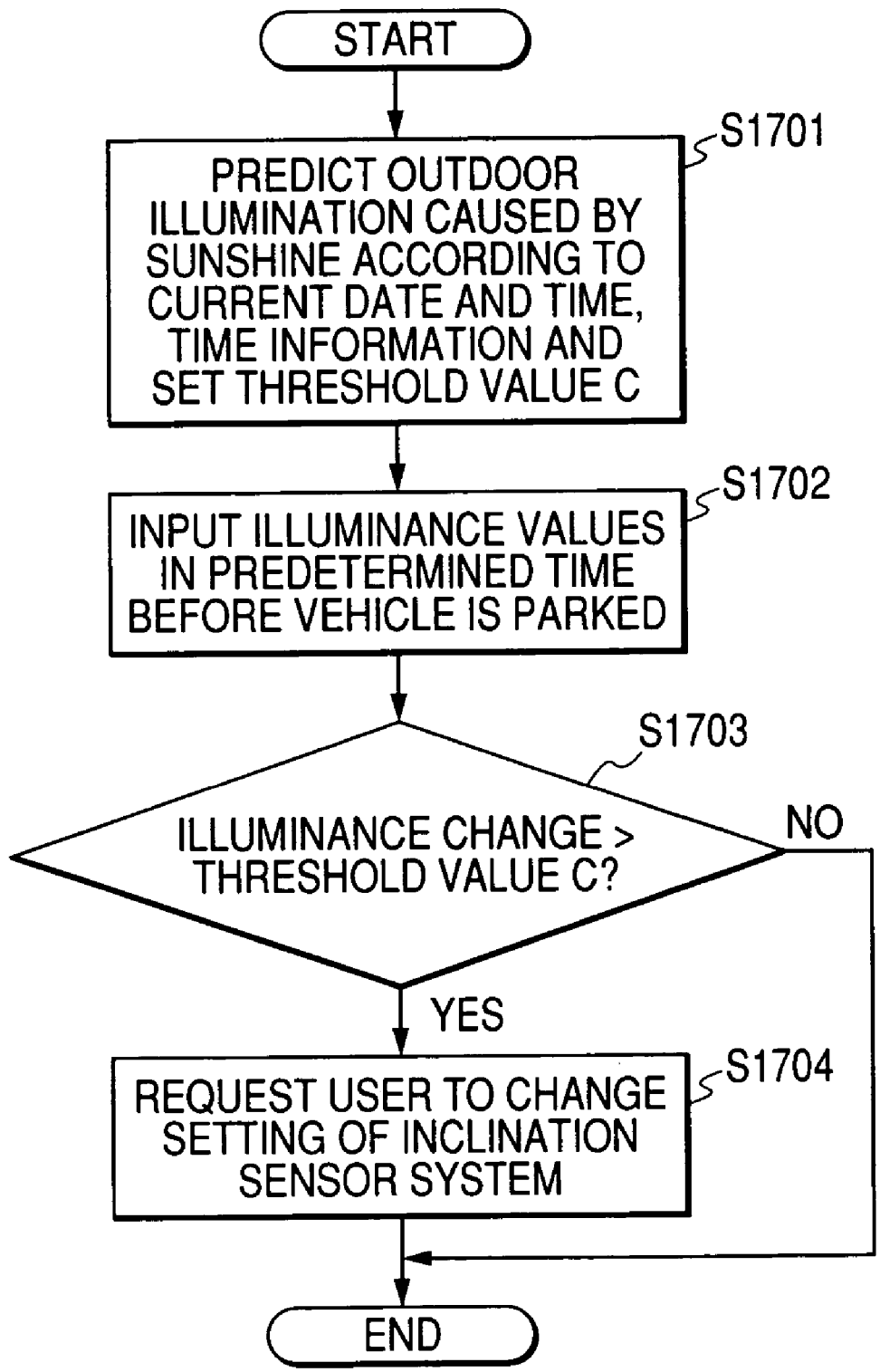
FIG. 29 is a flowchart to show the operation of an eighth embodiment of the invention when a security ECU is set to a lookout state.

If a security ECU 101 is set to a lookout state, the CPU 111 starts a setting program of an inclination sensor system shown in the flowchart of FIG. 29. The CPU 111 reads average yearly illumination at the date and time based on the current date and time, time information from a wave clock 114 from ROM 112 and adjusts an illuminance change threshold value C based on the average illumination (S1701). That is, when the average illumination is high, the CPU 111 increases the threshold value C; when the average illumination is low, the CPU 111 lessens the threshold value C.

Next, the CPU 111 inputs the illuminance values in predetermined time just before the vehicle is parked from RAM 113 (S1702) and then detects illuminance value change based on the input illuminance values and determines whether or not the illuminance change is greater than the threshold value C (S1703). If the CPU 111 determines that the illuminance change is smaller than the threshold value C, the CPU 111 terminates the program.

Accordingly, while the lookout state continues, the security ECU 101 determines the presence or absence of theft occurrence based on output of all sensors including an inclination sensor 135.

On the other hand, if the CPU 111 determines at S1703 that the illuminance change is greater than the threshold value C, the CPU 111 determines that the vehicle enters a parking lot of indoor move type, a ferry, etc., and the inside of the vehicle becomes dark. Then, the CPU 111 outputs a notification signal to a monitor 124, thereby requesting the user to turn off the inclination sensor system (S1704).

As described above, the illuminance change threshold value is adjusted based on the current date and time, time information, whereby the threshold value can be set in response to the date and time. Thus, whether or not the vehicle is positioned in a parking lot of indoor move type, a ferry, etc., can be detected reliably.

Ninth Embodiment

Output of an inclination sensor may be used to determine whether or not the vehicle is in a situation where the vehicle will sway during parking in a parking lot of indoor move type, a ferry, etc. An embodiment for using output of an inclination sensor to determine whether or not the vehicle is in a situation where the vehicle will sway during parking will be discussed below:

The theft detection system configuration is the same as that in FIG. 21 and therefore will not be discussed again.

Figure 30:
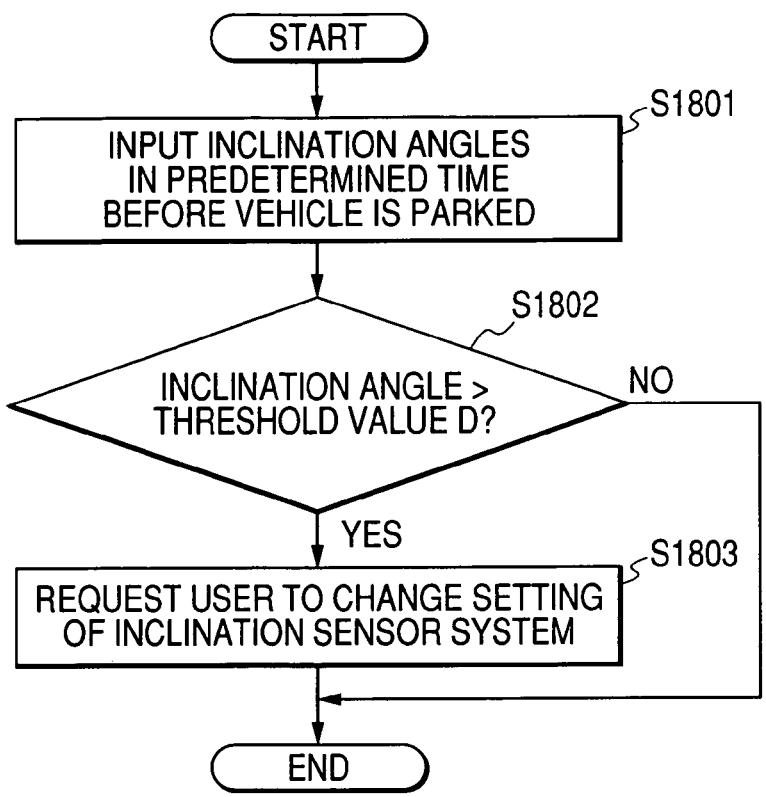
FIG. 30 is a flowchart to show the operation of a ninth embodiment of the invention when a security ECU is set to a lookout state.

A flowchart of FIG. 30 shows the operation of a CPU 111 for determining whether or not the vehicle is in a situation where the vehicle will sway during parking based on the inclination angle in predetermined time before the vehicle is parked.

If a security ECU 101 is set to a lookout state, the CPU 111 starts a setting program of an inclination sensor system shown in the flowchart of FIG. 30. First, the CPU 111 reads the inclination angle in predetermined time before the vehicle is parked from RAM 113 (S1801).

That is, the CPU 111 of the security ECU 101 inputs the difference between output of an inclination sensor 135 and an offset value at predetermined time intervals as the inclination angle at all times and stores the inclination angle in the RAM 113. If the security ECU 101 is set to the lookout state, the CPU 111 reads the inclination angles in predetermined time before the vehicle is parked from the RAM 113. The offset value is an average value of predetermined time of filtering output of the inclination sensor 135.

Next, the CPU 111 determines whether or not any of the read inclination angles is greater than a threshold value D (S1802). If the CPU 111 determines that any of the read inclination angles is smaller than the threshold value D, the CPU 111 terminates the program.

Accordingly, while the lookout state continues, the security ECU 101 determines the presence or absence of theft occurrence based on output of all sensors including an inclination sensor 135.

On the other hand, if the CPU 111 determines at S1802 that any of the inclination angles is greater than the threshold value D, the CPU 111 determines that the vehicle is parked in a place where the vehicle will sway such as a parking lot of indoor move type or a ferry. Then, the CPU 111 outputs a notification signal to a monitor 124, thereby requesting the user to turn off the inclination sensor system (S1803).

Accordingly, if the user turns off an on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

In the embodiment, if the difference between output of the inclination sensor 135 and the offset value exceeds the predetermined threshold value, it is determined that the vehicle is in a situation where the vehicle will sway during parking. Alternatively, output of the inclination sensor 135 is stored at predetermined time intervals and when the inclination angle change amount in predetermined time before the vehicle is parked exceeds a predetermined threshold value, it may be determined that the vehicle is in a situation where the vehicle will sway during parking.

In the embodiment, whether or not the vehicle is in a situation where the vehicle will sway during parking is determined based on the inclination angle in the predetermined time before the vehicle is parked. Alternatively, whether or not the vehicle is in a situation where the vehicle will sway during parking may be determined based on the inclination angle in predetermined time after the vehicle is parked. If the inclination angle in predetermined time after the security system is set is equal to or greater than a threshold value, it may be determined that the vehicle is in a situation where the vehicle will sway during parking.

Tenth Embodiment

In the embodiment described above, whether or not the vehicle is in a situation where the vehicle will sway during parking is determined based on the inclination angle. Alternatively, whether or not the vehicle is in a situation where the vehicle will sway during parking may be determined based on the inclination angular velocity. An embodiment for determining whether or not the vehicle is in a situation where the vehicle will sway during parking based on the inclination angular velocity will be discussed with reference to a flowchart of FIG. 31.

Figure 31:
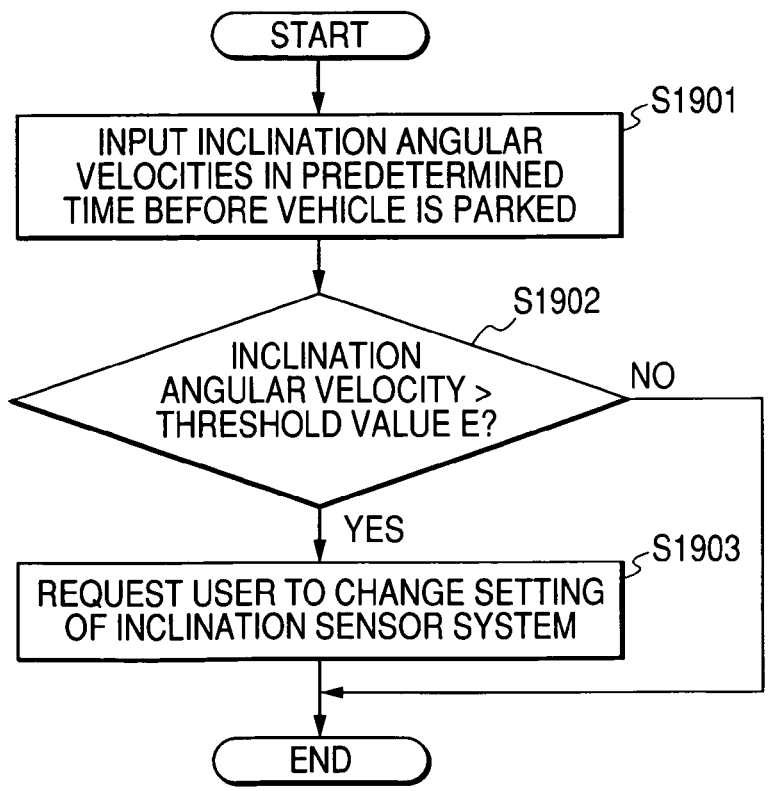
FIG. 31 is a flowchart to show the operation of a tenth embodiment of the invention when a security ECU is set to a lookout state.

If a security ECU 101 is set to a lookout state, the CPU 111 starts a setting program of an inclination sensor system shown in the flowchart of FIG. 31. First, the CPU 111 reads the inclination angular velocities in the predetermined time before the vehicle is parked from RAM 113 (S1901).

That is, the CPU 111 of the security ECU 101 calculates the inclination angular velocity at predetermined time intervals based on output of an inclination sensor 135 and stores the inclination angular velocity in the RAM 113. If the security ECU 101 is set to the lookout state, the CPU 111 reads the inclination angular velocities in predetermined time before the vehicle is parked from the RAM 113.

Next, the CPU 111 determines whether or not any of the read inclination angular velocities is greater than a threshold value E (S1902). If the CPU 111 determines that any of the inclination angular velocities is smaller than the threshold value E, the CPU 111 terminates the program.

Accordingly, while the lookout state continues, the security ECU 101 determines the presence or absence of theft occurrence based on output of all sensors including the inclination sensor 135.

On the other hand, if the CPU 111 determines at S1902 that any of the inclination angular velocities is greater than the threshold value E, the CPU 111 determines that the vehicle is parked in a place where the vehicle will sway such as a parking lot of indoor move type or a ferry. Then, the CPU 111 outputs a notification signal to a monitor 124, thereby requesting the user to turn off the inclination sensor system (S1903).

Accordingly, if the user turns off an on/off switch 138, while the lookout state continues, the security ECU 101 determines the presence or absence of theft occurrence based on output of other theft detection sensors than the inclination sensor 135. Thus, the malfunction of the inclination sensor system caused by sway of a palette in a parking lot or a ferry can be prevented.

In the embodiment, whether or not the vehicle is in a situation where the vehicle will sway during parking is determined based on the inclination angular velocities in the predetermined time before the vehicle is parked. Alternatively, the inclination angular velocities in predetermined time after the vehicle is parked are read and if any of the inclination angular velocities is equal to or greater than a threshold value, it can also be determined that the vehicle is in a situation where the vehicle will sway during parking or if any of the inclination angular velocities in predetermined time after the security system is set is equal to or greater than a threshold value, it can also be determined that the vehicle is in a situation where the vehicle will sway during parking.

In the embodiments described above, if it is determined that the vehicle is in a situation where the vehicle will sway during parking, the user is requested to turn off the inclination sensor system. Alternatively, a notification may be made so as to increase the theft determination threshold value or a notification may be made so as to change setting of inclination angle calculation processing to prevent sway of a palette in a parking lot or a ferry from causing an alarm to occur instead of turning off the inclination sensor system. The setting change of the inclination angle calculation processing contains, for example, (i) inclination sensor output is low-pass filtered for removing an inclination signal caused by sway of a palette in a parking lot or a ferry and (ii) if high-pass filter output of inclination sensor output is large, it is determined that sway of a palette in a parking lot or a ferry occurs and alarm operation is canceled.

Further, in the embodiments described above, a request for turning off the inclination sensor system is displayed on the monitor 124 of the navigation system 102. Alternatively, a loudspeaker of a vehicle-installed audio machine may be used to request the user to turn off the inclination sensor system by voice. Mail may be transmitted to the previously registered mail address of the user of a mobile telephone, etc., for requesting the user to turn off the inclination sensor system.

A security transmitter may be provided with an indicator lamp for informing the user that setting of the inclination sensor system is to be turned off, so that the user is informed that setting of the inclination sensor system is to be turned off through the security transmitter by communications.

Further, in the embodiments described above, if security setting needs to be changed after the user sets security after parking the vehicle, a notification is sent to the user to change security setting. Alternatively, if security setting need not be changed, no notification may be sent to the user or a notification may be sent to the user not to change security setting.

Further, in the embodiments described above, if security setting needs to be changed after the user sets security after parking the vehicle, a notification is sent to the user to change security setting. Alternatively, the user may be notified how security is to be set (the theft detection function depending on inclination is to be validated/invalidated) before the user sets security after parking the vehicle.

Further, in the embodiments described above, the user turns on/off the theft detection function depending on inclination by operating the on/off switch. Alternatively, any other function of the security may be turned on/off. The security may be turned on/off.

Eleventh Embodiment

Figure 32:
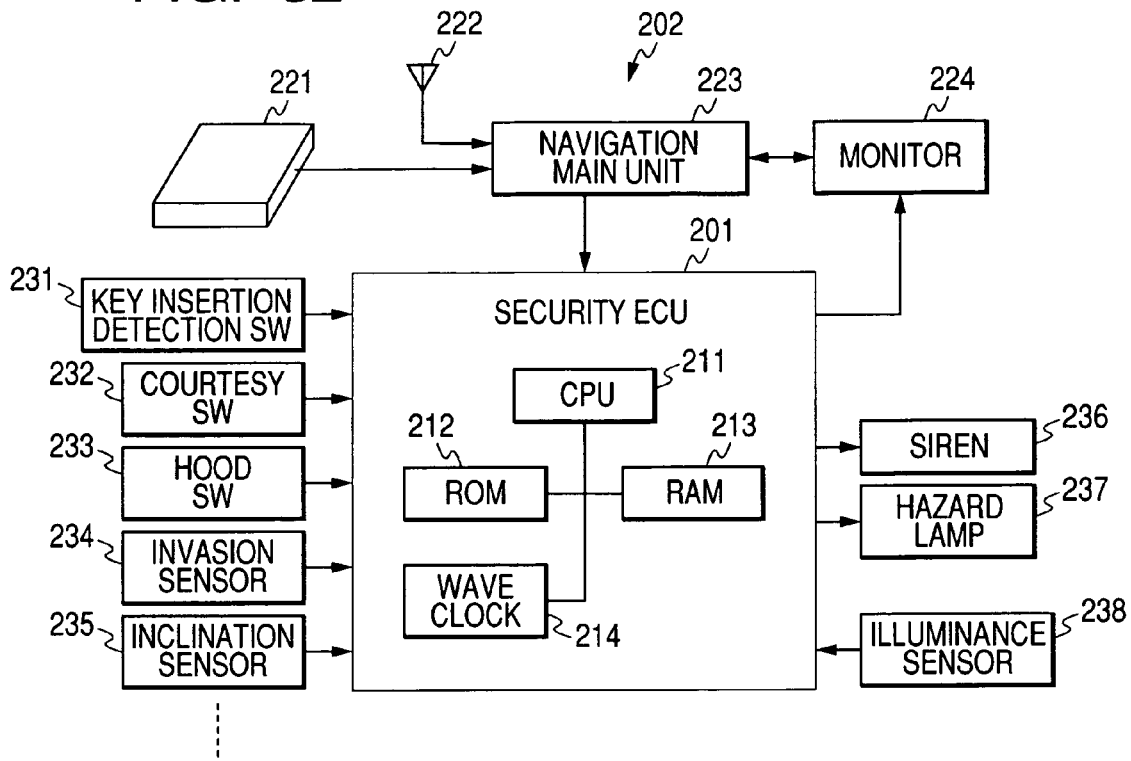
FIG. 32 is a block diagram to show the configuration of a theft detection system incorporating a vehicle theft detection device of an eleventh embodiment of the invention.

A vehicle theft detection device of an eleventh embodiment will be discussed below with the accompanying drawings:

FIG. 32 is a block diagram to show the configuration of a theft detection system of the eleventh embodiment. As shown in the figure, the theft detection system is made up of a security ECU 201 and a navigation system 202.

The security ECU 201 issues an alarm upon detection of breaking into the vehicle interior by unauthorized means, inclination of the vehicle, etc. Connected to the security ECU 201 are a key insertion detection switch (SW) 231 for detecting insertion of an ignition key, a courtesy SW 232 for detecting a door open/closed state, a hood SW 233 for detecting a hood open/closed state, an invasion sensor 234 for detecting invasion into the vehicle interior, an inclination sensor 235 for detecting inclination of the vehicle, a siren 236 for performing alarm operation in an alarm mode, a hazard lamp 237, an illuminance sensor 238 used for controlling headlights, interior indicators, and an air conditioner, etc., and the like.

The courtesy SW 232 detects opening/closing of a driver door, a passenger seat door, a rear door, or a trunk. The courtesy SWs 232 are provided in a one-to-one correspondence with the doors and the trunk, but only one is shown in FIG. 32 as a representative. For example, ultrasonic waves or radio waves are filled in the vehicle interior and the invasion sensor 234 detects frequency disorder of ultrasonic waves or radio waves when glass is broken or a human being moves in the vehicle interior. The inclination sensor 235 detects inclination of the vehicle when the vehicle is inclined to tow the vehicle.

The security ECU 201 is made up of a CPU 211, ROM (Read-Only Memory) 212, RAM (Random Access Memory) 213, and a wave clock 214. The CPU 211 controls the hardware of the security ECU 201 and executes various programs based on programs stored in the ROM 212. The RAM 213 is implemented as SRAM, etc., for storing temporary data occurring during program execution. The RAM 213 stores inclination of the vehicle at the time point when the security ECU 201 is set to a lookout state according to output of the inclination sensor 235, and the CPU 211 detects an anomaly later when the vehicle is unnaturally inclined. The wave clock 214 receives a standard wave (carrier wave) containing time information and takes out the time information from the standard wave, thereby counting the precise time of day.

On the other hand, the navigation system 202 is made up of a GPS antenna 221, a VICS antenna 222, a navigation main unit 223, and a monitor 224. The GPS antenna 221 receives a modulation wave transmitted from a plurality of NAVSTAR satellites carrying orbit information, satellite position information, and time information. The VICS antenna 222 receives a modulation wave on which congestion information, weather information, and the like are superposed. The navigation main unit (GPS receiver) 223 analyzes the received modulation wave, calculates the current position of the vehicle (latitude and longitude), and displays the vehicle position at the place corresponding to the current position on an electronic map displayed on the monitor 224. The navigation system 202 can not only detect information of a neighboring parking lot, etc., based on electronic map information from the current position, but also set the destination on the electronic map.

Further, output of the security ECU 201 is also input to the monitor 224. If setting of the inclination sensor system is changed, the monitor 224 can inform the user that setting of the inclination sensor system has been changed.

When the security ECU 201 is set to the lookout state, it estimates the vehicle situation. If the security ECU 201 determines that the vehicle is in a situation where the vehicle will sway at the parking time in a parking lot of indoor move type, a ferry, etc., the security ECU 201 automatically changes setting of the inclination sensor system. The operation when the security ECU 201 is set to the lookout state will be discussed with reference to a flowchart of FIG. 33.

Figure 33:
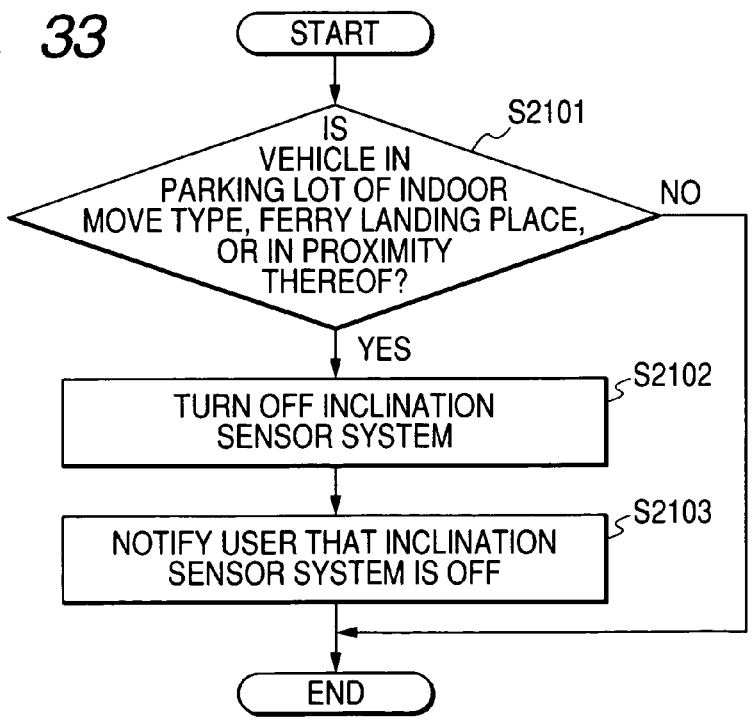
FIG. 33 is a flowchart to show the operation when a security ECU is set to a lookout state.

The flowchart of FIG. 33 shows the operation of the CPU 211 to acquire the vehicle position just before the ignition is turned off based on navigation information and determine whether or not the vehicle is in a situation where the vehicle will sway at the parking time based on the acquired vehicle position.

If the security ECU 201 is set to the lookout state, for example, as it is determined that the key is removed based on output of the key insertion detection SW 231 or as an arming request signal is received from a security transmitter (not shown), the CPU 211 starts a setting program of the inclination sensor system shown in the flowchart of FIG. 33.

When starting the setting program of the inclination sensor system shown in the flowchart of FIG. 33, the CPU 211 acquires the vehicle position just before the ignition is turned off based on navigation information and determines whether or not the current position of the vehicle is in a parking lot of indoor move type, a ferry landing place, or in the proximity thereof based on the acquired vehicle position (S2101). If it is determined that the current position of the vehicle is not in a parking lot of indoor move type, a ferry landing place, or in the proximity thereof, the CPU 211 terminates the program.

Accordingly, while the lookout state continues, the security ECU 201 determines the presence or absence of theft occurrence based on output of all sensors including the inclination sensor 235.

On the other hand, if it is determined that the current position of the vehicle is in a parking lot of indoor move type, a ferry landing place, or in the proximity thereof, the CPU 211 forcibly turns off the inclination sensor system (S2102). Then, the CPU 211 displays the fact that the setting of the inclination sensor system has been changed, namely, the inclination sensor system has been turned off on the monitor 224 of the navigation system 202 (2103).

Accordingly, while the lookout state continues, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented. Further, the user can easily recognize that the inclination sensor system has been turned off.

Twelfth Embodiment

In the embodiment described above, whether or not the vehicle is in a situation where the vehicle will sway during parking is determined based on the vehicle position just before the ignition is turned off. Alternatively, if the destination of the vehicle is set to a parking lot of indoor move type or a ferry landing place, it may be determined that the vehicle is in a situation where the vehicle will sway during parking. The operation of a CPU 211 for turning off an inclination sensor system if the destination of the vehicle is set to a parking lot of indoor move type or a ferry will be discussed with reference to a flowchart of FIG. 34.

The theft detection system configuration is the same as that in FIG. 32 and therefore will not be discussed again.

Figure 34:
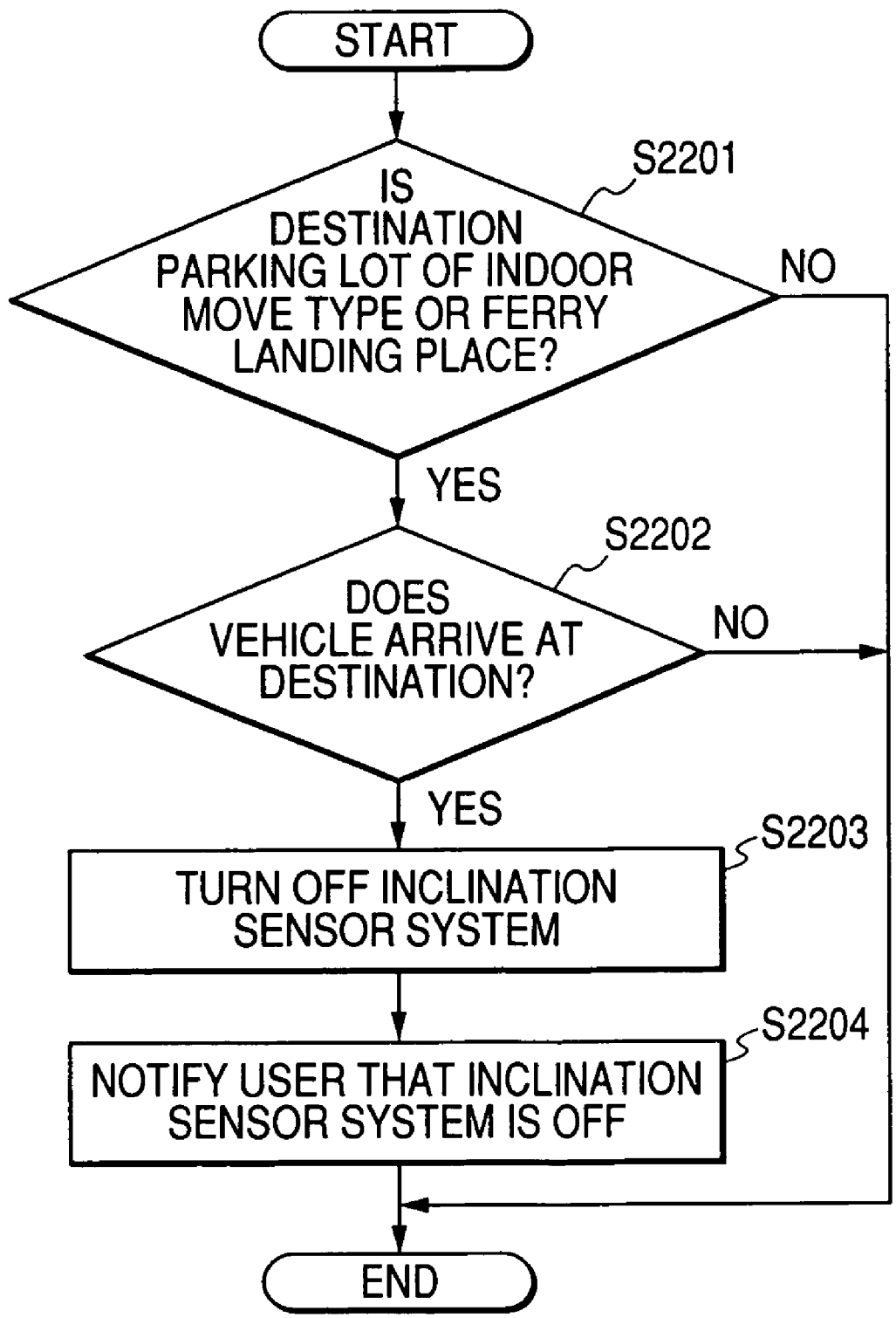
FIG. 34 is a flowchart to show the operation of a twelfth embodiment of the invention when a security ECU is set to a lookout state.

If a security ECU 201 is set to a lookout state, the CPU 211 starts a setting program of the inclination sensor system shown in the flowchart of FIG. 34. First, the CPU 211 determines whether or not the destination of the vehicle is set to a parking lot of indoor move type or a ferry landing place based on information from a navigation system 202 (S2201). If the CPU 211 determines that the destination of the vehicle is not a parking lot of indoor move type or a ferry landing place, the CPU 211 terminates the program.

Accordingly, while the lookout state continues, the security ECU 201 determines the presence or absence of theft occurrence based on output of all sensors including an inclination sensor 235.

If the CPU 211 determines that the destination of the vehicle is set to a parking lot of indoor move type or a ferry landing place, the CPU 211 determines whether or not the vehicle arrives at the destination based on information from the navigation system 202 (S2202). If the CPU 211 does not determine that the vehicle arrives at the destination, the CPU 211 terminates the program.

Accordingly, while the lookout state continues, the security ECU 201 determines the presence or absence of theft occurrence based on output of all sensors including the inclination sensor 235.

On the other hand, if the CPU 211 determines at S2202 that the vehicle arrives at the destination, the CPU 211 forcibly turns off the inclination sensor system (S2203). Then, the CPU 211 displays the fact that the inclination sensor system has been turned off on the monitor 224 of the navigation system 202 (2204).

Accordingly, while the lookout state continues, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

Thirteenth Embodiment

If a ferry is contained in the route to the destination of the vehicle, it may be determined that the vehicle is in a situation where the vehicle will sway during parking. The operation of a CPU 211 for turning off an inclination sensor system if a ferry is contained in the route to the destination of the vehicle will be discussed with reference to a flowchart of FIG. 35.

Figure 35:
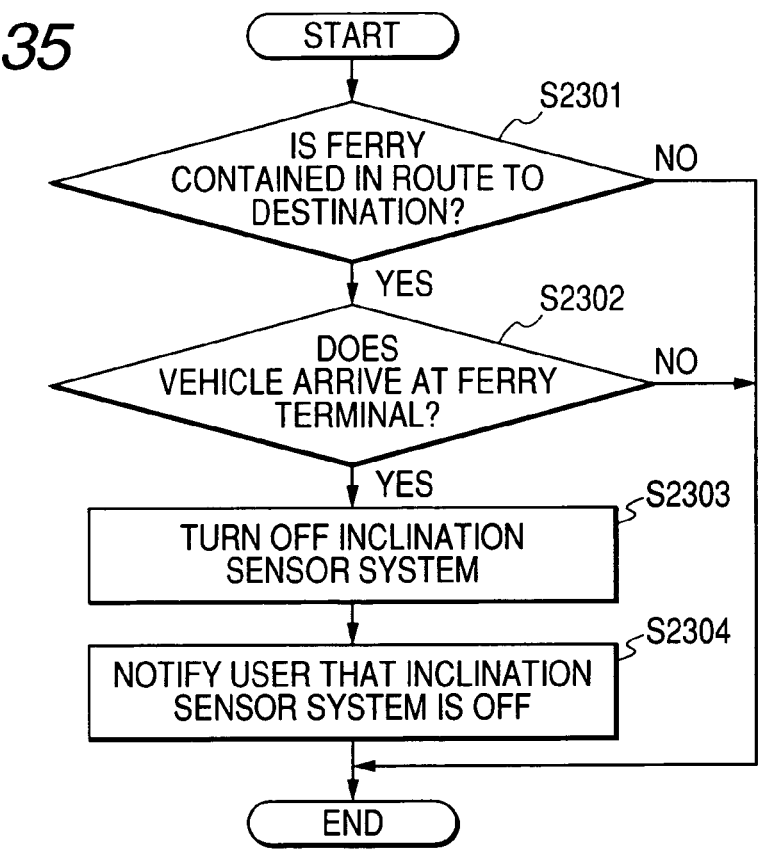
FIG. 35 is a flowchart to show the operation of a thirteenth embodiment of the invention when a security ECU is set to a lookout state.

If a security ECU 201 is set to a lookout state, the CPU 211 starts a setting program of the inclination sensor system shown in the flowchart of FIG. 35. First, the CPU 211 determines whether or not a ferry is contained in the route to the destination of the vehicle based on information from a navigation system 202 (S2301). If the CPU 211 determines that a ferry is not contained in the route to the destination of the vehicle, the CPU 211 terminates the program.

Accordingly, while the lookout state continues, the security ECU 201 determines the presence or absence of theft occurrence based on output of all sensors including an inclination sensor 235.

If the CPU 211 determines that a ferry is contained in the route to the destination of the vehicle, the CPU 211 determines whether or not the vehicle arrives at the ferry terminal based on information from the navigation system 202 (S2302). If the CPU 211 does not determine that the vehicle arrives at the ferry terminal, the CPU 211 terminates the program.

Accordingly, while the lookout state continues, the security ECU 201 determines the presence or absence of theft occurrence based on output of all sensors including the inclination sensor 235.

On the other hand, if the CPU 211 determines at S2302 that the vehicle arrives at the ferry terminal, the CPU 211 forcibly turns off the inclination sensor system (S2303). Then, the CPU 211 displays the fact that the inclination sensor system has been turned off on the monitor 224 of the navigation system 202 (2304).

Accordingly, while the lookout state continues, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

Fourteenth Embodiment

In the embodiments described above, if it is determined that the vehicle is in a situation where the vehicle will sway during parking, the inclination sensor system is turned off. Malfunction caused by an inclination other than vehicle theft may be prevented by changing the calculation processing without turning off the inclination sensor system.

Figure 36:
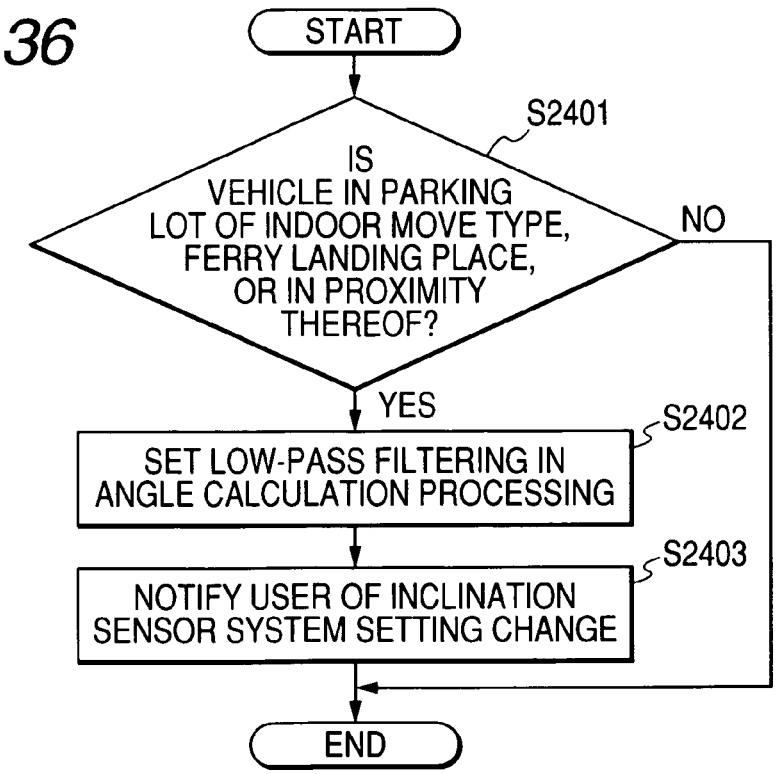
FIG. 36 is a flowchart to show the operation of a fourteenth embodiment of the invention when a security ECU is set to a lookout state.

A flowchart of FIG. 36 shows the operation of a CPU 211 for performing low-pass filtering of output of an inclination angle sensor if it is determined that the vehicle is in a situation where the vehicle will sway during parking.

If a security ECU 201 is set to a lookout state, the CPU 211 starts a setting program of an inclination sensor system shown in the flowchart of FIG. 35. First, the CPU 211 acquires the vehicle position just before the ignition is turned off based on information from a navigation system 202. The CPU 211 determines whether or not the current position of the vehicle is in a parking lot of indoor move type, a ferry landing place, or in the proximity thereof based on the acquired vehicle position (S2401). If the CPU 211 determines that the current position of the vehicle is not in a parking lot of indoor move type, a ferry landing place, or in the proximity thereof, the CPU 211 terminates the program.

Accordingly, while the lookout state continues, the security ECU 201 determines the presence or absence of theft occurrence based on output of all sensors including an inclination sensor 235.

On the other hand, if the CPU 211 determines that the current position of the vehicle is in a parking lot of indoor move type, a ferry landing place, or in the proximity thereof, the CPU 211 sets inclination angle calculation processing so as to contain low-pass filtering (S2402). Then, the CPU 211 displays the fact that the setting of the inclination sensor system has been changed, namely, the inclination angle calculation processing contains low-pass filtering on a monitor 224 of the navigation system 202 (2403).

Figure 37:
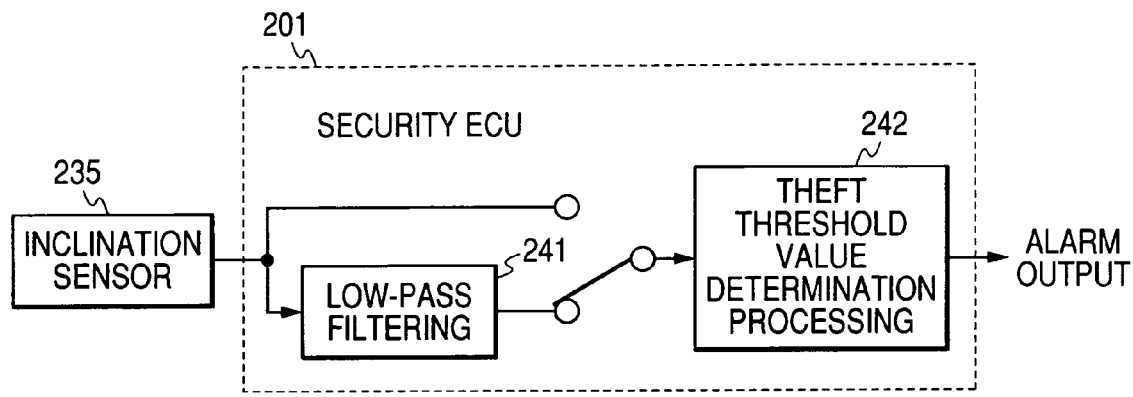
FIG. 37 is a functional block diagram to show calculation processing of an inclination angle signal in the security ECU.

Accordingly, theft threshold value determination processing 242 is performed based on an inclination angle signal subjected to low-pass filtering 241 as shown in FIG. 37 and an inclination signal caused by sway of a palette in a parking lot or a ferry is removed. Thus, it is made possible to prevent malfunction cause by sway of a palette or a ferry.

Fifteenth Embodiment

A theft determination threshold value may be set high for preventing malfunction. The operation of a CPU 211 for setting the theft determination threshold value high if it is determined that the vehicle is in a situation where the vehicle will sway during parking will be discussed with reference to a flowchart of FIG. 38.

Figure 38:
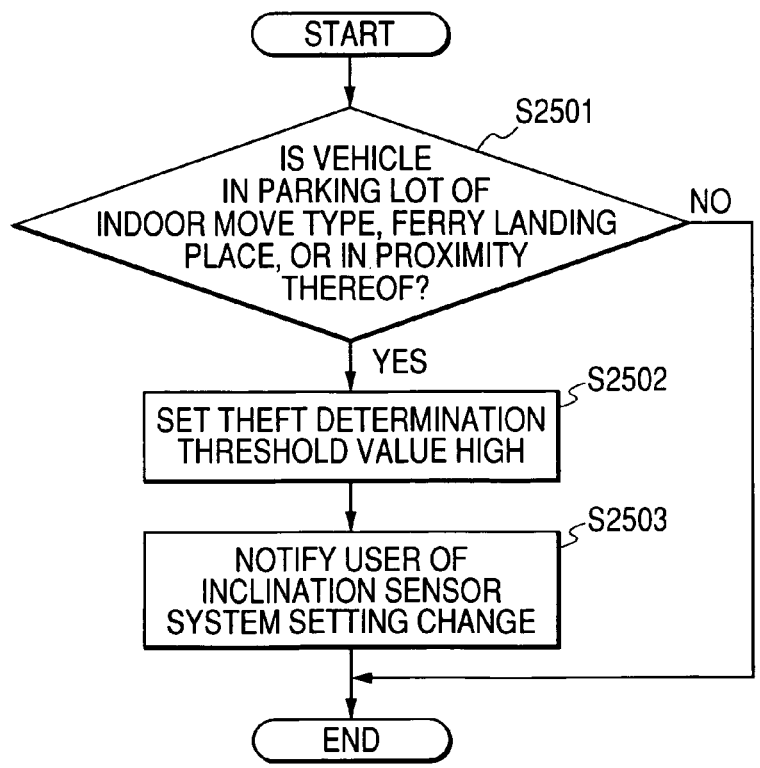
FIG. 38 is a flowchart to show the operation of a fifteenth embodiment of the invention when a security ECU is set to a lookout state.

If a security ECU 201 is set to a lookout state, the CPU 211 starts a setting program of an inclination sensor system shown in the flowchart of FIG. 38. First, the CPU 211 acquires the vehicle position just before the ignition is turned off based on information from a navigation system 202. The CPU 211 determines whether or not the current position of the vehicle is in a parking lot of indoor move type, a ferry landing place, or in the proximity thereof based on the acquired vehicle position (S2501). If the CPU 211 determines that the current position of the vehicle is not in a parking lot of indoor move type, a ferry landing place, or in the proximity thereof, the CPU 211 terminates the program.

Figure 39:
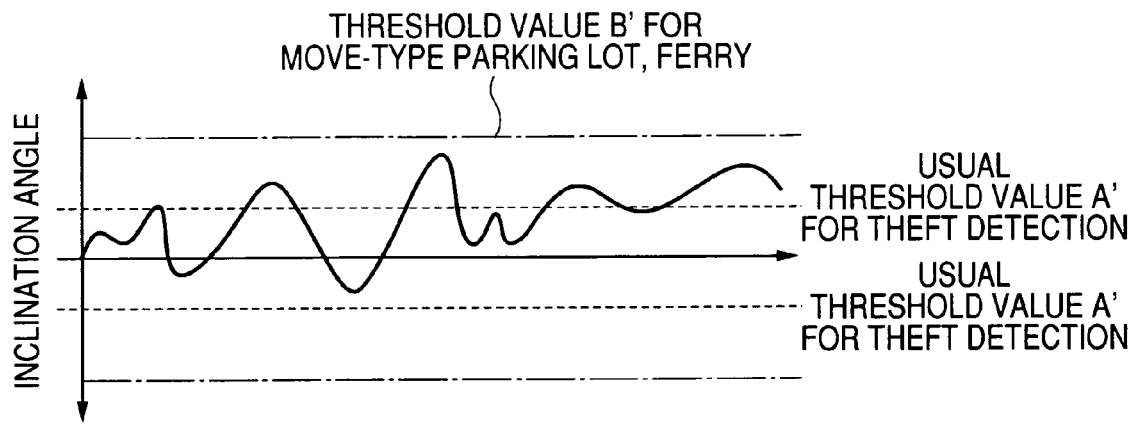
FIG. 39 is a waveform chart to show the comparison situation between theft detection threshold value and inclination angle calculation value.

Accordingly, while the lookout state continues, the security ECU 201 determines whether or not the inclination angle calculated according to output of an inclination sensor 235 exceeds a usual theft determination threshold value A' shown in FIG. 39, thereby determining whether or not an abnormal inclination occurs for detecting the presence or absence of theft occurrence.

On the other hand, if the CPU 211 determines that the current position of the vehicle is in a parking lot of indoor move type, a ferry landing place, or in the proximity thereof, the CPU 211 sets the theft determination threshold value of inclination angle to a threshold value B' for a parking lot of indoor move type, a ferry shown in FIG. 39 (S2502). The CPU 211 displays the fact that the setting of the inclination sensor system has been changed, namely, the theft determination threshold value of inclination angle is set high on a monitor 224 of the navigation system 202 (2503).

As described above, the theft determination threshold value of inclination angle is set high in a parking lot of indoor move type or a ferry. Thus, if the vehicle is slightly inclined due to sway of a palette in a parking lot or a ferry, an alarm signal is not generated and it is made possible to prevent malfunction cause by sway of a palette in a parking lot or a ferry.

Sixteenth Embodiment

Further, OFF logic using the calculation value provided by high-pass filtering the inclination angle may be applied aside from the main theft detection determination logic using the inclination angle calculation value, thereby preventing malfunction when the vehicle is in a situation where the vehicle will sway during parking. The operation of a CPU 211 for using the OFF logic will be discussed with reference to a flowchart of FIG. 40.

Figure 40:
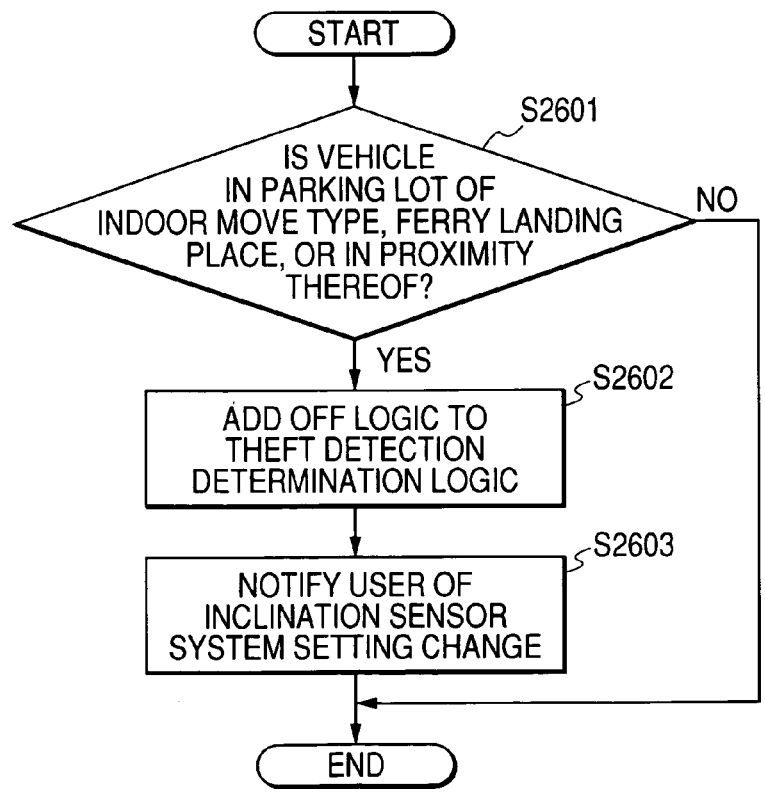
FIG. 40 is a flowchart to show the operation of a sixteenth embodiment of the invention when a security ECU is set to a lookout state.

If a security ECU 201 is set to a lookout state, the CPU 211 starts a setting program of an inclination sensor system shown in the flowchart of FIG. 40. First, the CPU 211 acquires the vehicle position just before the ignition is turned off based on information from a navigation system 202. The CPU 211 determines whether or not the current position of the vehicle is in a parking lot of indoor move type, a ferry landing place, or in the proximity thereof based on the acquired vehicle position (S2601). If the CPU 211 determines that the current position of the vehicle is not in a parking lot of indoor move type, a ferry landing place, or in the proximity thereof, the CPU 211 terminates the program.

Accordingly, while the lookout state continues, usual calculation processing is performed for output of an inclination sensor and the presence or absence of theft occurrence is detected.

On the other hand, if the CPU 211 determines that the current position of the vehicle is in a parking lot of indoor move type, a ferry landing place, or in the proximity thereof, the CPU 211 adds OFF logic to theft detection determination logic (S2602). The CPU 211 displays the fact that the setting of the inclination sensor system has been changed, namely, the OFF logic is added to the theft detection determination logic on a monitor 224 of the navigation system 202 (S2603).

Figure 41:
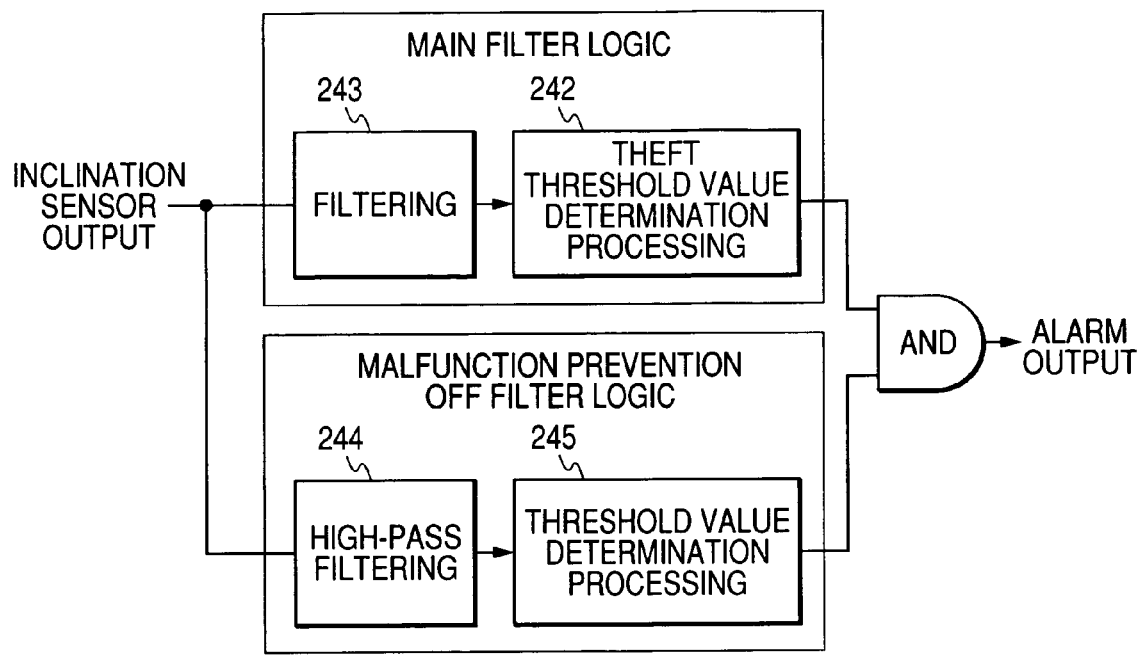
FIG. 41 is a drawing to show theft detection logic to which malfunction prevention OFF filter logic is added.

Accordingly, while the lookout state continues, the security ECU 201 executes main filter logic for performing comparison determination processing 242 between a signal provided by performing usual filtering 243 for inclination sensor output and a theft detection threshold value A' and malfunction prevention OFF filter logic for comparing a signal provided by performing high-pass filtering 244 for inclination sensor output with a malfunction prevention threshold value C', ANDs output of the main filter logic and output of the malfunction prevention OFF filter logic, and outputs an alarm according to the ANDing result, as shown in FIG. 41.

Figure 42:
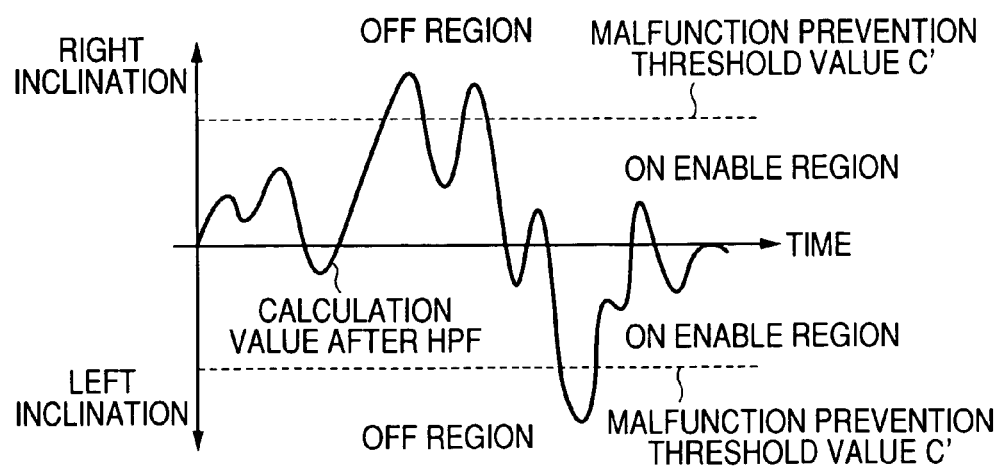
FIG. 42 is a waveform chart to show the determination situation of the malfunction prevention OFF filter logic.

When the signal provided by performing the high-pass filtering 244 for the inclination sensor output is within the range of the malfunction prevention threshold value C', the malfunction prevention OFF filter logic determines ON enable region and outputs an ON signal, as shown in FIG. 42. If the signal provided by performing the high-pass filtering 244 for the inclination sensor output exceeds the malfunction prevention threshold value C', the malfunction prevention OFF filter logic outputs an OFF signal.

Therefore, if the output of the main filter logic is ON and the output of the malfunction prevention OFF filter logic is ON, the CPU 211 determines that theft occurs, and outputs an alarm. On the other hand, if sway of a palette in a parking lot or a ferry occurs, the calculation processing result of the high-pass filtering 244 becomes large and the malfunction prevention OFF filter logic outputs OFF. Thus, no alarm is output and malfunction caused by an inclination other than theft can be prevented.

In the fourteenth to sixteenth embodiments described above, if it is determined that the vehicle position just before the ignition is turned off is in a parking lot of indoor move type, a ferry landing place, or in the proximity thereof, it is determined that the vehicle is in a situation where the vehicle will sway during parking. However, if the destination of the vehicle is set to a parking lot of indoor move type or a ferry landing place and the vehicle arrives at the destination or if a ferry is contained in the route to the destination of the vehicle and the vehicle arrives at the ferry terminal, it may be determined that the vehicle is in a situation where the vehicle will sway during parking as with the twelfth and thirteenth embodiments.

Seventeenth Embodiment

In the embodiments described above, whether or not the vehicle is in a situation where the vehicle will sway during parking is determined based on the information from the navigation system. By the way, if the vehicle is parked in a parking lot of indoor move type, a ferry, etc., the inside of the vehicle becomes dark. Thus, whether or not the vehicle is in a situation where the vehicle will sway during parking may be determined based on illumination information from an illuminometer. An embodiment for determining whether or not the vehicle is in a situation where the vehicle will sway during parking based on illumination information from an illuminometer will be discussed below:

The theft detection system configuration is the same as that in FIG. 32 and therefore will not be discussed again.

Figure 43:
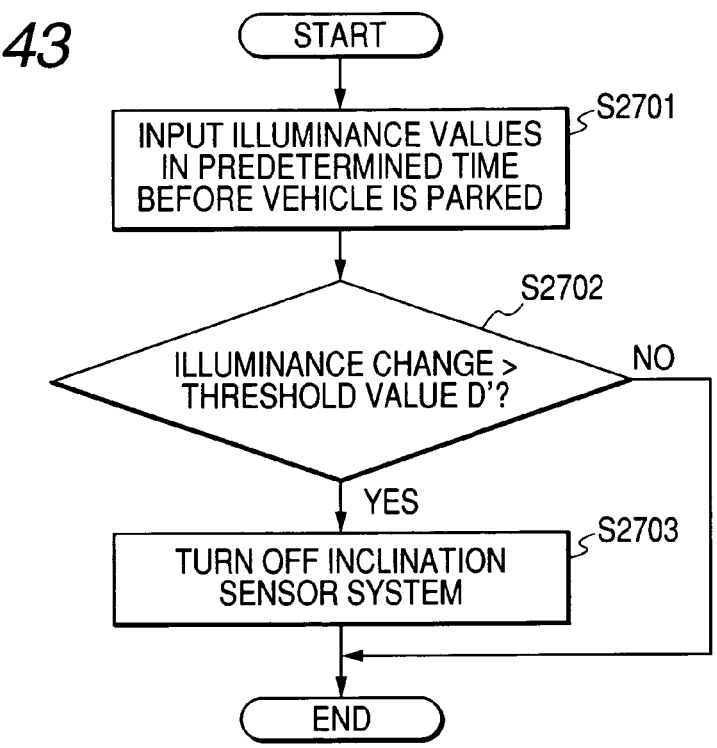
FIG. 43 is a flowchart to show the operation of a seventeenth embodiment of the invention when a security ECU is set to a lookout state.

A flowchart of FIG. 43 shows the operation of a CPU 211 of the embodiment for requesting the user to turn off an inclination sensor system if it is determined that the vehicle is in a situation where the vehicle will sway during parking based on illumination information from an illuminometer. If a security ECU 201 is set to a lookout state, the CPU 211 starts a setting program of the inclination sensor system shown in the flowchart of FIG. 43.

When starting the setting program of the inclination sensor system shown in the flowchart of FIG. 43, the CPU 211 inputs the illuminance values in predetermined time before the vehicle is parked from RAM 213 (S2701).

Figure 44A:
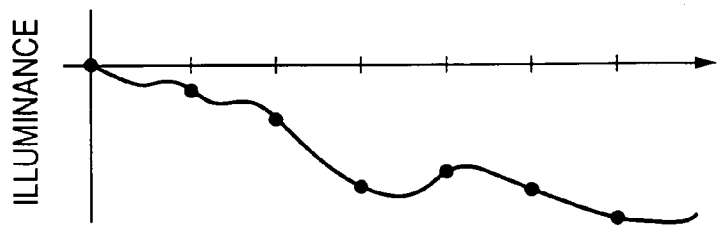
FIGS. 44A and 44B are drawings to show illumination read value and illuminance change every predetermined time.

That is, the CPU 211 of the security ECU 201 inputs output of an illuminance sensor 238 at predetermined time intervals in the RAM 213 as shown in FIG. 44A. If the security ECU 201 is set to the lookout state, the CPU 211 inputs the illuminance values stored in the RAM 213 in the predetermined time before the vehicle is parked from the RAM 213.

Figure 44B:
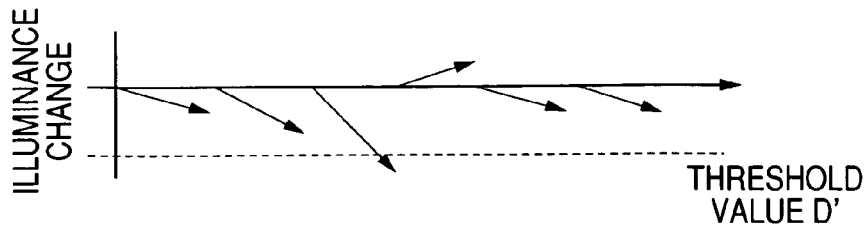

Next, the CPU 211 detects illuminance value change based on the input illuminance values and determines whether or not the illuminance change is greater than a threshold value D' (S2702) as shown in FIG. 44B. If the CPU 211 determines that the illuminance change is smaller than the threshold value D', the CPU 211 terminates the program.

Accordingly, while the lookout state continues, the security ECU 201 determines the presence or absence of theft occurrence based on output of all sensors including an inclination sensor 235.

On the other hand, if the CPU 211 determines at S2702 that the illuminance change is greater than the threshold value D', the CPU 211 determines that the vehicle enters a parking lot of indoor move type, a ferry, etc., and the inside of the vehicle becomes dark, and turns off the inclination sensor system (S2703).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

In the embodiment, output of the illuminance sensor 238 is input and is stored in the RAM 213 at predetermined time intervals. Alternatively, output of the illuminance sensor 238 may be input and be stored in the RAM 213 every given travel distance. In this case, when the security ECU 201 is set to the lookout state and the illuminance change within a predetermined travel distance before the vehicle is parked is equal to or greater than a threshold value, it is determined that the vehicle is in a situation where the vehicle will sway during parking.

When the security ECU 201 is set to the lookout state, illumination in predetermined time after the vehicle is parked may be input. In this case, if the illuminance change detected based on the input illuminance values is equal to or greater than a threshold value, it is determined that the vehicle is in a situation where the vehicle will sway during parking.

Eighteenth Embodiment

On the other hand, if illuminance change is detected in the nighttime, etc., it is difficult to determine that the vehicle has entered a parking lot of indoor move type, a ferry, etc. Thus, illuminance change may be detected only if the current time of day is within the duration of sunshine. The operation of a CPU 211 for detecting illuminance change only if the current time of day is within the duration of sunshine will be discussed with reference to a flowchart of FIG. 45.

Figure 45:
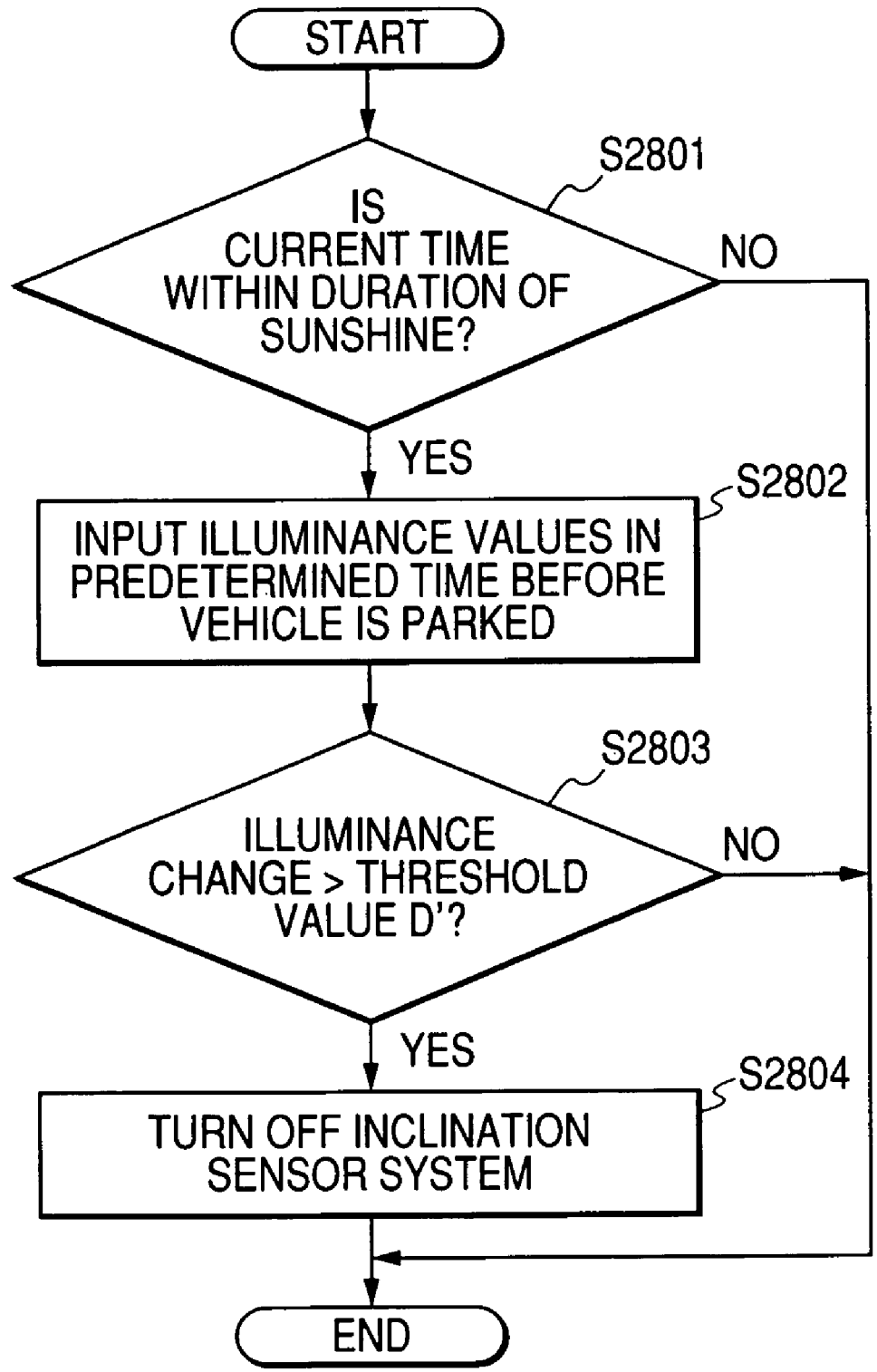
FIG. 45 is a flowchart to show the operation of an eighteenth embodiment of the invention when a security ECU is set to a lookout state.

If a security ECU 201 is set to a lookout state, the CPU 211 starts a setting program of the inclination sensor system shown in the flowchart of FIG. 45. First, the CPU 211 determines whether or not the current time is within the duration of sunshine based on a time signal from a wave clock 214 (S2801). If the CPU 211 determines that the current time is not within the duration of sunshine, the CPU 211 terminates the program.

Accordingly, while the lookout state continues, the security ECU 201 determines the presence or absence of theft occurrence based on output of all sensors including an inclination sensor 235.

If the CPU 211 determines at S2801 that the current time is within the duration of sunshine, the CPU 211 inputs the illuminance values in predetermined time before the vehicle is parked from RAM 213 (S2802). Next, the CPU 211 detects illuminance value change based on the input illuminance values and determines whether or not the illuminance change is greater than a threshold value D' (S2803). If the CPU 211 determines that the illuminance change is smaller than the threshold value D', the CPU 211 terminates the program.

Accordingly, while the lookout state continues, the security ECU 201 determines the presence or absence of theft occurrence based on output of all sensors including an inclination sensor 235.

On the other hand, if the CPU 211 determines at S2803 that the illuminance change is greater than the threshold value D', the CPU 211 determines that the vehicle enters a parking lot of indoor move type, a ferry, etc., and the inside of the vehicle becomes dark, and forcibly turns off the inclination sensor system (S2804).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

As described above, illuminance change is detected only if the current time is within the duration of sunshine, whereby illuminance change is not detected unless the current time is within the duration of sunshine. Thus, it is made possible to skip fruitless illumination determination processing.

Nineteenth Embodiment

In the embodiments described above, illuminance change is compared with the predetermined threshold value, whereby whether or not the vehicle is in a situation where the vehicle will sway during parking is determined. Alternatively, the illuminance change threshold value may be adjusted based on the time or weather information. The operation of a CPU 211 for adjusting the illuminance change threshold value based on weather information will be discussed with reference to a flowchart of FIG. 46.

Figure 46:
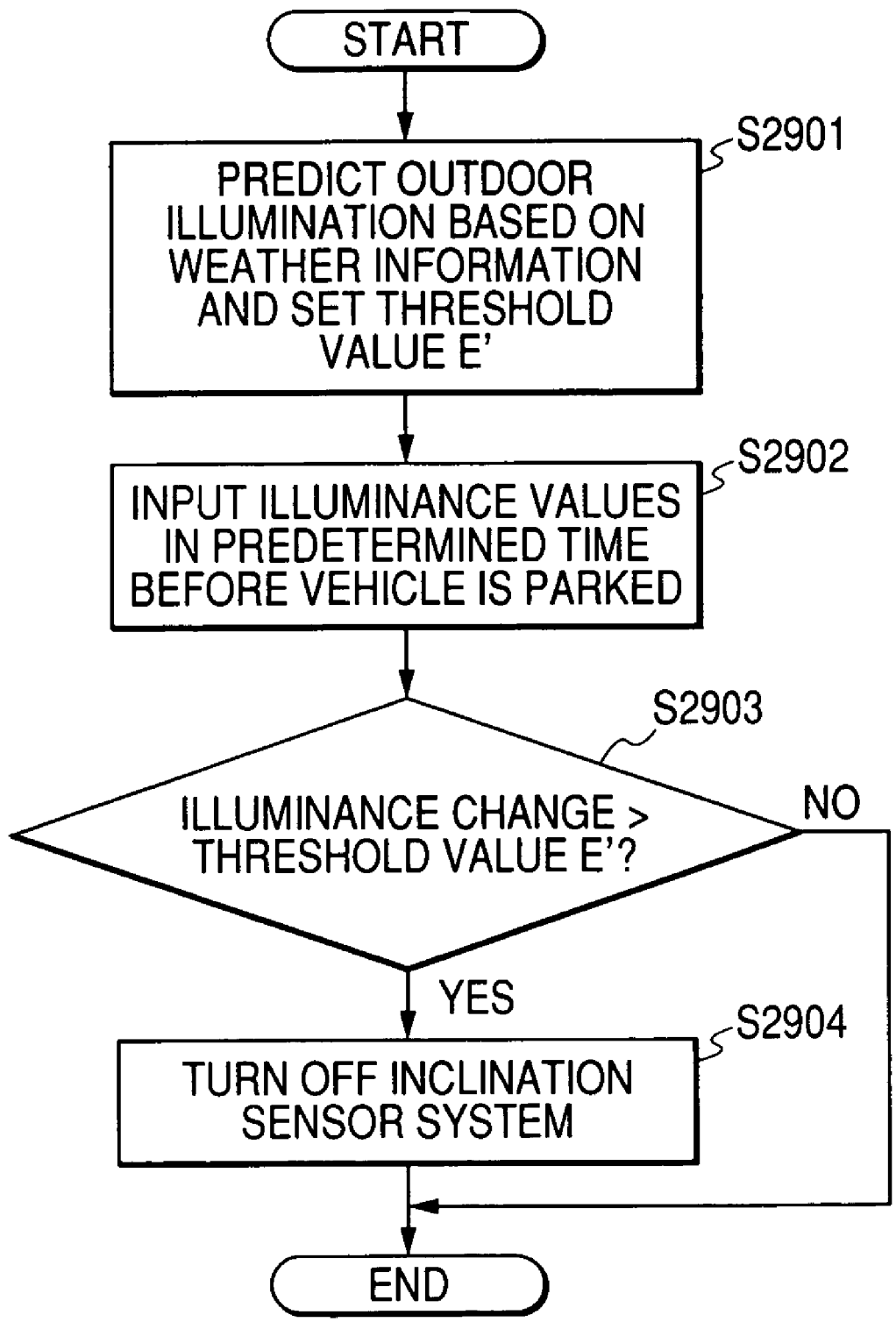
FIG. 46 is a flowchart to show the operation of a nineteenth embodiment of the invention when a security ECU is set to a lookout state.

If a security ECU 201 is set to a lookout state, the CPU 211 starts a setting program of the inclination sensor system shown in the flowchart of FIG. 46. The CPU 211 predicts outdoor illumination caused by weather based on whether information from a navigation system 202 and adjusts an illuminance change threshold value E' according to the information (S2901). That is, when the weather is good, the threshold value E' is increased; when the weather is bad, the threshold value E' is lessened.

Next, the CPU 211 inputs the illuminance values in predetermined time just before the vehicle is parked from RAM 213 (S2902). Then, the CPU 211 detects illuminance value change based on the input illuminance values and determines whether or not the illuminance change is greater than the threshold value E' (S2903). If the CPU 211 determines that the illuminance change is smaller than the threshold value E', the CPU 211 terminates the program.

Accordingly, while the lookout state continues, the security ECU 201 determines the presence or absence of theft occurrence based on output of all sensors including an inclination sensor 235.

On the other hand, if the CPU 211 determines at S2903 that the illuminance change is greater than the threshold value E', the CPU 211 determines that the vehicle enters a parking lot of indoor move type, a ferry, etc., and the inside of the vehicle becomes dark, and forcibly turns off the inclination sensor system (S2904).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

As described above, the illuminance change threshold value is adjusted based on the whether information, whereby the threshold value can be set in response to the outdoor illumination. Thus, whether or not the vehicle is positioned in a parking lot of indoor move type, a ferry, etc., can be detected reliably.

Twentieth Embodiment

An illuminance change threshold value may be adjusted based on the current date and time, time information. The operation of a CPU 211 for adjusting the illuminance change threshold value based on time information will be discussed with reference to a flowchart of FIG. 47.

Figure 47:
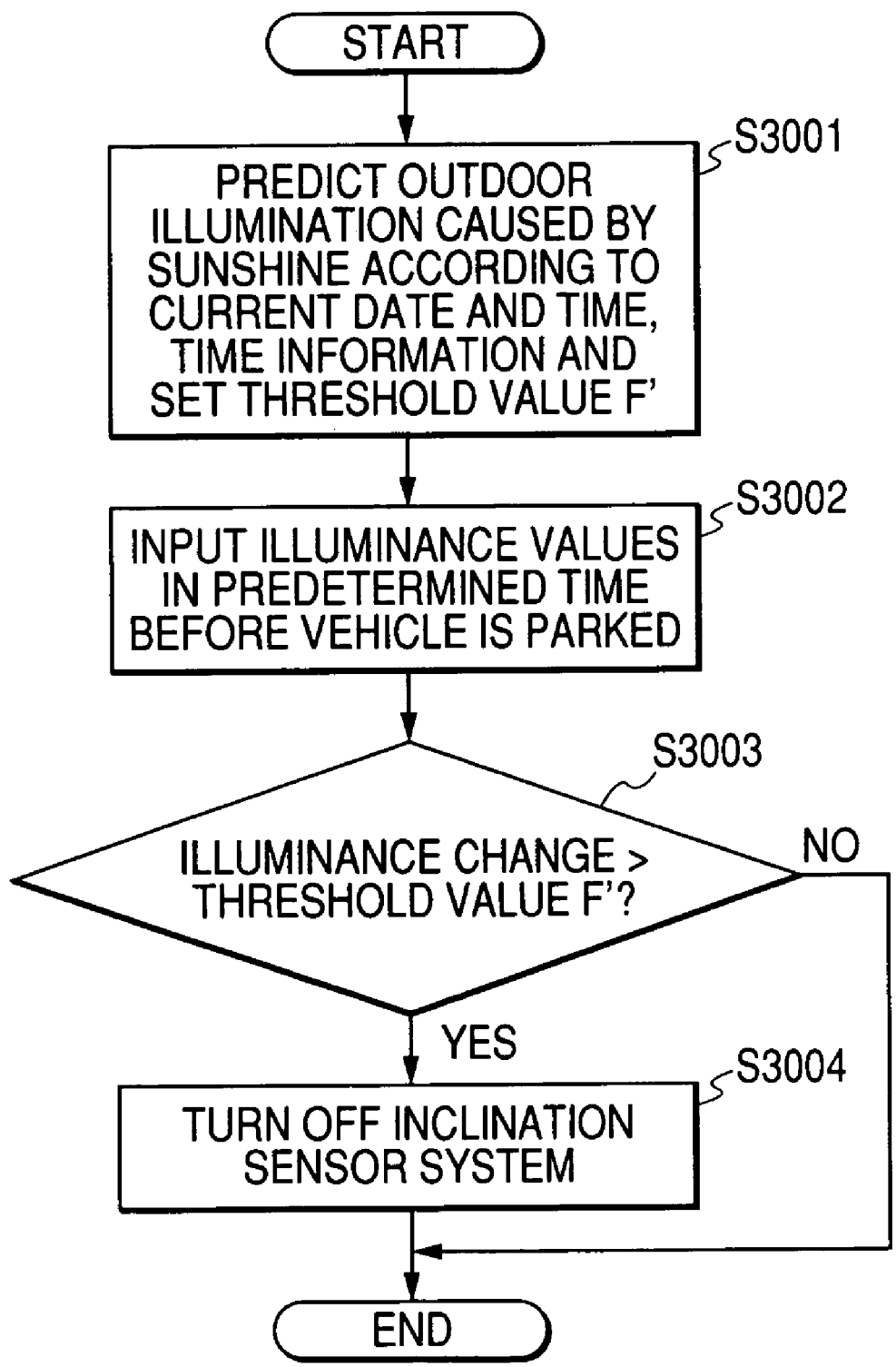
FIG. 47 is a flowchart to show the operation of a twentieth embodiment of the invention when a security ECU is set to a lookout state.

If a security ECU 201 is set to a lookout state, the CPU 211 starts a setting program of an inclination sensor system shown in the flowchart of FIG. 47. The CPU 211 reads average yearly illumination at the date and time based on the current date and time, time information from a wave clock 214 from ROM 212 and adjusts an illuminance change threshold value F' based on the average illumination (S3001). That is, when the average illumination is high, the CPU 211 increases the threshold value F'; when the average illumination is low, the CPU 211 lessens the threshold value F'.

Next, the CPU 211 inputs the illuminance values in predetermined time before the vehicle is parked from RAM 213 (S3002). Then, the CPU 211 detects illuminance value change based on the input illuminance values and determines whether or not the illuminance change is greater than the threshold value F' (S3003). If the CPU 211 determines that the illuminance change is smaller than the threshold value F', the CPU 211 terminates the program.

Accordingly, while the lookout state continues, the security ECU 201 determines the presence or absence of theft occurrence based on output of all sensors including an inclination sensor 235.

On the other hand, if the CPU 211 determines at S3003 that the illuminance change is greater than the threshold value F' the CPU 211 determines that the vehicle enters a parking lot of indoor move type, a ferry, etc., and the inside of the vehicle becomes dark, and forcibly turns off the inclination sensor system (S3004).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

As described above, the illuminance change threshold value is adjusted based on the current date and time, time information, whereby the threshold value can be set in response to the date and time. Thus, whether or not the vehicle is positioned in a parking lot of indoor move type, a ferry, etc., can be detected reliably.

Twenty-First Embodiment

Output of an inclination sensor may be used to determine whether or not the vehicle is in a situation where the vehicle will sway during parking in a parking lot of indoor move type, a ferry, etc. An embodiment for using output of an inclination sensor to determine whether or not the vehicle is in a situation where the vehicle will sway during parking will be discussed below:

The theft detection system configuration is the same as that in FIG. 32 and therefore will not be discussed again.

Figure 48:
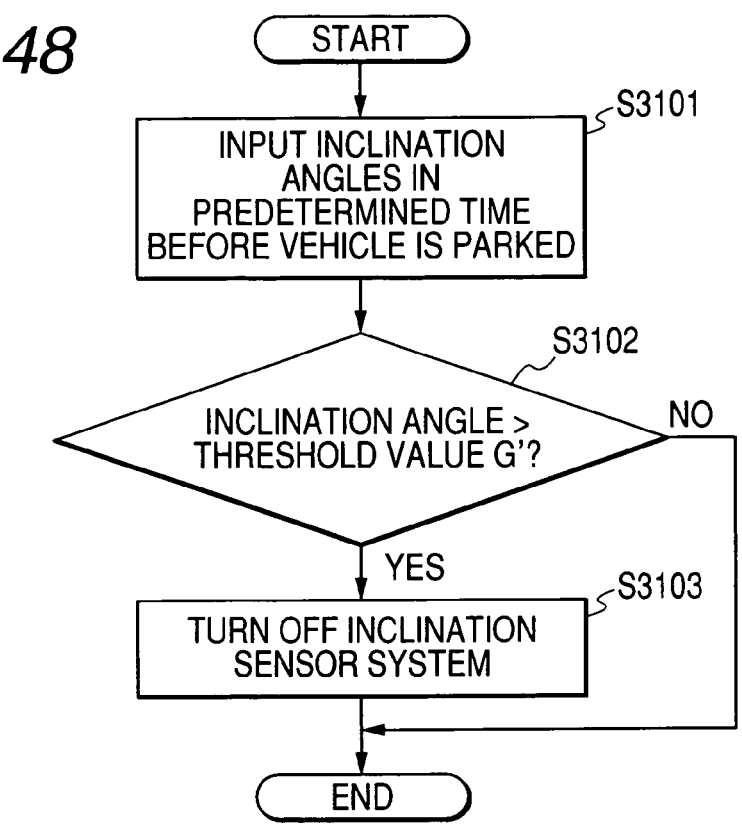
FIG. 48 is a flowchart to show the operation of a twenty-first embodiment of the invention when a security ECU is set to a lookout state.

A flowchart of FIG. 48 shows the operation of a CPU 211 for determining whether or not the vehicle is in a situation where the vehicle will sway during parking based on the inclination angle in predetermined time before the vehicle is parked.

If a security ECU 201 is set to a lookout state, the CPU 211 starts a setting program of an inclination sensor system shown in the flowchart of FIG. 48. First, the CPU 211 reads the inclination angle in predetermined time before the vehicle is parked from RAM 213 (S3101).

That is, the CPU 211 of the security ECU 201 inputs the difference between output of an inclination sensor 235 and an offset value at predetermined time intervals as the inclination angle at all times and stores the inclination angle in the RAM 213. If the security ECU 201 is set to the lookout state, the CPU 211 reads the inclination angles in predetermined time before the vehicle is parked from the RAM 213. The offset value is an average value of predetermined time of filtering output of the inclination sensor 235.

Next, the CPU 211 determines whether or not any of the read inclination angles is greater than a threshold value G' (S3102). If the CPU 211 determines that any of the read inclination angles is smaller than the threshold value G', the CPU 211 terminates the program.

Accordingly, while the lookout state continues, the security ECU 201 determines the presence or absence of theft occurrence based on output of all sensors including an inclination sensor 235.

On the other hand, if the CPU 211 determines at S3102 that any of the inclination angles is greater than the threshold value G', the CPU 211 determines that the vehicle is parked in a place where the vehicle will sway such as a parking lot of indoor move type or a ferry, and forcibly turns off the inclination sensor system (S3103).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

In the embodiment, if the difference between output of the inclination sensor 235 and the offset value exceeds the predetermined threshold value, it is determined that the vehicle is in a situation where the vehicle will sway during parking. Alternatively, output of the inclination sensor 235 is stored at predetermined time intervals and when the inclination angle change amount in predetermined time before the vehicle is parked exceeds a predetermined threshold value, it may be determined that the vehicle is in a situation where the vehicle will sway during parking.

In the embodiment, whether or not the vehicle is in a situation where the vehicle will sway during parking is determined based on the inclination angle in the predetermined time before the vehicle is parked. Alternatively, whether or not the vehicle is in a situation where the vehicle will sway during parking may be determined based on the inclination angle in predetermined time after the vehicle is parked. If the inclination angle in predetermined time after the security system is set is equal to or greater than a threshold value, it may be determined that the vehicle is in a situation where the vehicle will sway during parking.

Twenty-Second Embodiment

In the embodiment described above, whether or not the vehicle is in a situation where the vehicle will sway during parking is determined based on the inclination angle. Whether or not the vehicle is in a situation where the vehicle will sway during parking may be determined based on the inclination angular velocity. An embodiment for determining whether or not the vehicle is in a situation where the vehicle will sway during parking based on the inclination angular velocity will be discussed with reference to a flowchart of FIG. 49.

Figure 49:
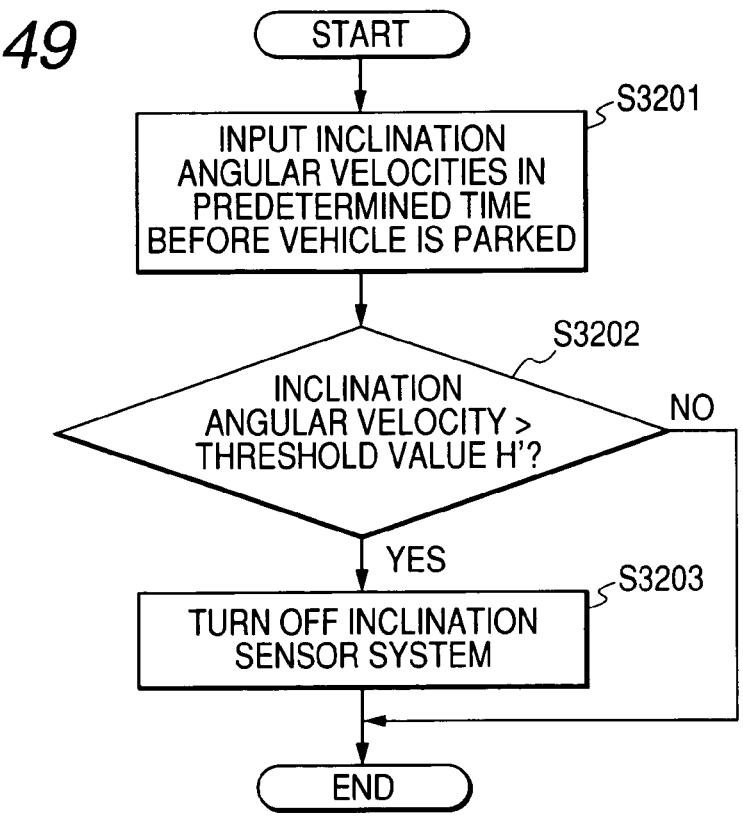
FIG. 49 is a flowchart to show the operation of a twenty-second embodiment of the invention when a security ECU is set to a lookout state.

If a security ECU 201 is set to a lookout state, the CPU 211 starts a setting program of an inclination sensor system shown in the flowchart of FIG. 49. First, the CPU 211 reads the inclination angular velocities in the predetermined time before the vehicle is parked from RAM 213 (S3201).

That is, the CPU 211 of the security ECU 201 calculates the inclination angular velocity at predetermined time intervals based on output of an inclination sensor 235 and stores the inclination angular velocity in the RAM 213. If the security ECU 201 is set to the lookout state, the CPU 211 reads the inclination angular velocities in predetermined time before the vehicle is parked from the RAM 213.

Next, the CPU 211 determines whether or not any of the read inclination angular velocities is greater than a threshold value H' (S3202). If the CPU 211 determines that any of the inclination angular velocities is smaller than the threshold value H', the CPU 211 terminates the program.

Accordingly, while the lookout state continues, the security ECU 201 determines the presence or absence of theft occurrence based on output of all sensors including the inclination sensor 235.

On the other hand, if the CPU 211 determines at S3202 that any of the inclination angular velocities is greater than the threshold value H', the CPU 211 determines that the vehicle is parked in a place where the vehicle will sway such as a parking lot of indoor move type or a ferry, and forcibly turns off the inclination sensor system (S3203).

Accordingly, the security ECU 201 determines the presence or absence of theft occurrence based on output of other theft detection sensors than the inclination sensor 235. Thus, the malfunction of the inclination sensor system caused by sway of a palette in a parking lot or a ferry can be prevented.

In the embodiment, whether or not the vehicle is in a situation where the vehicle will sway during parking is determined based on the inclination angular velocities in the predetermined time before the vehicle is parked. Alternatively, the inclination angular velocities in predetermined time after the vehicle is parked are read and if any of the inclination angular velocities is equal to or greater than a threshold value, it may be determined that the vehicle is in a situation where the vehicle will sway during parking or if any of the inclination angular velocities in predetermined time after the security system is set is equal to or greater than a threshold value, it may be determined that the vehicle is in a situation where the vehicle will sway during parking.

In the seventeenth to twenty-second embodiments described above, if it is determined that the vehicle is in a situation where the vehicle will sway during parking, the inclination sensor system is simply turned off. Alternatively, at the same time as the inclination sensor system is turned off, the user may be notified that the inclination sensor system is turned off. The theft determination threshold value may be increased or setting of the inclination angle calculation processing may be changed instead of turning off the inclination sensor system.

In the embodiments described above, the fact that the setting of the inclination sensor system is changed is displayed on the monitor 224 of the navigation system 202. Alternatively, a loudspeaker of a vehicle-installed audio machine may be used to inform the user by voice that the setting of the inclination sensor system is changed or mail may be transmitted to the previously registered mail address of the user of a mobile telephone, etc., for informing the user that the setting of the inclination sensor system is changed.

Further, a security transmitter may be provided with an indicator lamp for informing the user that the setting of the inclination sensor system is changed, so that the user is informed that the setting of the inclination sensor system is changed through the security transmitter by communications.

While a number of exemplary aspects and embodiments have been discussed above, those skilled in the art will recognize certain modifications, permutations, additions, and sub-combinations thereof. It is therefore intended that the following appended claims and claims hereinafter introduced are interpreted to include all such modifications, permutations, additions, combinations, and sub-combinations as are within the true spirit and scope.

What is claimed is:

1. A vehicle theft detection device comprising:
    an inclination detection unit that detects an inclination of a vehicle; and
    an operation control unit that detects theft using an output of the inclination detection unit, wherein:
    if it is determined that the vehicle is in a situation where the vehicle will sway during parking, the operation control unit reports information concerning setting of security to a user.

2. The vehicle theft detection device according to claim 1, wherein after the user sets the security, if it is determined that the vehicle is in the situation where the vehicle will sway, the operation control unit notifies the user that the setting of the security needs to be changed.

3. The vehicle theft detection device according to claim 1, wherein when the user does not set the security, if it is determined that the vehicle is in the situation where the vehicle will sway, the operation control unit reports the information concerning the setting of the security to the user.

4. The vehicle theft detection device according to claim 1, wherein the operation control unit acquires a vehicle position just before an ignition is turned off from navigation information and determines whether or not the vehicle is in the situation where the vehicle will sway based on the acquired vehicle position.

5. The vehicle theft detection device according to claim 1, wherein if a destination of navigation is set to a parking lot where the vehicle will sway and the vehicle arrives at the destination, the operation control unit determines that the vehicle is in the situation where the vehicle will sway.

6. The vehicle theft detection device according to claim 1, wherein if a ship is contained in the route to a destination of navigation and the vehicle arrives at a port, the operation control unit determines that the vehicle is in the situation where the vehicle will sway.

7. The vehicle theft detection device according to claim 1, wherein if illuminance change in the vehicle in predetermined time before the vehicle is parked is equal to or greater than a threshold value, the operation control unit determines that the vehicle is in the situation where the vehicle will sway.

8. The vehicle theft detection device according to claim 1, wherein if illuminance change in the vehicle in predetermined time after the vehicle is parked is equal to or greater than a threshold value, the operation control unit determines that the vehicle is in the situation where the vehicle will sway.

9. The vehicle theft detection device according to claim 1, wherein if the inclination angle of the vehicle in predetermined time before the vehicle is parked is equal to or greater than a threshold value, the operation control unit determines that the vehicle is in the situation where the vehicle will sway.

10. The vehicle theft detection device according to claim 1, wherein if an inclination angular velocity of the vehicle in predetermined time before the vehicle is parked is equal to or greater than a threshold value, the operation control unit determines that the vehicle is in the situation where the vehicle will sway.

11. The vehicle theft detection device according to claim 1, wherein if the inclination angle of the vehicle in predetermined time after the vehicle is parked is equal to or greater than a threshold value, the operation control unit determines that the vehicle is in the situation where the vehicle will sway.

12. The vehicle theft detection device according to claim 1, wherein if an inclination angular velocity of the vehicle in predetermined time after the vehicle is parked is equal to or greater than a threshold value, the operation control unit determines that the vehicle is in the situation where the vehicle will sway.

13. The vehicle theft detection device according to claim 1, wherein if the inclination angle of the vehicle in predetermined time after the security is set is equal to or greater than a threshold value, the operation control unit determines that the vehicle is in the situation where the vehicle will sway.

14. The vehicle theft detection device according to claim 1, wherein if an inclination angular velocity of the vehicle in predetermined time after the security is set is equal to or greater than a threshold value, the operation control unit determines that the vehicle is in the situation where the vehicle will sway.

15. A vehicle theft detection device comprising:
    an inclination detection unit that detects an inclination of a vehicle; and
    an operation control unit that detects theft using an output of the inclination detection unit, wherein:
    if the operation control unit determines that the vehicle is in a situation where the vehicle will sway during parking, the operation control unit changes filtering for an output of the inclination detection unit used for theft detection.

16. The vehicle theft detection device according to claim 15, wherein when the operation control unit is set to a theft detection mode based on output of the inclination detection unit, if the operation control unit determines that the vehicle is in a situation where the vehicle will sway during parking, the operation control unit releases the theft detection based on an output of the inclination detection unit, and if setting of the theft detection mode is changed, the operation control unit notifies a user that the setting of the theft detection mode is changed.

17. The vehicle theft detection device according to claim 15, wherein the operation control unit acquires a vehicle position just before an ignition is turned off from navigation information and determines whether or not the vehicle is in a situation where the vehicle will sway based on the acquired vehicle position.

18. The vehicle theft detection device according to claim 15, wherein if a destination of navigation is set to a parking lot where the vehicle will sway and the vehicle arrives at the destination, the operation control unit determines that the vehicle is in the situation where the vehicle will sway.

19. The vehicle theft detection device according to claim 15, wherein if a ship is contained in a route to a destination of navigation and the vehicle arrives at a port, the operation control unit determines that the vehicle is in the situation where the vehicle will sway.

* * * * *